United States Patent
Cylvick

(10) Patent No.: US 10,150,487 B2
(45) Date of Patent: Dec. 11, 2018

(54) MARINE-ENVIRONMENT, EMERGENCY-EGRESS SYSTEM AND METHOD

(71) Applicant: zipholdings, llc, Wanship, UT (US)

(72) Inventor: Eric S. Cylvick, Wanship, UT (US)

(73) Assignee: Zipholdings, LLC, Wanship, UT (US)

(*) Notice: Subject to any disclaimer, the term of this patent is extended or adjusted under 35 U.S.C. 154(b) by 0 days.

(21) Appl. No.: 15/666,707

(22) Filed: Aug. 2, 2017

(65) Prior Publication Data
US 2017/0327129 A1    Nov. 16, 2017

Related U.S. Application Data

(63) Continuation-in-part of application No. 15/441,101, filed on Feb. 23, 2017, which is a continuation-in-part
(Continued)

(51) Int. Cl.
*B61B 7/00* (2006.01)
*A62B 1/00* (2006.01)
(Continued)

(52) U.S. Cl.
CPC ............ *B61B 7/00* (2013.01); *A62B 1/00* (2013.01); *A63G 21/20* (2013.01); *A63G 21/22* (2013.01);
(Continued)

(58) Field of Classification Search
CPC .......... A63G 21/20; A63G 21/22; B61H 9/02; B61B 7/00; B61B 23/14; A62B 1/00;
(Continued)

(56) References Cited

U.S. PATENT DOCUMENTS

| 301,923 A | 7/1884 | Reisdorff |
| 551,744 A | 12/1895 | Brothers |

(Continued)

FOREIGN PATENT DOCUMENTS

| GB | 1297771 A | * 11/1972 | .............. B63C 9/22 |
| WO | WO 95/19903 | 7/1995 | |

OTHER PUBLICATIONS

Petzl, Rollcab instruction manual, p. 1-8, date unkonwn.

*Primary Examiner* — Zachary L Kuhfuss
(74) *Attorney, Agent, or Firm* — Pate Baird, PLLC

(57) ABSTRACT

Emergency egress systems carry multiple riders simultaneously accessing a zip line (catenary) from higher, accessible, working locations to lower, safer areas in a marine environment. Hangers above the track line suspend trolleys to avoid weighting the catenary unduly at the high end, which might otherwise alter (reduce) clearance distances and safety of riders above a launch platform (deck). Catenary shape is controlled against approaching the launch deck by sequencing the release from the hangers of each trolley to roll along the catenary with its own rider. Track line systems installed may be left undeployed indefinitely. Deployment of a track line will typically be fully effected at the time of egress, adding time but eliminating permanent obstructions that would result if a permanent deployment of track lines were undertaken. Terminal ends are anchored and configured to accommodate workers arriving after escape.

20 Claims, 32 Drawing Sheets

Related U.S. Application Data of application No. 15/354,866, filed on Nov. 17, 2016, and a continuation-in-part of application No. 14/923,708, filed on Oct. 27, 2015.

(60) Provisional application No. 62/257,610, filed on Nov. 19, 2015.

(51) Int. Cl.
| | |
|---|---|
| *B61B 12/00* | (2006.01) |
| *B61B 12/02* | (2006.01) |
| *A63G 21/22* | (2006.01) |
| *A63G 21/20* | (2006.01) |
| *B61H 9/02* | (2006.01) |
| *F16D 63/00* | (2006.01) |
| *G06K 7/00* | (2006.01) |
| *A62B 1/20* | (2006.01) |

(52) U.S. Cl.
CPC .......... *B61B 12/002* (2013.01); *B61B 12/007* (2013.01); *B61B 12/028* (2013.01); *B61H 9/02* (2013.01); *F16D 63/008* (2013.01); *A62B 1/20* (2013.01); *G06K 7/0004* (2013.01)

(58) Field of Classification Search
CPC .... A62B 1/06; A62B 1/16; A62B 1/18; A62B 1/20; B63B 27/18
USPC .................................................. 182/10, 191
See application file for complete search history.

(56) References Cited

U.S. PATENT DOCUMENTS

| | | | |
|---|---|---|---|
| 567,186 A | 9/1896 | Cassidy | |
| 654,687 A | 7/1900 | Suter | |
| 1,120,866 A * | 12/1914 | Tracy | B63C 9/26 441/84 |
| 1,556,555 A * | 10/1925 | Brown | A62B 1/02 104/113 |
| 1,684,251 A | 9/1928 | Thomas | |
| 1,935,711 A | 11/1933 | Hecox et al. | |
| 2,554,548 A | 5/1951 | Albagnac | |
| 2,922,625 A | 1/1960 | Heacock | |
| 3,455,866 A | 7/1969 | D'Alessandro | |
| 3,502,301 A | 3/1970 | Davis et al. | |
| 3,766,130 A | 10/1973 | Johnson | |
| 3,796,281 A * | 3/1974 | Dowling | B63C 9/22 114/293 |
| 3,826,335 A * | 7/1974 | Allen | B66B 9/06 182/10 |
| 3,927,867 A | 12/1975 | Herchenroder | |
| 3,949,679 A | 4/1976 | Barber | |
| 4,003,314 A | 1/1977 | Pearson | |
| 4,069,765 A | 1/1978 | Müller | |
| 4,150,011 A | 4/1979 | Searfoss et al. | |
| 4,203,504 A * | 5/1980 | Reynoir | A62B 1/00 114/293 |
| 4,223,495 A | 9/1980 | Peter | |
| 4,294,331 A * | 10/1981 | Reynoir | A62B 1/00 114/264 |
| 4,457,035 A | 7/1984 | Habegger et al. | |
| 4,646,924 A | 3/1987 | Dayson | |
| 4,660,677 A * | 4/1987 | Hunter | B63B 23/32 114/366 |
| 4,681,039 A | 7/1987 | Perrin | |
| 4,757,650 A | 7/1988 | Berger | |
| 4,934,277 A | 6/1990 | Smith et al. | |
| 5,060,332 A | 10/1991 | Webster | |
| 5,094,171 A | 3/1992 | Fujita | |
| 5,134,571 A | 7/1992 | Falque et al. | |
| 5,224,425 A | 7/1993 | Remington | |
| 5,390,618 A | 2/1995 | Wolff et al. | |
| 5,433,153 A | 7/1995 | Yamada | |
| 5,513,408 A | 5/1996 | Minakami et al. | |
| 5,853,331 A | 12/1998 | Ishikawa et al. | |
| 6,170,402 B1 | 1/2001 | Rude et al. | |
| 6,622,634 B2 | 9/2003 | Cylvick | |
| 6,666,773 B1 | 12/2003 | Richardson | |
| 7,066,822 B2 | 6/2006 | Cochran | |
| 7,299,752 B1 | 11/2007 | Cylvick | |
| 7,404,360 B2 | 7/2008 | Cylvick | |
| 7,637,213 B2 | 12/2009 | Cylvick | |
| 7,966,940 B2 | 6/2011 | Cylvick | |
| 8,166,885 B2 * | 5/2012 | Kitchen | A63G 21/22 104/189 |
| 2003/0066453 A1 | 4/2003 | Cylvick | |
| 2004/0134727 A1 | 7/2004 | Windlin | |
| 2004/0198502 A1 | 10/2004 | Richardson | |
| 2005/0029058 A1 | 2/2005 | Everett et al. | |
| 2005/0081738 A1 | 4/2005 | Meindl | |
| 2006/0108177 A1 * | 5/2006 | Monks | A62B 1/20 182/82 |
| 2006/0137563 A1 | 6/2006 | Cummins | |
| 2006/0288901 A1 | 12/2006 | Cylvick | |
| 2007/0039788 A1 | 2/2007 | Fulton | |
| 2008/0121470 A1 | 5/2008 | Cylvick | |
| 2010/0147180 A1 * | 6/2010 | Perry | A63G 7/00 104/112 |
| 2012/0031296 A1 * | 2/2012 | Smith | B61B 7/00 104/113 |
| 2012/0067246 A1 | 3/2012 | Liggett et al. | |
| 2015/0217149 A1 * | 8/2015 | Stewart | A62B 35/0075 182/5 |
| 2015/0266454 A1 | 9/2015 | McGowan | |
| 2016/0038841 A1 | 2/2016 | Cylvick | |
| 2016/0046305 A1 | 2/2016 | Cylvick | |
| 2016/0096532 A1 | 4/2016 | Cylvick | |
| 2017/0327129 A1 * | 11/2017 | Cylvick | B61B 7/00 |

\* cited by examiner

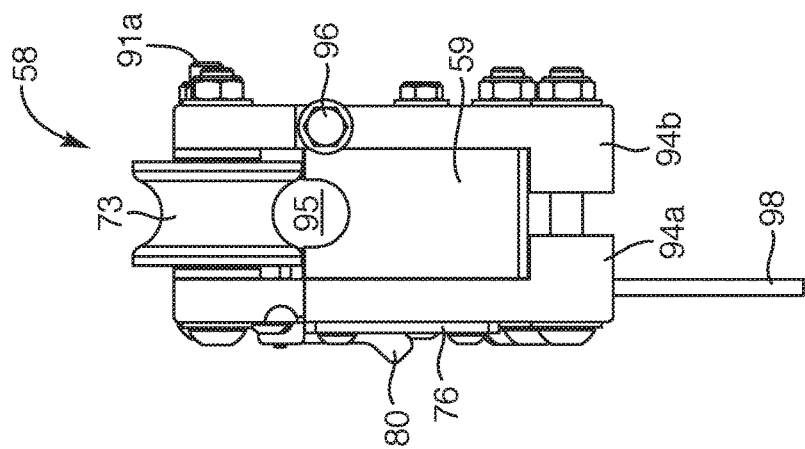
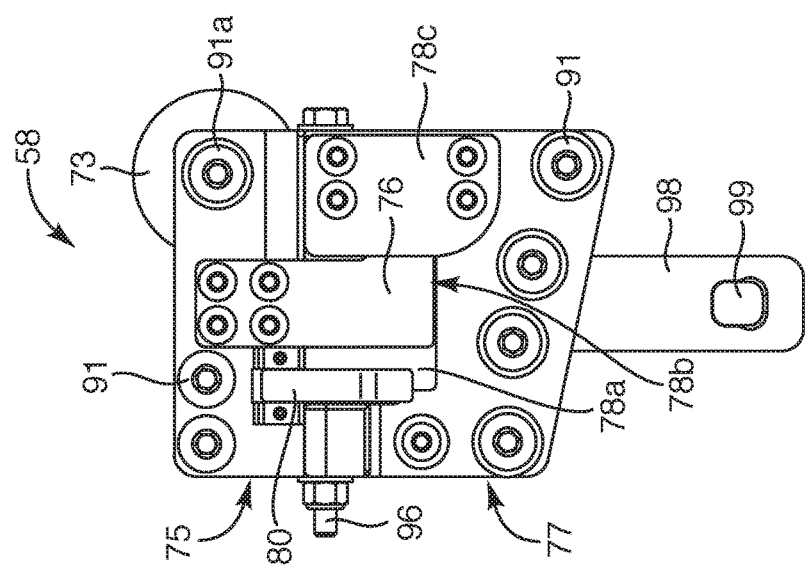
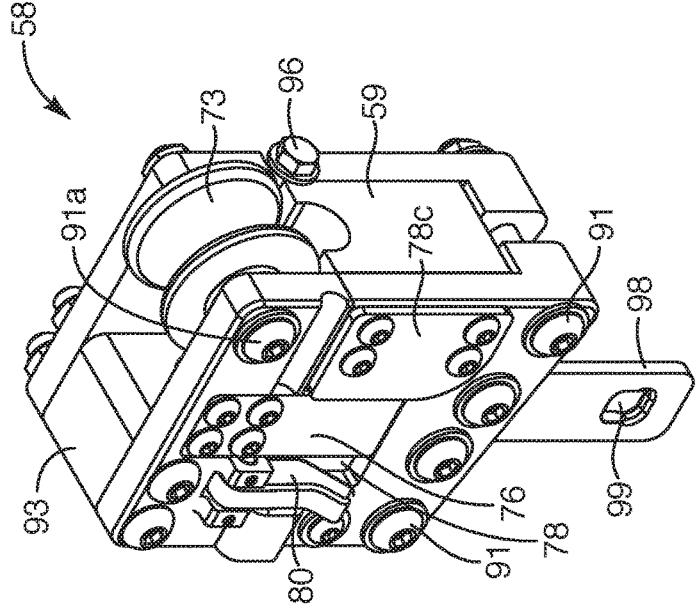

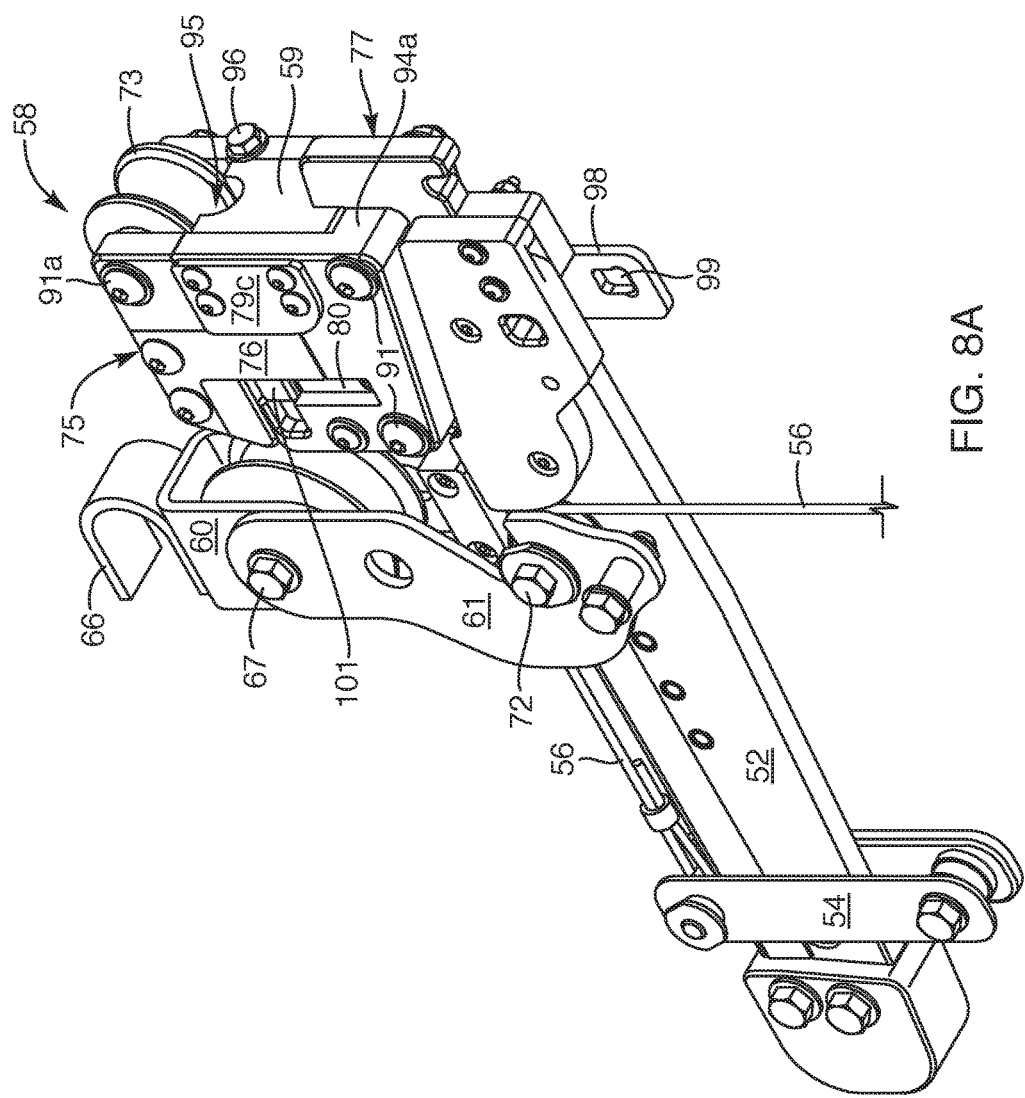

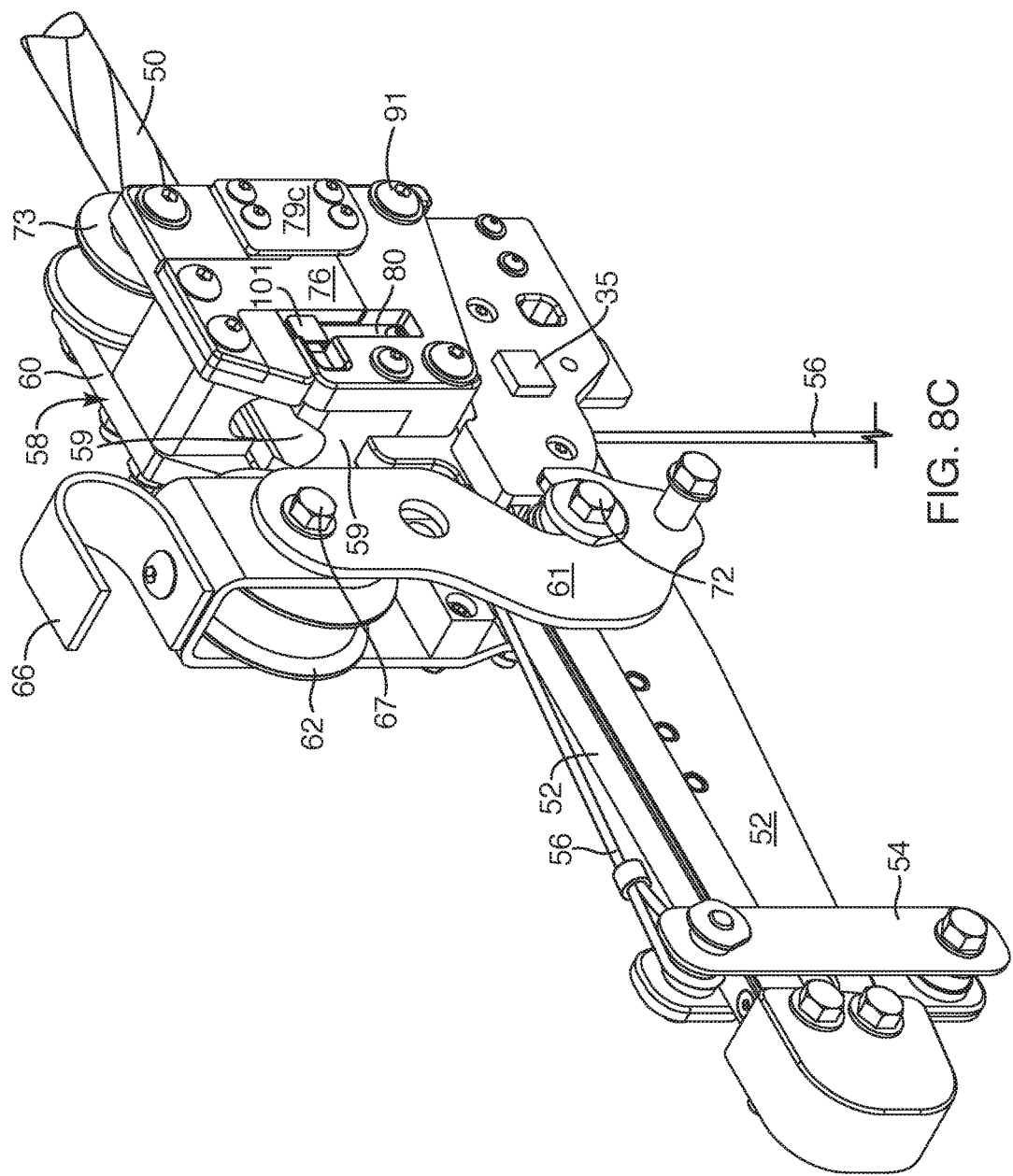

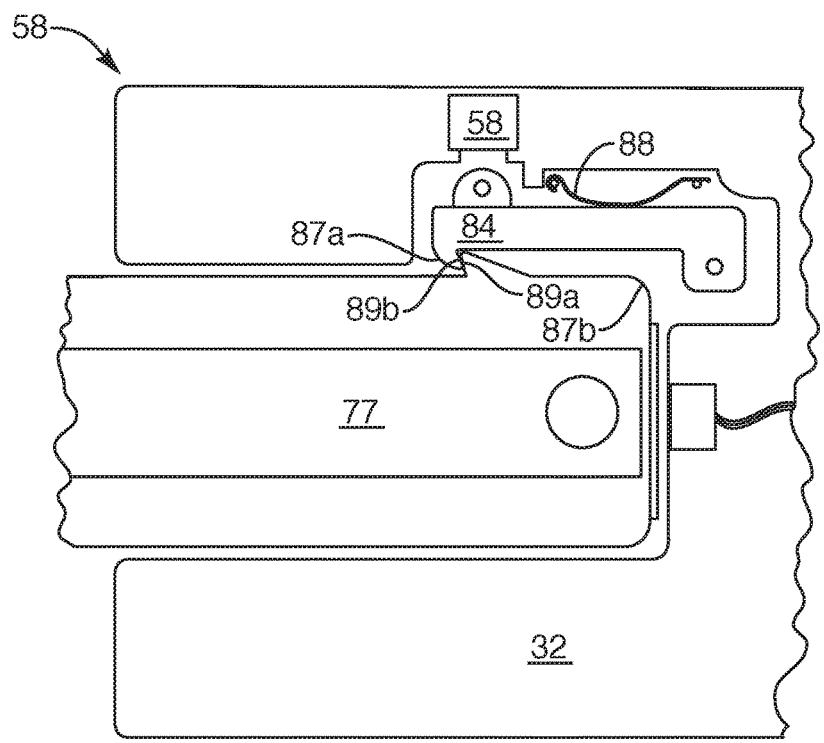
FIG. 9A
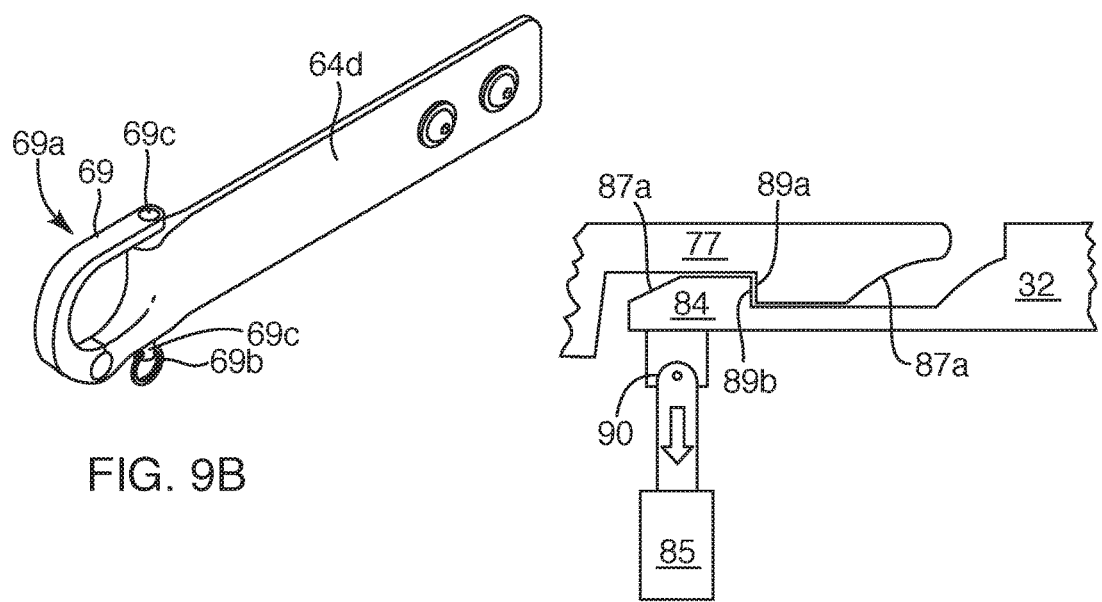
FIG. 9B
FIG. 9C

MARINE-ENVIRONMENT, EMERGENCY-EGRESS SYSTEM AND METHOD

RELATED APPLICATIONS

This application: is a continuation in part of U.S. patent application Ser. No. 15/441,101, filed Feb. 23, 2017; and is a continuation in part of U.S. patent application Ser. No. 15/354,866, filed Nov. 17, 2016, which claims the benefit of Provisional Patent Application Ser. No. 62/257,610, filed Nov. 19, 2015; and is a continuation in part of co-pending U.S. patent application Ser. No. 14/923,708, filed Oct. 27, 2015; all of which are hereby incorporated by reference. This application also incorporates herein by reference the following applications and patents: U.S. patent application Ser. No. 14/451,932, filed Aug. 5, 2014; U.S. patent application Ser. No. 14/711,465, filed May 13, 2015; U.S. Provisional Patent Application Ser. No. 62/058,544, filed Oct. 1, 2014; and U.S. patent application Ser. No. 14/923,708, filed Oct. 27, 2015. Moreover, this application hereby incorporates herein by reference U.S. Pat. No. 7,637,213, issued Dec. 29, 2009; U.S. Pat. No. 7,966,940, issued Jun. 28, 2011; U.S. Pat. No. 7,299,752, issued Nov. 27, 2007; U.S. Pat. No. 7,404,360, issued Jul. 29, 2008; U.S. Pat. No. 6,622,634, issued Sep. 23, 2003; U.S. Pat. No. 6,666,773, issued Dec. 23, 2003; U.S. Pat. No. 8,191,482, issued Jun. 5, 2012; U.S. Pat. No. 8,333,155, issued Dec. 18, 2012; and U.S. patent application Ser. No. 14/451,932, filed Aug. 5, 2014.

BACKGROUND

1. Field of the Invention

This invention relates to emergency egress systems and, more particularly, to novel systems and methods for rapidly evacuating an area of multiple workers using a zip line.

2. Background Art

The word "zipline" and words "zip line" refer to a line, such as a wire rope, steel cable, fiber rope, or the like as a "track line," typically suspended as a catenary between two supports. A catenary is a well defined and understood term in structural and civil engineering, used here in that ordinary meaning.

A zip line necessarily contains no intervening supports. It typically relies on gravity, although some short lines may be more level. Some lines (e.g.; manual cable cars, gorge-crossing lines, etc.) lacking sufficient (or having zero) decline between a start point and end point may rely on a rider for motive power. A rider or riders may move the trolley suspended thereunder by drawing on the track line directly, or drawing on a nearby and nearly parallel line, by hand-over-hand grasping and pulling on the appropriate line. That motion is relative, whether the cable is fixed or not. All lines may be fixed at their ends.

Alternatively, lines may be run around pulleys at each end. In some instances, an attendant on the ground below a zip line may draw a rider and trolley along a zip line. Such attendants may draw a rider on an uphill portion near the lower end thereof, in order to move the rider along. An attendant may apply a braking force on a moving rider and trolley.

Adventure stories, action movies, military operations, and the like may rely on zip lines as lightweight, temporary mechanisms for crossing a space, such as a river or gorge. An individual rider may use a gloved hand for their own braking. One may move along a cable or line by grasping the overhead line with a gloved hand. In other instances, a long braking rope extends downward to be grasped at an appropriate time and place by an operator below. The operator grips the rope to restrain or to exert force on a rider, thereby slowing the rider from crashing into the lower anchor on the ride.

Frequency of use, rider ability, panic, skill, comfort with speed, or the like, and the presence of multiple riders accessing, launching, and riding seats simultaneously, create risks affecting operation and safety. Overweighting a catenary near a single location distorts its shape, altering clearance above a deck or other launch surface therebelow. This creates problems for riders needing to stage loading and launching from a pre-determined height of a deck structure.

In addition, zip lines have traditionally been a solo ride device. Brakes accessible to a rider have been largely absent. Absent and now needed, is an ability to control an individual trolley on a track line, and safely accommodate short distances and possible impacts between trolleys of multiple riders loaded, launched, and rolling simultaneously on a single line from a single loading deck.

In emergence egress situations, a worker evacuating a building, tower, off-shore rig, or other structure needs to act immediately and individually. There may be no time to wait and no assistance available.

What are needed are apparatus, systems, and methods to render practical, safe, reliable, and consistent the unattended use of multiple trolleys launching virtually simultaneously or in rapid succession from a single loading deck. What is needed is to rapidly load and carry away workers from a location that has suddenly become dangerous, where time is of the essence, conventional exit is not practical, and personnel may not be available to assist.

BRIEF SUMMARY OF THE INVENTION

In view of the foregoing, in accordance with the invention as embodied and broadly described herein, a method and apparatus are disclosed in one embodiment of the present invention as including a track line extending between a set of anchors, passing over or secured atop towers or elevated positions calculated to provide clearance above underlying obstructions. A platform at an upper tower and cable or anchor for launching and a corresponding lower platform, tower, and anchor for landing are provided with each zip line. Secured to and by each tower is a line, typically a wire rope as that term is understood in the engineering and manufacturing art. Industry has long used woven strands of twisted wire having comparatively high strength and a comparatively low elongation under load. Sometimes the term "cable" refers to a bundle of electrical wires. Not here, because cable is not an improper term for a wire rope. A cable acts as a track line, typically suspended in a catenary shape between two anchors (e.g. towers). All points along a track line between two towers will typically be free of intermediate supports. In some embodiments, hardware may permit cable supports to be traversed by a trolley on the cable. Here, typically, a vertical stabilization system may limit any dropping or drooping of a track line in response to weighting by multiple riders simultaneously at a single launch deck.

Cables as track lines may be monotonically tilting downward, may be level, or may be freely suspended with upward and downward angled portions of a catenary suspension. An upper anchor will serve as a launch location while the lower anchor will be associated with the landing location.

In one embodiment of an apparatus and method in accordance with the invention, a launch platform has associated therewith a deck on which a user may comfortably stand or move about. A launch block secured to the main track line or carrier (cable, wire rope) is responsible to register a trolley mechanically and electronically for launching from the launch platform.

Similarly, a landing platform may be configured with a deck on which a rider may disembark from the harness or seat suspended from a trolley on the overhead track line. A velocity or momentum attenuator may exist approaching the terminal or landing platform in order to brake the speed of a rider approaching that platform.

The procedure of operation is sufficiently simplified that there is comparatively little to remember. Thus, a simple process, straightforward training, and riders may move quickly in an emergency situation to a launch deck, load into a seat or harness, launch when ready, and travel in close proximity. Trolleys may run independently, yet may create a virtual train of trolleys running in close proximity or even touching.

In certain embodiments, a track line and launch station may be associated with an off-shore platform, such as an off-shore drilling rig or an off-shore petroleum facility. In such an embodiment, trolleys in accordance with the invention may be stabilized so the presence of multiple riders in close proximity to one another does not load the track line. In this way, individuals may load and launch at will, leaving the proper angle of the track line catenary unaffected by the weight of the riders waiting to launch onto the track line toward safety at the lower end thereof.

The lower end may be anchored to any number of potential marine fixtures including lifeboats, ships, support tenders, tugs, other platform structures, a sea anchor, a sea-floor anchor such as is used on ships conventionally, or to any suitable part of a ship from railing, to bollard, to cleat, anchor chain, cam cleat, or the like. A take-up system at the destination or remote location securing the lower end of the track line may assure length and tension control.

In certain embodiments, a boat, such as a lifeboat, a drone boat, a torpedo, a drone flyer, a mortar, or the like may carry a line, smaller or the same size as the track line to a remote location from an off-shore platform to a remote anchoring location. Meanwhile, a remote anchoring location may be a cleat, bollard, cam cleat, anchor chain, railing, or any other durable location on a large ship such as a supply ship that will typically attend a set of off-shore platforms.

Meanwhile, a boat itself may serve as an anchor. Such a boat may be provided with a sea anchor. A sea anchor may be pivoting panels that swing out from a boat to resist moving backward with force from a track line. It may be a large parachute-like affair that fills with sea water, and provides tremendous resistance against movement backward.

In some embodiments, a small watercraft may draw a sea anchor forward, with the sea anchor opening and providing an impulse load any time a rider launches on the track line, and thus provides more tension on the sea anchor than the watercraft itself could support. In this way, the watercraft can continue to draw a sea anchor away from a platform in an emergency, but its own horsepower need not be entirely responsible to hold the substantial tension loads of riders launching down the track line.

In other embodiments, a buoy may be permanently secured at a location remote from an off-shore platform. The buoy may be tethered to a sea-floor-penetrating member, a massive block anchor, or mass anchor, permanently or temporarily positioned far below on the ocean floor. In this way, the buoy will be drawn by the tension of the track line, but is anchored sufficiently by the anchor on the ocean floor. In this situation, riders may land on the buoy, in the water, or may land near a watercraft or in a watercraft close to the buoy.

For example, a small boat can draw the track line from an off-shore rig out to a buoy at some distance away. A boat or offshore rig may carry a tensioning device to take up slack. Meanwhile, the boat may connect to the buoy, or connect the track line to the buoy. In this way, an anchor on the sea floor may tether the buoy in place. The tensioning or take-ups system on the rig (platform) or in a small boat that delivers the track line to the buoy may provide regulation of tension, length, and therefore height of the track line above the surface of the sea.

An assembly of a power source, operating under the control of some controller, organic (built in, integrated, dedicated, or otherwise operably connected as part and parcel of) to the power source, or remote therefrom, may operate a capstan as a take-up device. A clutch may be manual, automatic or programmatically controlled. Meanwhile, the capstan may take up slack in a track line delivered to a location remote from an off-shore platform.

In some embodiments, the capstan may be augmented by a tensioning device, such as a load cell supporting the tensioning pulley. Thus, additional length, spring-loaded buffering, or the like between a load cell and a tensioning pulley may allow control of impact loads, stresses, and so forth. Meanwhile, the track line may wrap around the tensioning pulley, and then be positioned by being run over an idler to ultimately be taken up by a capstan installed for the purpose.

Thus, any of the foregoing may be implemented as a temporary system, or as a permanently installed system. However, the track line will typically not be installed permanently, at least not deployed in usable suspension permanently. Deterioration, interference, and the like may preclude maintaining a track line in position. However, maintaining a buoy while anchored or tethered to an anchor on the sea floor at a known location may be an entirely appropriate way to provide for an end anchor or terminal end for an emergency track line deployed for emergency egress from an off-shore platform.

Various hardware may be used, including slings (webbing loops), or webbing straps having sewn loops in each end to be captured by a clevis at each end, thereby permitting wrapping around a supporting structure of a remote platform, or the like. Also, brackets, links, chains, devises, hooks, cleats, bollards, cam cleats, and the like may be used to secure the track line at its destination or terminal location.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 6A is a left side, perspective view of a trolley having a launch block interlock system in one alternative embodiment thereof;

FIG. 6B is a left side elevation view thereof;

FIG. 6C is a rear elevation view thereof;

FIG. 8A is a lower quarter, left side, perspective view of an alternative embodiment of an interlocking trolley with the brake system closed;

FIG. 8C is a rear, upper quarter, left side perspective view thereof;

FIG. 9A is a top plan, cutaway view of one embodiment of a latch mechanism securing a trolley to a launch block;

FIG. 9B is a frontal, upper quarter, left side perspective view of a snap shackle on an arm for interlocking the trolley to a launch block;

FIG. 9C is a top plan, cutaway view of an alternative latch and release mechanism for securing a trolley to a launch block.

DETAILED DESCRIPTION OF THE PREFERRED EMBODIMENTS

Figure 1:
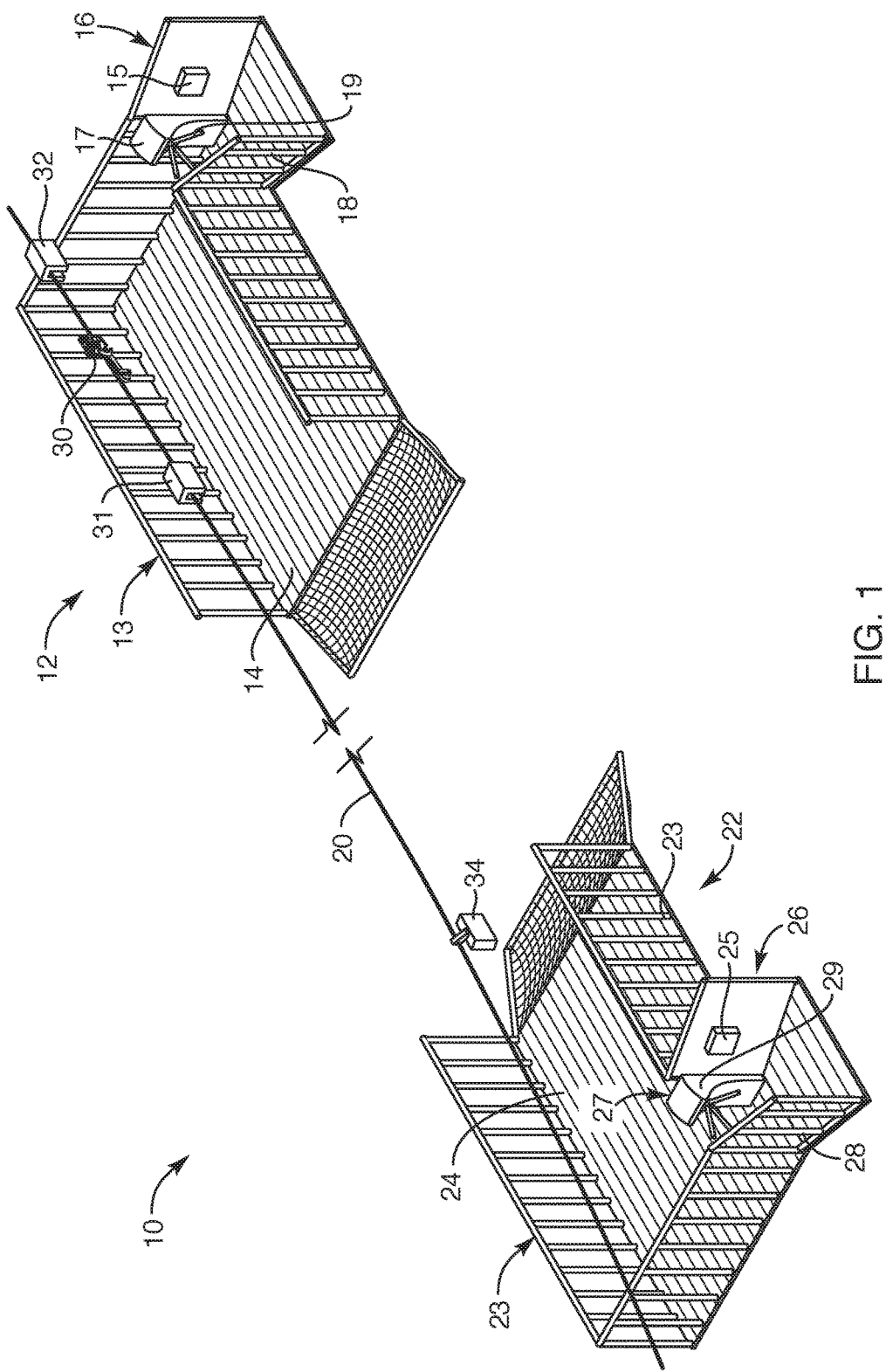
FIG. 1 is a perspective view of upper and lower stations for launching and landing, respectively, in a system in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

A zip line may extend as a catenary, as defined in the engineering art. The term "catenary" is understood by repair to any textbook on structural mechanics or engineering nomenclature. The catenary extends freely between end supports. It may suspend from an upper anchor point to a lower anchor point, the decline of the line providing the gravitation motivation of a rider suspended from a trolley. The trolley may be as simple as a single wheel or pulley in a frame, from which frame is suspended a harness, seat, handle, or the like by which a rider is supported.

Zip lines may simply be deployed, lightweight, temporary mechanism for crossing a space that is otherwise resistant to traverse. For example, crossing a river, gorge, or the like, a zip line may provide for transport of materiel, personnel, and so forth. Zip lines have a few inherent difficulties in installation and operation. For now, the details of installation are not of concern with respect to the instant application.

On the other hand, the difficulties of operation are substantial. For example, a soldier trained to use a zip line may undergo hours or days of training. An individual who relies on zip lines in an industrial, military, or other routine context will not only have trained intensely but will have extensive experience.

However, in recent years, zip lines may have utilitarian function or an entertainment function. Children's youth camps, Boy Scout' camps, high-adventure camps, "challenge courses" offered by industry to executive teams for team-building purposes, amusement parks, ski resorts looking for additional amusements that do not require snow, and so forth are possible locations for installing zip lines.

To a certain extent, the amusement-ride-type, zip lines may have obtained their most significant start in second and third world countries where manual labor was more readily available. For example, it is not uncommon to have an individual rider responsible for their own braking to slow their descent on a zip line by grasping the overhead line with a gloved hand. In other instances, a long braking rope extends downward to be grasped at an appropriate time and place by an operator below. The operator grips the rope to restrain or to exert force on a rider, thereby slowing the rider from crashing into the lower anchor on the ride.

Herein are described several embodiments of zip lines, including as amusement rides, canopy tours, and emergency egress systems. Herein, a reference numeral refers to a particular type or class of item that can be named. A reference numeral followed by a trailing letter refers to a specific instance of the numbered item. Accordingly, it is proper to use a number without a trailing letter to indicate a particular type of item or class of item. A number used with a specific trailing letter indicates a particular instance of the item, so identified in a figure.

Referring to FIG. 1, a system 10 in accordance with the invention may include an upper station 12 from which riders will launch on a zip line ride. In the illustrated embodiment, an upper station 12 includes a safety structure 13, such as a railing 13, fence 13, or the like. The railing 13 surrounds virtually on all sides, an upper deck 14. The exit for launching a trolley may have a net, gate, or both to provide proper egress but assure safety against falling from the deck 14. The upper deck serves as the staging space 14 for a rider to harness up, clip in to the system 10 and launch on a descent.

As illustrated, the upper deck 14 may be formed of any suitable material, such as expanded metal, deck planking, concrete, or the like. Various embodiments of systems 10 in accordance with the invention are identified in the U.S. Patents and Applications incorporated hereinabove by reference. Various embodiments for decks 14 or platforms 14 serving as upper stations 12 are illustrated and detailed.

In the illustrated embodiment, a railing 13 is important if and when the system 10 is unattended. Instead, users (riders) are trained, their decisions are limited, and their equipment is modified in order to assure user safety. Accordingly, users are restricted by various mechanical and electronic interlocks from improperly entering or exiting a station 12 or launching from the station 12. A station 12, absent the proper authorization, safety checks, and so forth, will not permit a user to enter therein and launch therefrom.

As a user approaches the upper station 12 a reader 15 may be provided as part of an electronic portal 16. This entry portal 16 may require identification, authorization, and so forth as described hereinbelow.

The upper station 12 may include an access control 17, such as a turnstyle 17, or the like. Various embodiments of a system 10 in accordance with the invention may count, track, control, and report on the specific locations of various users operating within the system 10.

Thus, in some embodiments, the turnstyle 17 may be required. Alternatively, another barrier 18 or gate 18 may be the access control. In certain embodiments, the portal 16 will be required for entry through a physical barrier 18 after which a turnstyle 17 or other access control 17 may count, track, register in, and so forth a user.

The actuator 19 or bar 19 of the turnstyle 17, if conventional, may not serve as an absolute physical barrier 18. Thus, either, or both, in series, may be relied upon in the system 10. However, the actuator 19 may be defeated in an unattended system. For example, subway systems, mass transit rail systems, and so forth often use turnstyles 17 as an entry and exit mechanism, including control by card readers, and so forth. However, such systems are all attended. Various transit authority police, station attendants, and the like as well as a large public population will notice and report any breaches or other violations.

In contrast, in an apparatus and method in accordance with the invention, the system 10 may be remote, and completely unattended for extended periods of time, including hours, possibly days, but probably inspected at least weekly. In most circumstances, one would expect to have a safety check by personnel perhaps daily, traveling through the system 10 on all the routes. However, this takes an extensive period of time, and need not be done every day. However, prudence would suggest at least weekly inspections.

Since the system 10 is unattended for extensive periods of time, and since zip lines over ravines, rivers, forests, and other scenic sites are inherently life-or-death situations, safety requires protection that cannot be defeated. Thus, the fence 13 may actually be higher than an individual can access or climb, and may be protected by security devices, concertina wire, or the like against incursion by unauthorized individuals.

For example, remote systems 10 will not likely be defeated by paying customers as riders, properly equipped, trained, and authorized to access the system 10. However, it is not unknown to have complete strangers access a zip line with makeshift equipment, and cause harm to the system 10, as well as personal danger, injury, or worse. Therefore, the presence of an absolute physical barrier 18 as well as the access control 17 is not actually a redundancy. Thus, by urging the actuator 19 forward, a user (rider) may rotate a turnstyle 17, thus gaining proper access, recording an account or access number associated with the rider, the trolley, or both, and so forth.

A track line 20 is connected between towers, and suspends therefrom as a catenary 20. The patent documents incorporated hereinabove by reference lay out detailed structures and methods for establishing anchors, towers, bollards, and the like for a track line 20. The track line 20 is typically formed of a wire rope of suitable dimensions, typically from about three quarters inch to about one inch in diameter. Nevertheless, shorter spans support less weight, and therefore may rely on smaller diameters. Likewise, longer spans may be correspondingly larger.

The track line 20 originates near the upper station 12 such that the track line 20 passes directly over the upper deck 14, at a height providing safe access to a user (rider). Ultimately, the track line 20 also descends (always with a downhill slope) to a lower station 22. The lower station 22 is similar in construction to the upper station 12, to include a fence 23 or railing 23, a lower deck 24, and one or more readers 25, associated with an electronic portal 26. Again, the lower station 22 may include an access control 27, such as a turnstyle 27, and a physical barrier 28 or gate 28. An actuator 29 or bar 29 on a turnstyle 27 is simply one mechanism by which to detect that a user has exited. Others may operate including reader 25 and reminder 29 affirmatively engaging a user.

An important reason for an actuator 29 on a turnstyle 27 is to obtain a report without requiring or relying exclusively on memory or training of a rider. Certain protections and interlocks within the system 10 will prevent accidentally loading a single line 20 with multiple users. Similarly, a rider will not be permitted to leave the upper station 12 until the lower station 22 is clear. Thus, it is just as important for a rider to check in with a reader 25 at a lower electronic portal 26 to check in through activation of a reader 15 in an upper portal 16. The turnstyles 17, 27 also indicate rider locations. Passing through a turnstyle 17, 27 indicates that an individual has entered or exited the respective deck 14, 24. Certain provisions may be made for various portals 16, 26 at different locations in order to more specifically identify where exactly users are located. For example, if multiple riders are allowed on a deck 14, 24, they may be required to remain at registered locations away from the path of a trolley and rider actively moving along the track line 20.

For example, the system 10 has been integrated and simplified for users sufficiently that children may be able to operate as riders of the system 10. However, physical height is a limitation that cannot be readily overcome. Thus, a man nearly six feet tall or a woman of corresponding stature may be able to reach a track line 20 from a deck 14, 24. However, a child a foot or less shorter in height cannot. To that end, stairs, steps, risers, or the like may be added to the deck 14, 24 in order to permit a smaller use to clip in to the track line 20.

Alternatively, an associated adult may be permitted access to assist. A parent or adult chaperone may be permitted on the deck 14, 24, so long as verification is provided that such an attending, related, responsible adult is sufficiently clear of the path under the track line 20 when riders are coming and going.

Thus, the electronic portals 16, 26 may permit multiple persons to be on the decks 14, 24 at any given time, but may require that all adults other than the designated rider be remote from the track line 20 any time a rider is underway thereon. Thus, when the trolley is stopped at the upper deck 14 or the lower deck 24, then a responsible, chaperoning adult may approach to assist in clipping in and unclipping a child rider.

Various additional equipment is installed about the stations 12, 22. For example, a cable gate 30 or cable close gate 30 serves as an electronically actuated, mechanical interlock 30. The cable close gate 30 is a mechanical system that preferably blocks any ability of a user 45 to travel down the track line 20. The gate 30 effectively arrests anything traveling along the track line 20 against leaving the upper station 12. A gate 30 may operate in any of several manners.

For example, a yoke that simply sits on the line 20 will serve this function. Likewise, a hook, a plate-shaped shield may serve. A plate, cone, ball, or other obstruction, having an aperture or slot in the bottom thereof, may be activated to slide down over the line 20. With the line 20 occupying the slot, the obstruction provides a stop against any access to the track line 20 or at least any movement downward therealong.

In other embodiments, a physical obstruction 30 of any type in close proximity to the track line 20 preventing passage therealong will serve. The shape is less important than the proximity to the track line 20, in order that no sliding or rolling member can pass. For example, a rectangular plate with a slot or aperture protruding from a bottom edge to about the center thereof may block the line 20. Similarly, a spherical obstruction having a slot between a lower edge and a center thereof may be placed over the line 20.

In another embodiment, a hook or latch may engage the top, bottom, or other location on any material or fixture attempting to travel along the line 20. In another embodiment, a simple bar or rod may pass horizontally under the line 20 at a distance and of a length calculated to prevent any suspended item from passing along under the line 20. Any combination of rods, plates, spheres, solids, hooks, wedges, or the like pivoting or translating into position increases cross sectional area. Any such mechanisms may be used to assure that no unauthorized structures may pass along the line 20 out from the upper station 12.

The significance of the cable close gate 30 is primarily safety. Unauthorized access to the line 20 at any time, by any person, for any reason may risk damage to the line 20 or other parts of the system 10. However, the highest risk of loss, damage, or injury is to any person who accesses the line 20 without authorization. Serious injury or death may occur as a direct consequence of unauthorized access. Accordingly, a system 10 that does not require a plethora of attendant technicians managing and instructing riders at the upper station 12, lower station 22, or both militates in favor of serious efforts at locking out unauthorized persons for their own safety.

Referring to FIGS. 1 through 5, and to FIGS. 1 through 29, generally, also at the upper station 12 is a launch block 32, certain embodiments of which are disclosed herein. Others are disclosed in the references incorporated herein by reference. The launch block 32 is responsible for registering, meaning mechanical registration, electronic registration, or both, of the trolley 50 of any rider 45.

The launch block 32 is provided with certain fixtures and fittings that meet in a mating relationship with components used by the rider 45. Accordingly, mechanical registration assures that the mechanical interlocks are closed, are properly located, and that a user 45 may properly operate the system 10. Likewise, certain sensors in the launch block 32 provide electronic interlocks that report (to a master controller 40 (computer) the proper registration in space, and therefore the proper registration with suitable control systems in order that launch from the upper station 12 is authorized and enabled.

Meanwhile, a terminal detector 34 may optionally detect passage of a user 45. Nevertheless, in most embodiments, the incoming portal 16 and its reader 15, the outgoing portal 26 and its reader 25, and various optional sensors and controls on the barriers 18, 28, turnstyles 17, 27, and the like may report access by users, entry, and exit, and control them to promote safety.

Figure 2:
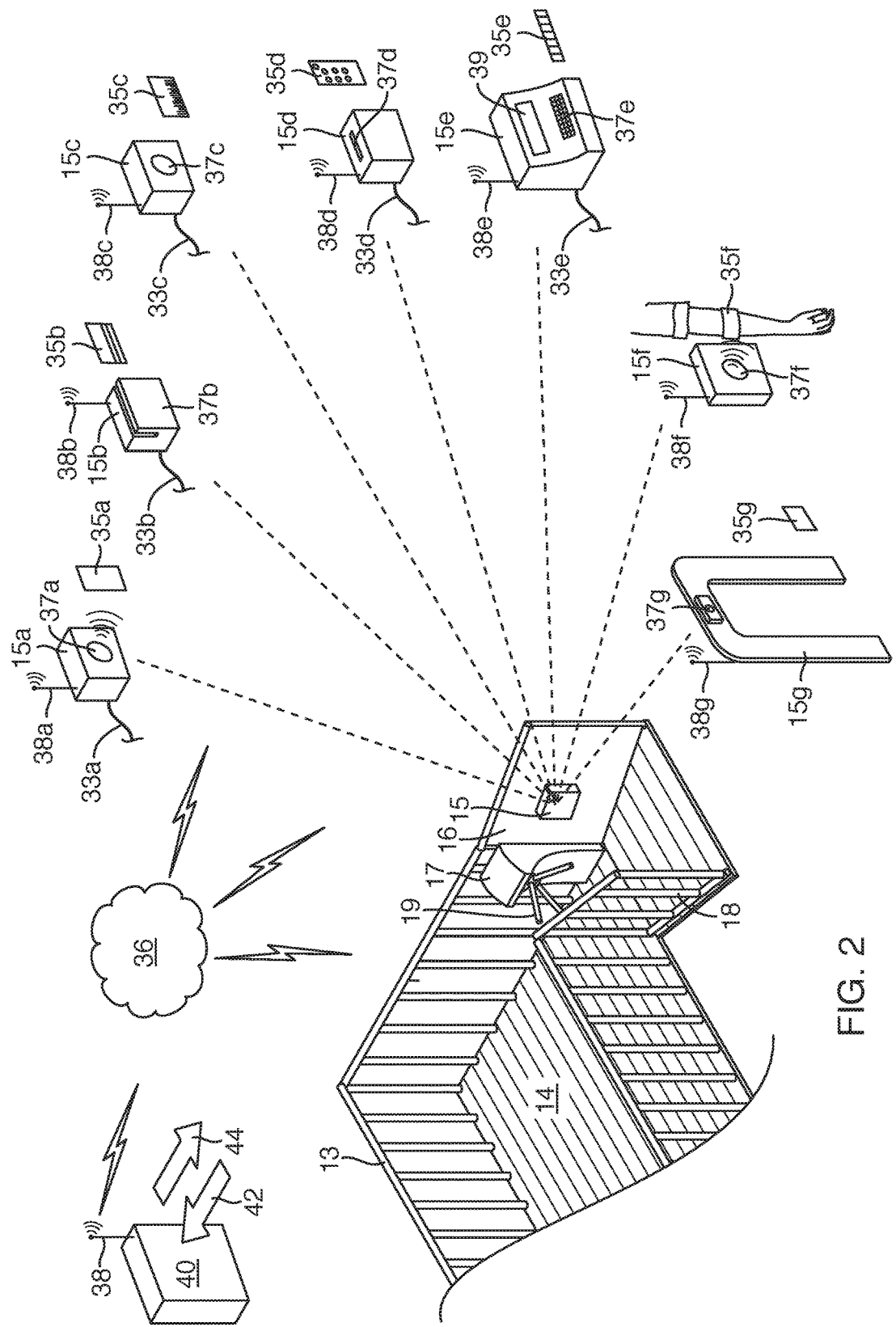
FIG. 2 is a perspective, exploded view thereof, showing various optional readers and corresponding targets suitable for use in the upper and lower stations.

Referring to FIG. 2, a power source 33 or power line 33 may be provided for various readers 15. Readers 15 may take on various embodiments. For example, a reader 15a may operate as a radio frequency detector, such as RFID reader systems 15a. In such a system, a target 35a may be read by way of a sensor 37a communicating over a network 36 connected by a communication link 38. Thus, the communication link 38a connects the reader 15a to the network 36. The signal from the sensor 37a may be processed by the reader 15a, or may be simply transmitted or read.

Ultimately, a master controller 40 includes a computer system, tasked with receiving incoming data 42 from monitoring the portals 16, 26 and the readers 15, 25. Similarly, additional sensors may be provided, as well as local controllers, actuators, and detectors (like those described herein) for the access controls 17, 27 and the physical barriers 18, 28.

By the various modes of operation, signals from all sensors in the foregoing and other components may be transferred. They arrive as monitoring data 42 or incoming data 42 received by the master controller 40.

After processing the incoming data 42, the master controller 40 provides commands 44 or authorization 44 back to various devices in the system 10. For example, actuators and locks may be opened or enabled for the access controls 17, 27, the physical barriers 18, 28, as well as the cable close gate 30, the launch block 32, and so forth. Detectors 34 typically need not have any controls associated therewith. That is, there is no need for a command to be received by in every embodiment of the detector 34.

Such straightforward functionality as turning on, turning off, polling, reporting, and the like may be programmed to involve commands sent to detectors 34, such as the terminal detector 34. Nevertheless, in other embodiments, the detector 34 may simply report a signal when polled. It may report activity on an interrupt basis as in various modern digital computer systems.

Figure 3:
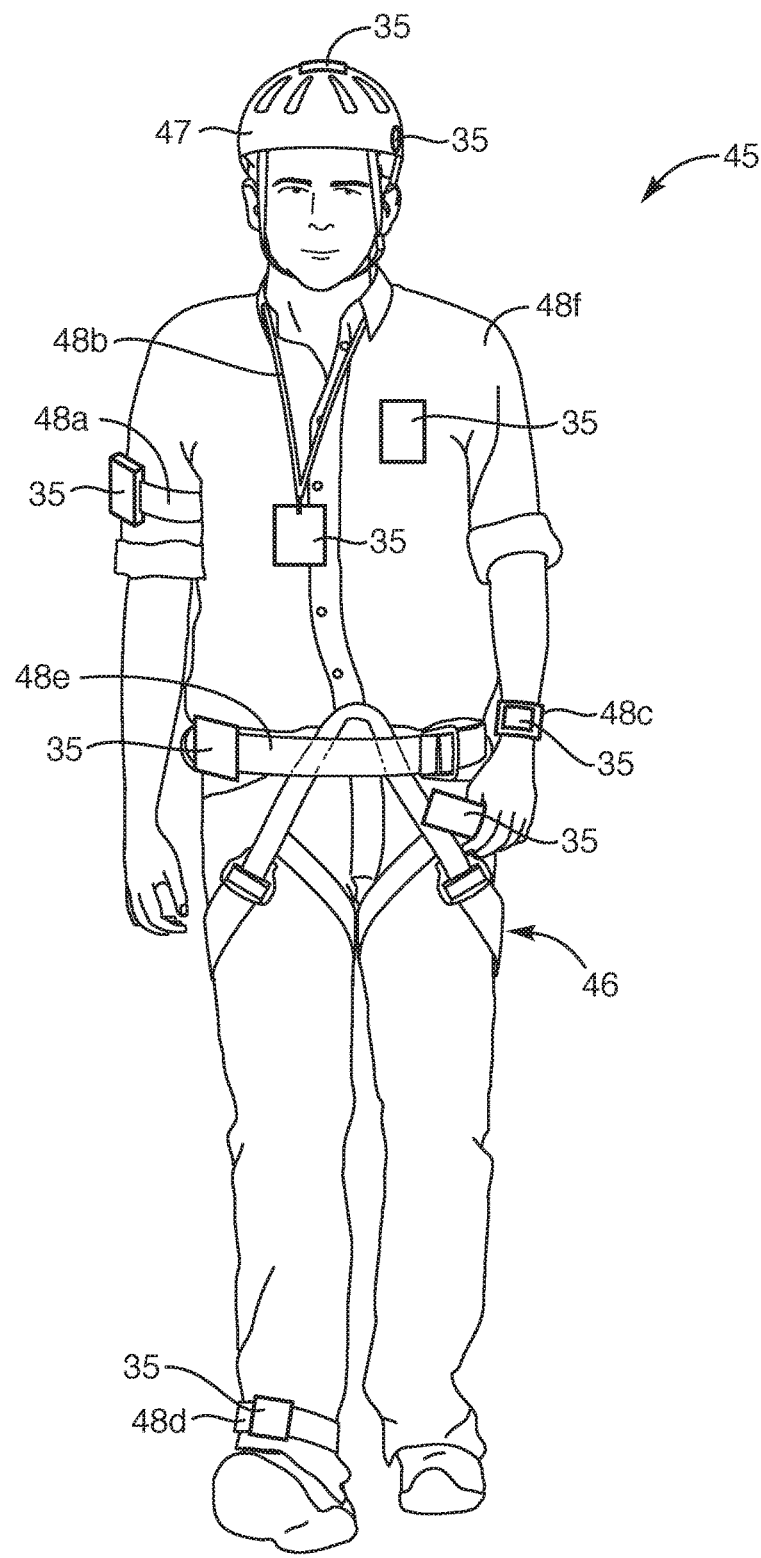
FIG. 3 is a perspective view of a rider in harness, and illustrating various types of targets that may be associated singly or together with a rider using a system in accordance with the invention.

Referring to FIGS. 2 and 3, the readers 15, 25 may be implemented in any of the embodiments illustrated in FIG. 2, or others. For example, the reader 15b relies on a card 35b such as a magnetic card in order for a sensor 37b to detect data from the magnetic card 35b. Suitable power sources 33, such as a line 33a, 33b, or a battery, or the like may serve to power the reader 15 and the communication link 38.

One should note that it is proper herein to speak of any reference numeral alone, with any trailing alphabetical character, or both. That is, a reference number refers to a named item. A trailing reference letter refers to a specific instance of the item designated by the reference numeral.

Referring to FIG. 3, a rider 45 may be provided with a harness 46, helmet 47, and some securement 48, to any of which may be secured one or more targets 35 or passes 35. For example, in the illustrated embodiment, beginning clockwise from the top of the illustration, a target 35 may be replaced on the top of a helmet 47 to be read by a detector 37 or sensor 37 above the user 45, and having a field of view therebelow.

As another example, laser bar code readers 15 use a coherent beam of light, and may therefore read codes at a considerable distance on a target 35 or pass 35. Thus, such readers 15 above a user 45 passing through a portal 16, 26 may automatically detect and report a location and time of a user 45 identified by the target 35 or pass 35.

The target 35 on the side of a helmet 47 may operate in much the same manner. Also, in systems such as radio frequency identification systems 15a, passing by a portal 16, 26 may cause the proximity of the target 35 to be detected, read, and reported.

Likewise, if a shirt 48f operates as a securement 48, then a pass 35 or target 35 may be in a pocket, or secured to the shirt 48f. A wristband 48c may contain a target 35 easily presentable to a reader 15 at a fixed location at about waist height or above. For example, a user 45 may orient the wristband 48c and target 35 associated therewith near the sensor 37 of any reader 15 in order to provide identification, location, and time to the master controller 40.

The ankle band 48d illustrated may be well adapted to radio frequency detectors 37a, and certain bar code readers 15c. For example, if a reader 15 is positioned in a comparatively low position close to a deck 14, 24, then passage of a user 45 thereby will result in detection of the target 35 on the band 48d. Moreover, if feet must pass through a gate, they present ready orientation and comparatively restrictive distance with respect to a deck 14, 24 and reader 37.

Similarly, a belt 48e of a harness 46 may have attached thereto a target 35. Somewhat more cooperation from a user 45 may be required in order to assure that no arm, equipment, or other obstruction is between the target 35 and any individual sensor (reader) 37 needing to "view" that target 35. Nevertheless, such a location is unlikely to be damaged, obscured, or accidentally unavailable. Here again, convenience of the user 45 is one consideration. Nevertheless, a user 45 will be motivated to properly present a target 35 to a reader 15, inasmuch as the system 10 will not function until the reader 15 has received confirmation that a target 35 has arrived, indicating that the corresponding user 45 is in the correct place.

Similarly, a lanyard 48b may connect to a target 35 worn around the neck. One advantage of a lanyard 48b is that a user 45 may grip the target 35 on the lanyard 48b and present that target 35 to a particular sensor, of virtually any type. For another example, a reader 15e that provides a key pad 37e as the detector 37, may be served well by the presence of all key information being on the target 35 or pass 35 attached to the lanyard 48b. Similarly, various readers 15 may be presented (by the user 45) with the target 35 on the lanyard 48b from a variety of angles. Again, the size of the lanyard 48b may be selected to accommodate such access by readers 15.

As a practical matter, it has been official, indeed almost essential, that a user 45 receive feedback from a reader 15. For example, a user 45 or rider 45 needs to know from the reader 15 that a target 35 has been read, and has been accepted. Thus, for example, a sound, light, voice, image, text, or the like may be presented to a user 45 on a monitor screen 39 available on any reader 15. Thus, LED (light-emitting diode) lights, sounds, bells, alarms, voices, and the like may be provided as a monitor 39 on any reader 15 providing feedback to a user 45.

Just as a wristband 48c or ankle band 48d may provide a ready location and position for holding a target 35, so an arm band 48a may provide a proper securement 48 for a target 35. Of course, a user 45 may simply carry a target 35 or a pass 35 in the hand as well. Again, this may be interpreted as one variation of the lanyard 48b solution. If a user 45 is going to hold a target 35 or a pass 35 in a hand, then perhaps that hand should be permitted to simply release the target 35, and have a lanyard 48b or other tethering mechanism retrieve and secure that pass 35 for the next use.

In some respects, a pass 35 that is held in the hand provides for precision required by electronic equipment in various types of readers 15. Thus, any proximity sensor 37f, or any detailed data reader, such as magnetic card readers 37b, bar code readers 37c, or the like need not rely on automatic detection of a user 45, but an affirmative presentation by a user 45 of a pass 35 or target 35 for reading.

Figure 4:
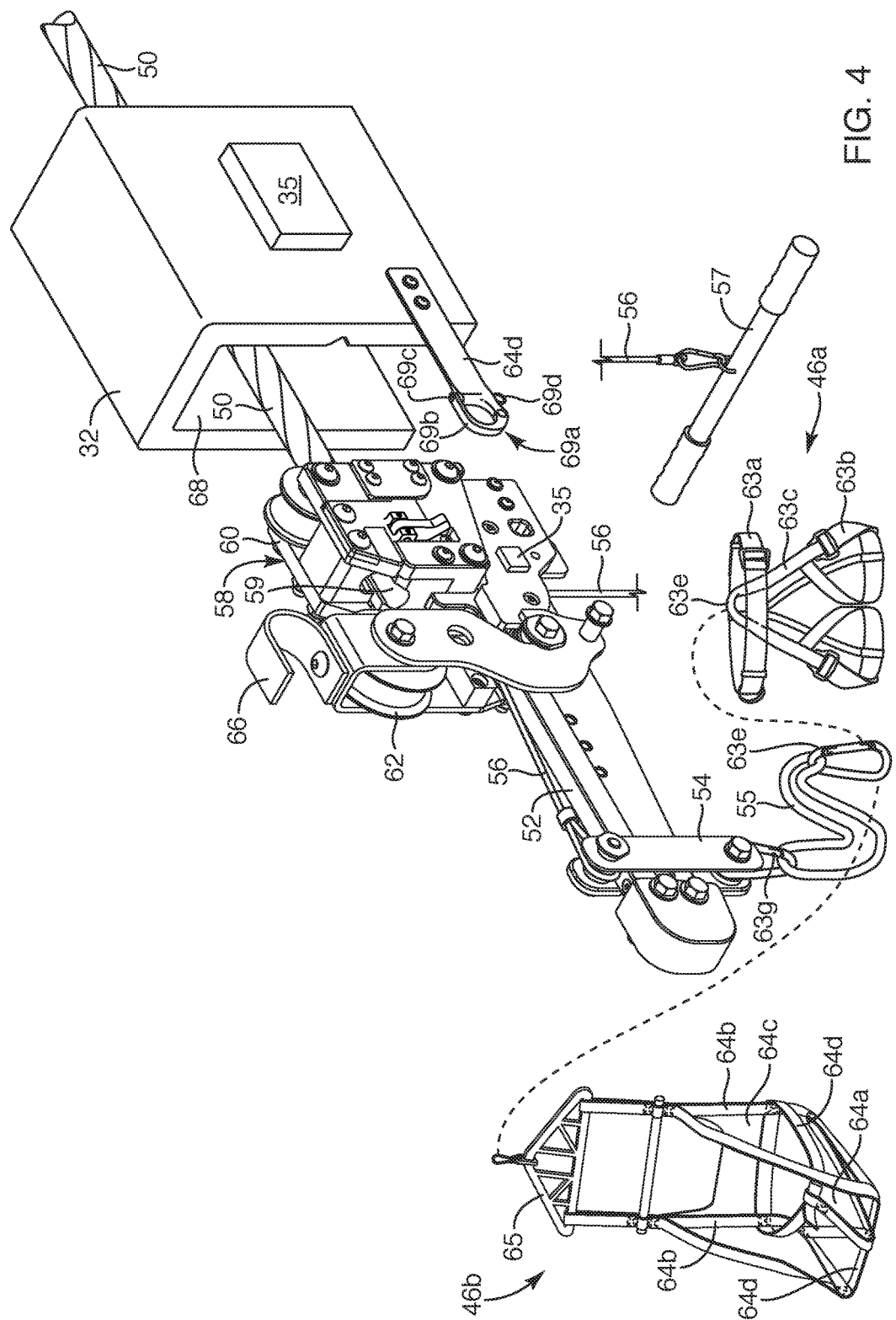
FIG. 4 is a perspective view of a trolley in accordance with the invention, illustrating a launch block, not yet registering the trolley in its secured position, and the trolley being connected in an exploded view to alternative embodiments of harnesses.
Figure 5:
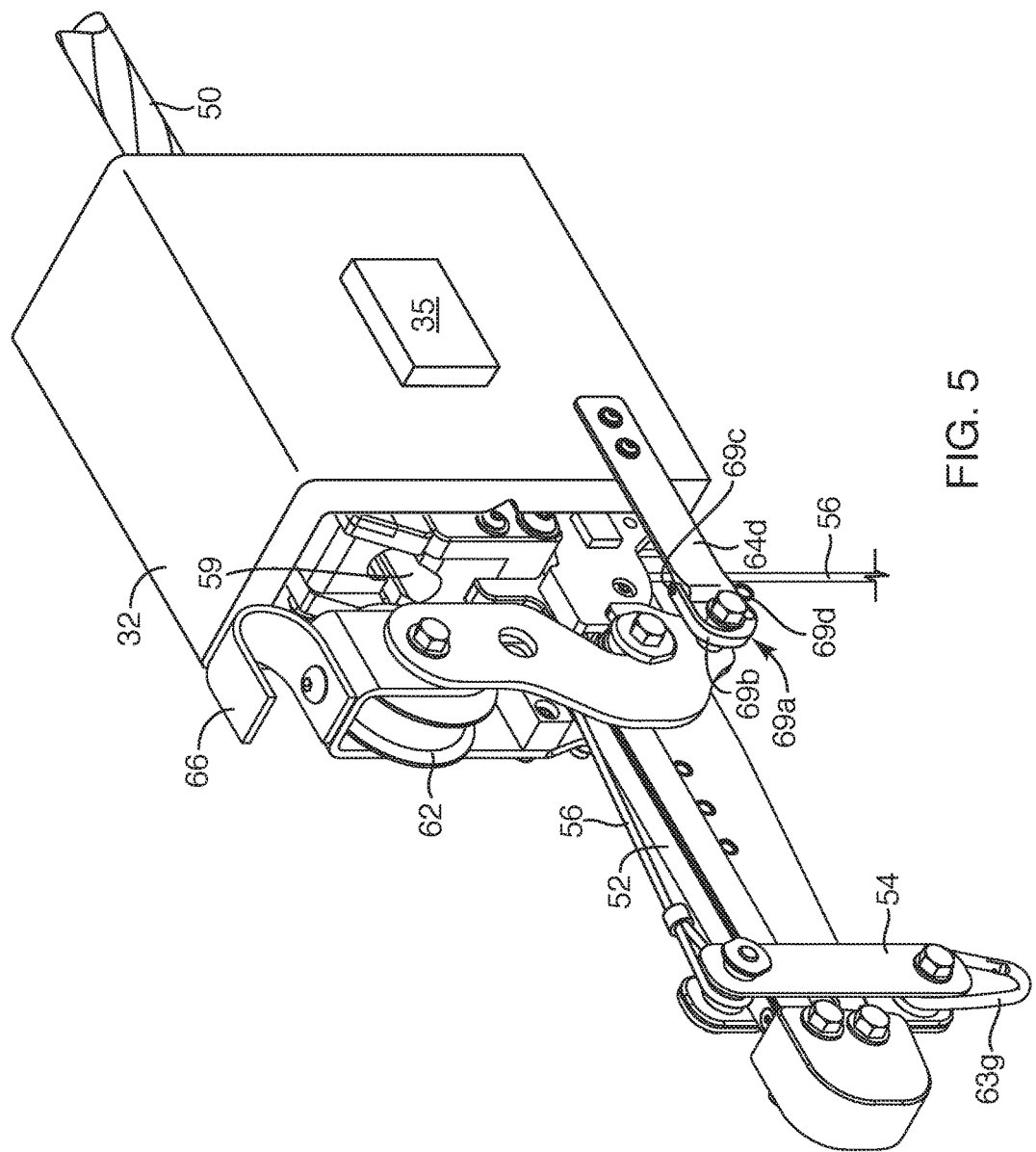
FIG. 5 is a perspective view of a trolley of FIG. 4, in accordance with the invention, illustrating a launch block now registered with the trolley in its secured position.
Figure 7:
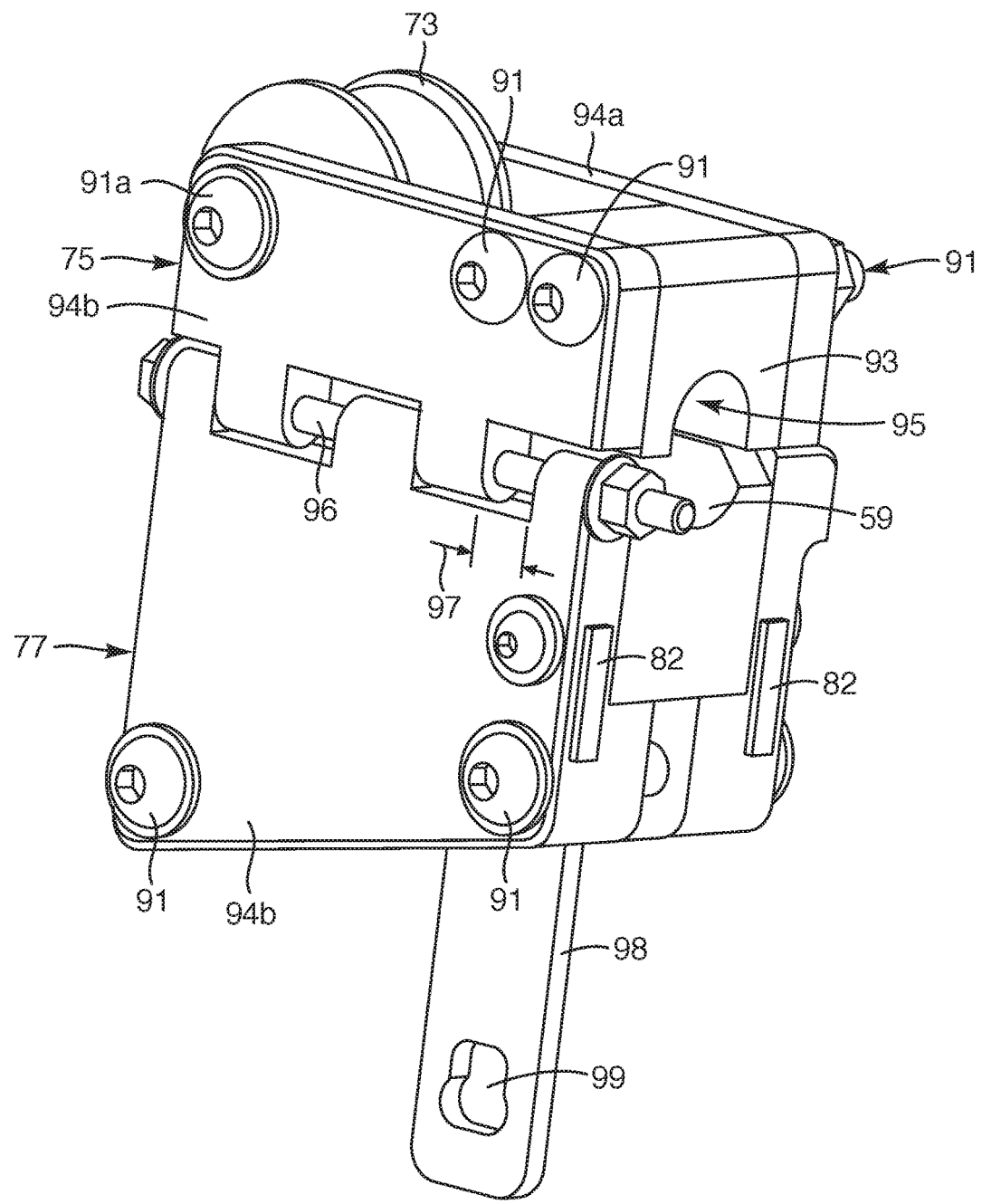
FIG. 7 is right side perspective view thereof.
Figure 8B:
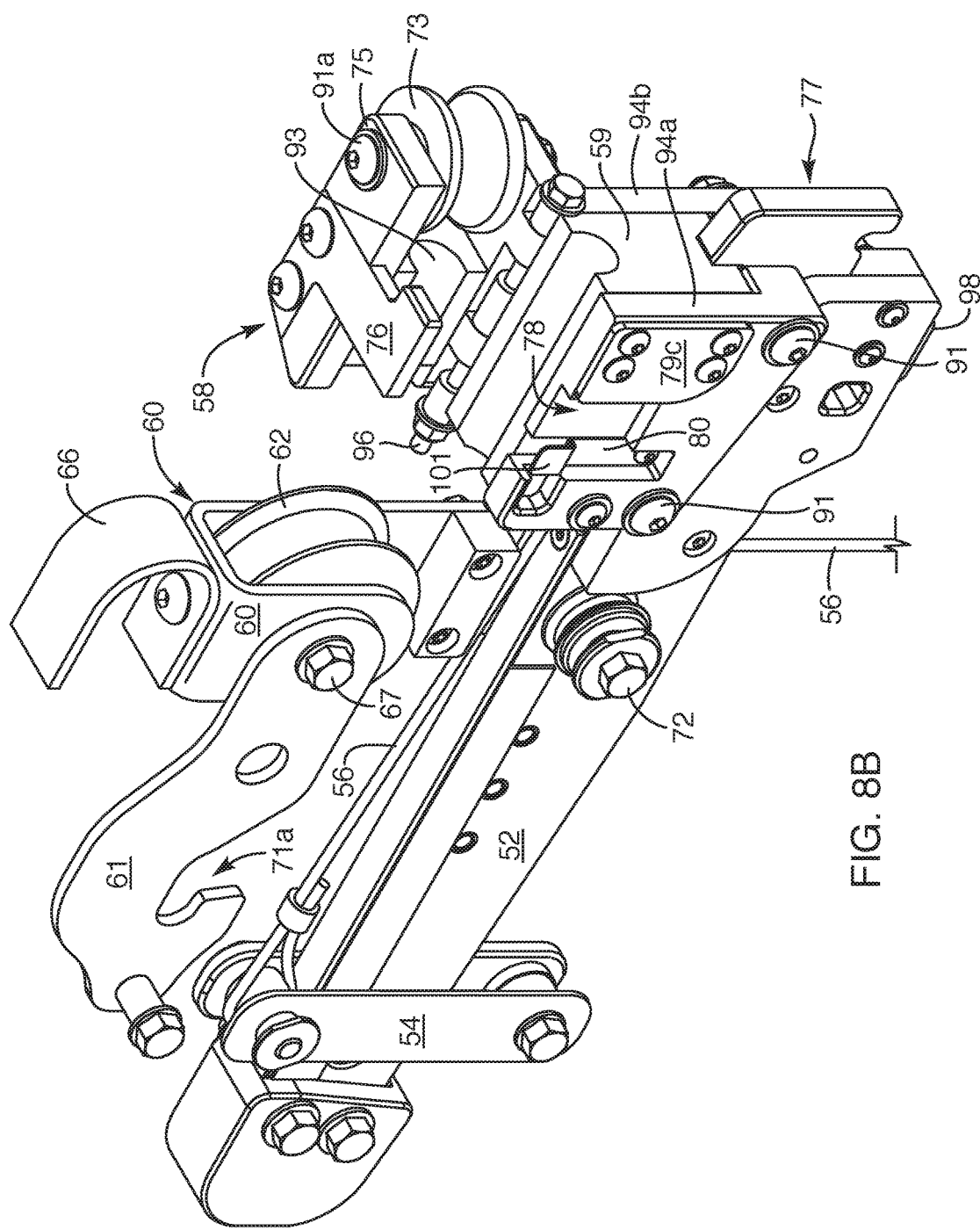
FIG. 8B is an upper quarter, left side, perspective view thereof with the brake system (caboose) open.
Figure 8D:
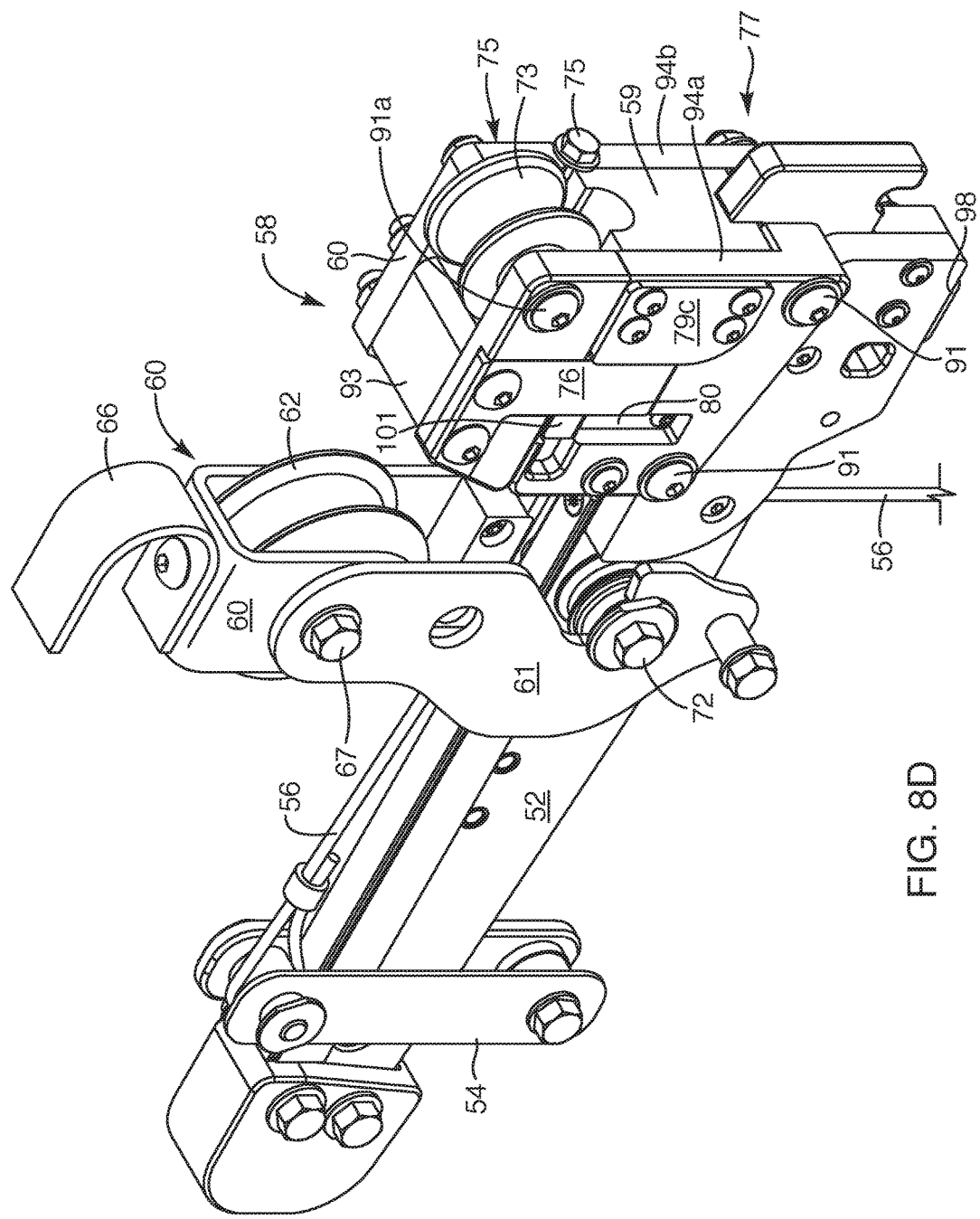
FIG. 8D is an upper quarter, rear perspective view thereof.
Figure 8E:
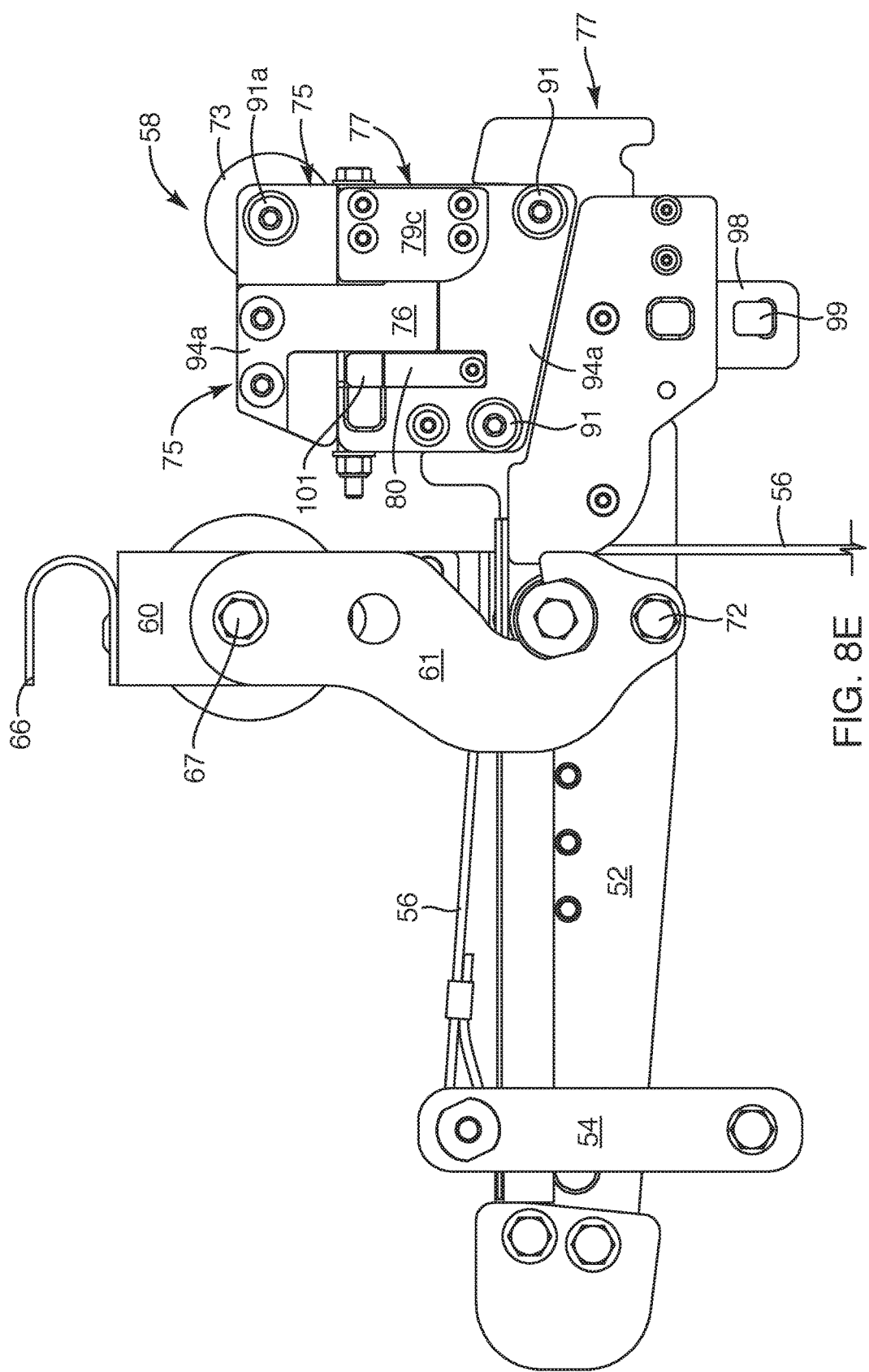
FIG. 8E is a left side elevation view thereof.
Figure 8F:
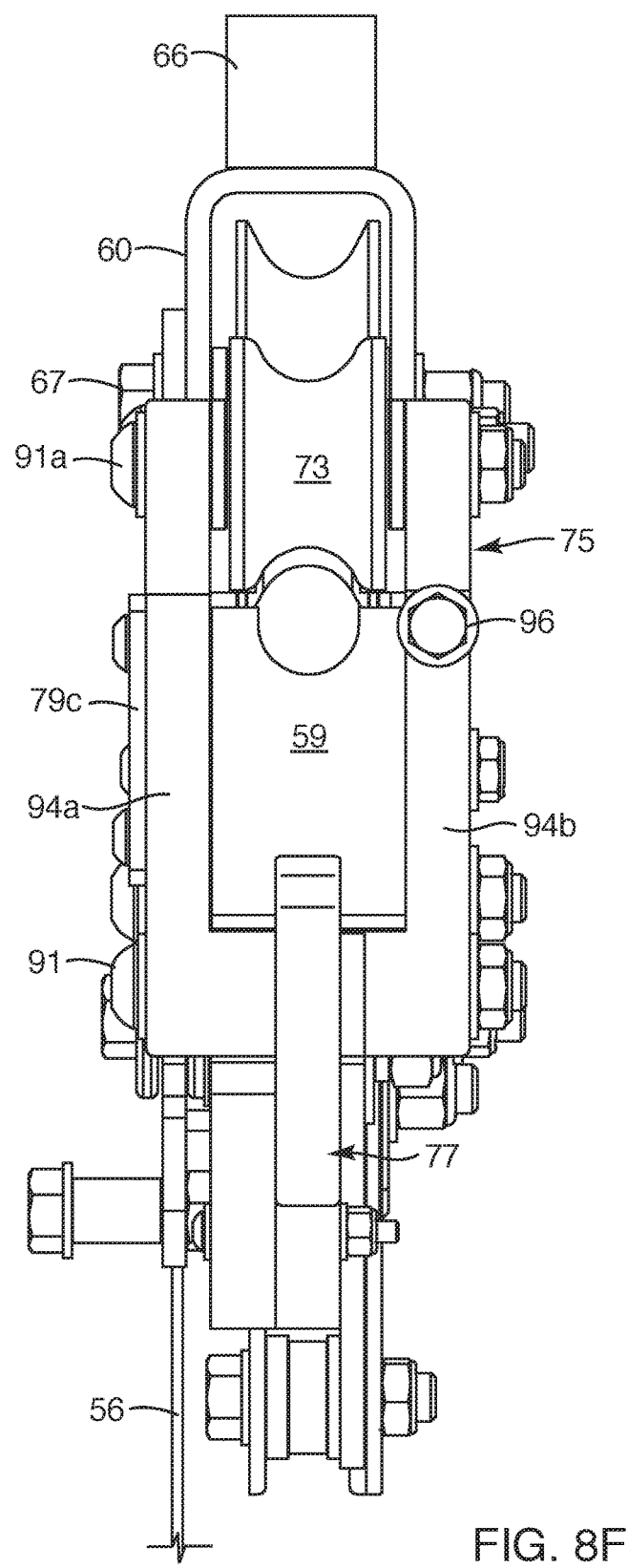
FIG. 8F is a rear elevation view thereof.

Referring to FIGS. 4 and 5, while continuing to refer generally to FIGS. 1 through 29, a trolley 50 may be configured in any one of the manners illustrated in the references identified hereinabove as incorporated herein by reference. Various trolleys 50 are illustrated therein, and described in great detail. In a system 10 in accordance with the invention, an arm 52 or lever 52 may operate as the frame 52 of the trolley 50.

To the lever 52 or arm 52 may be secured a hanger 54 movable therealong. The hanger 54 will typically operate as a slide 54 (on rollers or not) that can move along the arm 52. In one presently preferred embodiment, the hanger 54 is free to move along the arm 52, in accordance with control by a user 45. That is, a user 45, suspended in a harness 46 from a sling 55 or other attachment mechanism 55 may be able to pull on a tether 56 attached to a handle 57. For example, the tether 56 draws the hanger 54 along the arm 52, away from the extreme end thereof. In this way, the position of the effective weight of a user 45 transferred through the sling 55 to the hanger 54 changes the braking of the trolley 50.

In selected embodiments, the hanger 54 may be pinned at a specific location along the arm 52. For example, if a child is the rider, or if a user 45 does not desire to exercise braking control on the trolley 50, then the arm 52 may be fixed at a particular effective leverage, by positioning the hanger 54 at a specific location along the arm 52. This results in a constant braking force due to a fixed lever arm or lever advantage. Leverage exists between the hanger 52 on one end and the brake 58 on the other end. These pivot with about the bracket 60 or frame 60 about the axle 72 or pin 72 under the roller 62 or wheel 62 that rolls along the track line 20.

For example, in various embodiments illustrated in the references incorporated herein by reference, single- or multi-wheel 62 embodiments are described. Accordingly, a selected number of rollers 62 mounted in a frame 60 permit the trolley 50 to roll along the track line 20. The leverage of the arm 52, and specifically the weight of a user 45 suspended from the hanger 54 by a sling 55 or other securement 55 provides leverage about the fulcrum that is the roller 62 in the frame 60.

The brake system 58 provides frictional braking against the track line 20 by the brake 58 according to the force applied the hanger 54 by a user 45. Thus, one may see that as described in the references incorporated herein by reference, the hanger 54, if mobile along the arm 52, may be drawn by the tether 56 to move the effective lever arm (change the leverage advantage) of a user 45 or the weight of a user 45. This multiplied force is effectively applied as the normal force in applying friction by the brake 58, where friction drag force is a constant multiplied by the normal force.

Various types of harness 46 may be suitable. For example, the harness 46a is a climbing harness typically used in rock climbing, rappelling, and in some inspection, and other servicing of items at heights that may be dangerous to a user 45. For example, whether working on a roof, a tower, a track line 20, a ski lift, or the like, a climbing harness 46a may be donned by a user 45.

A seat 46 or harness 46 may be configured as a climbing harness 46a. It has a belt 63a as well as leg loops 63b in this example. The leg loops 63b are connected by a lateral tie 63c extending therebetween and sewn together carefully by certified methods in order to assure an ability to provide lifesaving strength in the event of a fall. Meanwhile, a vertical tie 63d connects the lateral tie to the belt 63a. Typically, a link 63e such as a carabiner 63e will connect a sling 63f (such as sling 55) between the link 63e and a link 63g connecting to the hanger 54.

In an alternative embodiment, a harness 46 may be configured more like a chair 46 having a seat 64a suspended from vertical risers 64b. Likewise, the seat 64a may continue to a seat back 64c. Meanwhile, various reinforcement straps 64d may provide substantial additional support for the harness 46b. In this way, for example, the seat 64a and seat back 64c provide comfort, but the maximum safety support in case of emergency is provided by the main straps 64d of the harness 46b.

A spreader bar 65 may provide for comfort, ease of mounting and dismounting the harness 46b, and the like. Again, spreader bars 65 have been discussed in great detail in the patent documents incorporated herein by reference. Significantly, the spreader bar 65 may replace all or part of the length of a sling 55. Alternatively, a spreader bar 65 may be suspended from a sling 55.

At an upper end of a track line 20, above the deck 14 of the upper station 12, the launch block 32 provides registration of the trolley 50. In the illustrated embodiment, the trolley 50 includes the main roller 62 supporting it and a caboose 58 providing braking.

Referring to FIG. 5, a trolley 50 may fit part of its caboose 58 within a launch block 32. By fitting the entire width 102 of the caboose 58 or brake system 58 within the launch block 32 various registration interlock functions are enabled. A width 102 or thickness 102 of the caboose 58 needs to fit in the launch block 32. The height of the caboose 58 needs clearance for motion up and down.

The brake system 58 or caboose 58 has a thickness 102 that fits within a receiver 81 formed in the launch block 32 in order to register spatially and engage for interlocking.

To remove and install the trolley 50 on a track line 20, the swing arm 61 or gate 61 must be cleared of the pin 72 that operates as the pivot 72 about which the lever arm 52 is supported and tilts. Typically, a swing arm 61 pivots about an axle 67 of itself and of the wheels 62, once the pivot pin 72 of the arm 52 has been lifted sufficiently high to release out of the slot 71a. By lifting the lever arm 52, the pin 72 or axle 72 is lifted within the slot 71a. Meanwhile, the pin 72 also lifts in the slot 71b in the frame 60 or housing 60 opposite the swing arm 61 of the frame 60. The slot 71a, having an "L" shape, will not release the pin 72, until the pin 72 rises in the slot 71a. Thereafter, since the slot 71b cannot move, longitudinally along the direction of the lever arm 52, with respect to the pin 72, the swing arm 61 must swing forward, thereby releasing out the pin 72 to exit the opening of the slot 71a.

Thereafter, the opening of the swing arm 61 by pivoting it in a forward direction with respect to the axle 67, provides access to the track line 20 supporting the roller 62 or pulley 62. However, the removal of the trolley 50 from the track line 20 requires removing the roller 62 from riding on the track line 20. Thus, the brake system 58 must also open.

To remove the trolley 50 therefore requires that the top cage 75 of the caboose 58 be flipped open to release the track line 20 captured therewithin.

The caboose 58 will be described in more detail hereinbelow. However, suffice it to say that the caboose 58 includes a base 77 or frame 77. The frame 77 holds an axle 96 that secures the top cage 75, pivotally linked to the frame 77. An interlock system 74 provides securement and selective release of the top cage 75 to pivot about its axle 96. Pivoted into an open position, the top cage 75 exposes the track line 20 therewithin, thus permitting removal of the trolley 50 from the track line 20.

Referring to FIGS. 4, 5, and 9B, one will notice a snap shackle 69a. The snap shackle 69a may fit about the pin 72 captured within the snap shackle 69a. In general, a release mechanism may be configured in any number of ways. In one embodiment, a snap shackle 69a may include a catch 69b that is captured by a pin 69c. The snap shackle 69a may be mounted on a cable, or an arm 64d.

The arm 64d is secured to the launch block 32. The catch 69b of the snap shackle 69a engages the pin 72 that acts as an axle 72 for the lever arm 52. The arm 64d and snap shackle 69a act as a gauge to measure and prove a distance between the launch block 32 and the pin 72. Thus, the caboose 58 must properly fit within the launch block 32 for the pin 72 to be close enough to fit within the catch 69b of the snap shackle 69a. Other attachment schemes and latches or catches are discussed hereinbelow.

In the illustrated embodiment, withdrawing a pin 64c extending into the extreme end of the catch 69b, releases the catch 69b to pivot away, thus releasing the pin 72 and the trolley 50 from engagement with the launch block 32.

Referring to FIGS. 6A through 6C, 7, and 8A through 8F, while continuing to refer generally to FIGS. 1 through 29, a caboose 58, or brake system 58, may include various components. For example, the brake system 58 or caboose 58 may include a pad 59 mounted within. Typically, the caboose 58 is spaced some distance away from the frame 60 for the roller 62 or main wheel 62. Typically, the brake system 58 is fixed in effective rigid body motion with respect to the lever arm 52. In fact, the lever arm 52 may fit within side plates 94 forming a frame 94 of the caboose 58.

In the illustrated embodiment, the top cage 75 is pivotable with respect to the frame 77 formed by the side plates 94. A significant feature of the caboose 58 is an interlock system 74. For example, the top cage 75 is provided with a slide lock 76. The slide lock 76 actually represents sliding of the entire top cage 75 with respect to the frame 77. The slide lock 76 fits into a relief region 78 on the frame 77.

Typically, the relief region 78 includes a main seat region 79a and an interlock region 79b. The slide lock 76 initially pivots about the axle 96 down with the top cage 75, until the slide lock 76 fits into the main seat 79a. Then, the extreme end of the "L"-shaped slide lock 76 moves rearward into the interlock seat 79b or interlock space 79b. This action requires that the entire top cage 75 and slide lock 76 slide backward or rearward along the axle 96 to fit the slide lock 76 into the interlock region 79b of the relief region 78. This places the distal end of the slide lock 76 under a keeper 79c restricting the top cage 75 from pivoting out of position. Thus, the top cage 75 and slide lock 76 pivot in rigid body motion together until the slide lock 76 is in the relief region 78, seated in the main seat 79a. After sliding backwards, the top cage 75 and slide lock 76 secure the distal end of the slide lock 76 under the keeper 79c in the interlock seat 79b.

Once the slide lock 76 has pivoted and slid properly into a locked position, an interlock 80 or dog 80 pivots down into the relief region 78 blocking the slide lock 76 from sliding back out. The interlock 80 may be spring loaded, biased, or simply operate by gravity. However, the interlock 80 not only interlocks with the slide lock 76, to keep the slide lock 76 in place, but operates as a barrier to entry of the caboose 58 into the receiver 81 of the launch block 32.

If the interlock 80 cannot fit down into the relief region 78, in a portion of the main seat 79a, then the slide lock 76 is not in the proper, closed position. Once the slide lock 76 is in the proper, closed position, the interlock 80 may fit down into the relief region 78. Thus, the extension at the end of the interlock 80 is properly positioned to fit within a slot 103 formed in the launch block 32 for exactly that purpose. Thus, the interlock 80 operates not only as an interlock 80 for the slide lock 76, but also for the entire caboose 58 fitting into the launch block 32.

After entering the opening 81, targets 82 on the back surface or rearmost surface of the caboose 58 are detected by sensors 83, such as proximity sensors 83. Meanwhile, a detent 84 or latch system 84 locks the caboose 58 into the launch block 32. For example, an actuator 85, such as a solenoid 85 may operate activating surfaces 86 in order to engage the contacts 87a, 87b between the frame 77 of the caboose 58, and the launch block 32.

The detent 84 may have a spring 88 provided by a spring force favoring engagement. Thus, the actuator 85 may withdraw the detent 84 only upon receiving the proper signal of control (e.g., from the controller 40) and the power required to operate the actuator 85 to withdraw the detent 84. Typically, the registration face 89 on the launch block 32 will fit against the detent 84.

In various embodiments, an actuator 90 or trigger 90 may operate to withdraw the detent 84 from contact 87a, 87b between the detent 84 and the frame 77 of the caboose 58.

The caboose 58 may be secured by various fasteners 91 or bolts 91. Some may serve as dual purpose fasteners 91, such as the axle 91a. Each of these fasteners 91 may be secured by a keeper 92 or threaded directly into one of the side plates 94. Spacers 93 may maintain a distance between the side plates 94. Meanwhile, the brake shoe 59 or pad 59 also serves as a spacer 93 between the side plates 94.

The pad 59 and the top cage 75 are shaped to provide a way 95 or passage 95 sized to receive the track line 20. To fit the track line 20 into the way 95, the swing arm 61 must be removed from the pin 72, and rotated forward. Meanwhile, the top cage 75 must slide forward along its axle 96 until the clearance 97 has been taken up. By sliding, the slide lock 76 is freed from the constraint of the keeper 79c. Once free, pivoting of the slide lock 76 with the top cage 75 removes it from the relief region 78. Thus, as the top cage 75 pivots about its axle 96, the way 95 has been opened to release the track line 20 from capture therewithin.

The caboose 58 may include a hanger 98 having an aperture 99 therein for receiving a fastener 63e, such as a carabiner 63e for a belay line. This line is a second level of protection in case of a failure of another component of the system 10.

For example, typically, the hanger 54 supports a sling 55 and harness 46. Meanwhile, the harness 46 on a rider 45 is also secured by a belay line (e.g., another sling 55) to the hanger 98 as an emergency precaution. Thus, the brake system 58 operates as an additional support capable of supporting a rider 45 on the track line 20. This support operates in even the most extreme condition of having the hanger 54 fail, or following a failure of the pin 72, the lever arm 52, the main frame 60 or the like.

Referring to FIGS. 8A through 8F, while continuing to refer generally to FIGS. 1 through 29, the interlock 80 may alternatively be configured as a spring-loaded or an elastically deflecting interlock 80. In this embodiment, the interlock 80 is formed to spring out away from the relief region 78. Meanwhile, a button 101 extends above the surface of the remainder of the interlock 80.

In this embodiment, the slide lock 76 pivots into place, under force, thereby depressing the button 101 and deflecting the interlock 80. Once the slide lock 76 has depressed the button 101, and entered fully into the relief region 78, the slide lock 76 is in a position to slide rearward under the keeper 79c.

As the slide lock 76 slides with the top cage 75 rearward, the slide lock 75 fits under the keeper 79c. Once clear of the interlock 80, the slide lock 76 passes off and releases the button 101, permitting the interlock 80 to spring back out. Once in the outer or unstressed position, the interlock 80 obstructs and prevents the slide lock 75 from moving forward out from under the keeper 79c. The button 101 then protrudes to interfere, and thereby acts as a restraint against motion of the slide lock 76 in a forward direction. Thus, the top cage 75 is prevented from moving forward and out of a locked position.

The slide lock 76 may be released by depressing the button 101, thus deflecting the interlock 80 sufficiently to permit the slide lock 76 to slide forward with the top cage 75. Once forward, and completely clear of the keeper 79c, the slide lock 76 may pivot up with the top cage 75 about the axle 96 to an open position.

Referring to FIGS. 9A through 9C, while continuing to refer generally to FIGS. 1 through 29, various alternative mechanisms may exist for securing the caboose 58 within the launch block 32. For example, some portion of the frame 77 may fit within the launch block 32. A latch 84 or detent 84 may be operated by an actuator 85, such as a solenoid 85. Typically, the latch 84 may have a spring 88 or spring portion 88 that biases the latch 84 into engagement with the frame 77. For example, registration surfaces 89a, 89b may engage to capture the frame 77 by the latch 84 of the launch block 32. Upon operation of the actuator 85, the spring 88 may be overcome, withdrawing the latch 84 from engagement with the frame 77.

Engagement may occur by contact between the contact surfaces 87a, 87b. The contact surfaces 87a, 87b may first come into contact by relative motion (linear translation) between the frame 77 and the latch 84 of the launch block 32. The contact surfaces 87a, 87b engage, thus driving the latch 84 away from the frame 77. Eventually, upon coming to a proper registration position, the surfaces 89a, 89b pass one another, clearing for engagement. At this point, the spring 88 biases the latch 84 to slide into engagement with the frame 77. Again, the actuator 85 may overcome the bias of the spring 88, and withdraw the latch 84, thus removing the surfaces 89a, 89b from engagement with one another.

Setting the trolley 50 on a track line 20 is typically a matter of opening a frame 60 and a brake system 58 (caboose 58). The frame 60 is typically opened by rotating a swing 61 or swing arm 61 about an axle 67 or pivot point 67 to provide an opening within the frame 60 into which the track line 20 may pass. In reality, it is the frame 60 that moves into a position around the track line 20. The track line 20 does not typically move.

Rather, the trolley 50 is lifted to the track line 20, with the swing arm 61 open in the frame 60. Thereby, the wheel 62 or roller 62 is engaged on the track line 20. Upon engagement of the track line 20 by the wheel 62, the swing arm 61 may be rotated or pivoted downward and rearward (where rearward is with respect to the ultimate direction of travel of the trolley 50). Thus, the track line 20 is captured within the frame 60, by the swing arm 61. In certain embodiments, the swing arm 61 may be provided with a slot that is 'L' shaped.

The slots 71a, 71b permit the swing arm 61 to receive a pin 72 fixed to the frame 60. The pin 72 moves into the foot of the 'L,' where the 'L' is actually upside down and backwards. In other words, the 'L' is flipped downward, or the leg of the 'L' flips down in rotation about the foot of the 'L' as an axis. Thus, the pin 72 passes into the rear side of the slot 71, as the swing arm 61 rotates downward and rearward.

Once the trolley 50 is supported on the track line 20 by the wheel 62 or roller 62, sometimes called a pulley 62, the frame 60 supports the entire trolley 50 on the track line 20, and the pin 72 drops in the slot 71a. For example, the lever arm 52, by virtue of its weight, drops down along the leg of the slot 71, thus capturing the swing arm 61 against any further movement. In this position, the swing arm 61 and the remainder of the frame 60 completely surround the wheel 62, the track line 20 captured therebelow, and secured to the lever arm 52. At this point, the trolley 50 is secure and non-removable.

With support on both sides of the frame 60, by virtue of the frame 60 and swing arm 61 securing to the pin 72, the trolley 50 may be considerably lighter than other configurations. That is, no open frame nor cantilevered support is required. Since the pin 72 operates as an axle 72 for the pivoting of the lever arm 52, the frame 60 including its swing arm 61 provide adequate, secure, lightweight support for the trolley 50 on the track line 20.

Setting the trolley 50 on the track line 20 typically involves opening the swing arm 61, as well as opening the brake system 58 or caboose 58. The swing arm 61 rotates forward about its axle 67 after the lever arm 52 has been lifted in the slots 71a, 71b formed in the frame 60 and swing arm 61. The slot 71b on the solid portion of the frame 60 is straight. The slot 71a on the swing arm 61 is L-shaped.

Thus, to set a trolley 50 on a track line 20, it is necessary to open the frame 60 by swinging the swing arm 61 forward about its axle 67. It is likewise necessary to open up the brake system 58 or caboose 58 by releasing the interlock 74 thereof, thus releasing one side of the brake system 58 or caboose 58 to rotate or pivot away from the swing arm 61.

Once the swing arm 61 swings forward to open, and the top cage 75 of the caboose 58 or brake system 58 has been pivoted away from the swing arm 61, the track line 20 fits under the wheel 62 in the frame 60, and passes over the brake pad 59 of the brake system 58. The forces applied by the wheel 62 and brake pad 59 create a "couple" (offset, opposing forces producing a movement or torque) as understood in engineering statics.

Closing the trolley 50 on the track line 20 involves rotating swing arm 61 circumferentially or arcuately downward and rearward to engage the pin 72 in the slot 71a.

The top cage 75 or closure 75 of the caboose 58 or brake system 58 may be pivoted across, toward the swing arm 61, to pass over the top of the track line 20. Thus, the closure 75 of brake system 58 or caboose 58 does not actually ride or continually contact the track line 20. Rather, the lever arm 52 tends to decline or drop, lifting the brake system 58 until the pad 59 contacts the bottom side of the track line 20.

In this position, the weight of a rider 45 suspended from the hanger 54 on the lever arm 52 by the sling 55 provides weight (e.g., force) on the lever arm 52, pivoting about the pin 72. The pin 72 or axle 72, acting as a fulcrum 72, elevates the brake system 58, applying leveraged force of the pad 59 against the bottom side of the track line 20.

The actual weight of a rider 45 suspended in a harness 46 on the tether 56 from the slide 54 provides the actual braking force. The details of operation of such a trolley 50 are described further and illustrated in the references incorporated herein by reference.

For example, the interlock system 74 includes a top cage 75 provided with a slide lock 76. The top cage 75 pivots toward the swing arm 61, and toward the track line 20 positioning the slide lock 76 within the frame block 77. The frame block 77 provides a substantial part of the support for the pad 59 in the braking system 58. The frame block 77 may be called a caboose block 77, since it forms the principal structure 77 or supporting structure 77 for the caboose 58.

The caboose block 77 or frame block 77 is provided with a relief portion 78 fitted to the slide lock 76. Thus, after the top cage 75 has been closed, the slide lock 76 comes into the relief 78 or fits into the relief 78 of the caboose block 77. The relief 78 includes both a main seat 79a, into which the slide lock 76 fits, and interlock seat 79b into which the foot of the slide lock 76, or a bottom most portion thereof may slide. Thus, the slide lock 76 fits into the relief region 78 extending below the outer surface of the frame block 77 or caboose block 77.

Thereafter, the rider 45 slides the slide lock 76 rearward (with respect to the direction of motion that the trolley 50 will eventually take) thus sliding the slide lock 76 under a keeper 79c. In this position, the slide lock 76 can no longer pivot out of the relief region 78. Moreover, the entire top cage 76 is now locked against the frame block 77 or caboose block 77. Meanwhile, another interlock 80 (dog 80) pivots down to drop into the relief region 78 just forward of the slide lock 76 in its rear-most position. Thus, the slide lock 76 is now trapped under the keeper 79c, unable to move forward in the relief region 78.

That is, the interlock 80 has dropped into the main seat 79a ahead of the slide lock 76 or in front of the slide lock 76. Thus, the interlock 80 or safety dog 80 has now interlocked the slide lock 76 into place, while the keeper 79c provides the force of a fixed relationship to the main seat 79a of the relief region 78. This arrangement fixes the slide lock 76 against any relative motion with respect to the frame block 77 or caboose block 77.

In the illustrated embodiment, the caboose block 77 may include various structural components, fasteners, and the like. In the illustrated embodiment, the caboose block 77 will fit substantially in its entirety, or at least its entire width, inside the launch block 32.

Also, for example, a launch block 32 may include an opening 81 or receiver 81 sized to fit the width of the entire caboose block 77 or frame block 77. Meanwhile, the caboose block 77 is provided with one or more targets 82 that are metallic, and specifically contain substantial iron. These targets 82 will be detected by sensors 83 such as proximity sensors 83 in the launch block 32. The rider 45 rolls the trolley 50 backward or rearward along the track line 20 to fit the caboose block 77 inside the receiver 81 of the launch block 32. The launch block 32 includes a detent, which may be a bar 84, a latch 84, or the like operated by an actuator 85 such as a solenoid 85.

Thus, an activating surface, typically associated with a protrusion 86 having a slope associated with it, or angle, will contact the detent 84, pushing the detent 84 some distance out of its equilibrium position. Upon reaching a contact surface 87a on the detent 84 by a contact surface on the caboose block 77, the detent 84 automatically moves into engagement, placing the contact surfaces 87a, 87b in contact with one another. Due to a spring 88 applying a bias force to the detent 84, the activating surface 86 effectively comes to an end at the contact surface 87b.

At that point, the contact surfaces 87a, 87b slide into engagement, urged by the spring 88 pushing the detent 84. Typically, the contact surfaces 87a, 87b are engaged when the targets 82 approach a registration face 89 on the launch block 32. Thus, the sensors 83 approach the registration face 89, typically making contact at about the same time or position that the contact surfaces 87a, 87b engage with one another.

Typically, the registration face 89 will represent a physical bumper position, and the targets 82 may actually be recessed slightly. Typically, targets 82 will be set away from the proximity sensors 83 a distance of from about one to about three millimeters. Thus, actual contact will typically not occur between the targets 82 and the sensors 83. Instead, the registration face 89 will contact the caboose block 77 with sufficient clearance to permit engagement by the contact surfaces 87a, 87b.

The proximity sensors 83 are thus engaged or activated to report once a user 45 has set 204 the detent 84 or lock 84. An audible click may be heard, and the trolley 50 will be secured to the launch block 32 by engagement between the launch block 32 and the caboose block 77.

Setting the lock 84 may be tested 205 both by physical observation that the trolley 50 is locked into the launch block 32, as well as by lights, or the like verifying that the caboose block 77 is secured within the launch block 32. Typically, reporting 206 or enabling 206 involves detection 206 indicating to the master controller 40 and other intervening devices that the proximity sensors 83 are in sufficiently close proximity to the targets 82, thus indicating a proper positioning of the caboose block 77 of the trolley 50 with respect to the launch block 32.

An actuator 90 may actually be thought of as a trigger 90 that will release the caboose block 77 from the launch block 32. Once free, the caboose block 77, fixed to the trolley 50, will descend along the track line 20. However, the departure process may involve numerous safety mechanisms or interlocking devices and procedures.

The interlock system 74 includes a largely mechanical interlocking of the top cage 75, by the slide lock 76 securing the top cage 75 with respect to the caboose block 77. Meanwhile, if the slide lock 76 does not fit down into the relief region 78, then the caboose block 77 will not fit within the receiver 81 of the launch block 32. By the same token, if the slide lock 76 has not slid sufficiently rearward to permit the safety dog 80 or mechanical interlock 80 to fit down in front of the slide lock 76 in the main seat 79a of the relief region 78, then the safety dog 80 extends too far away from the outer perimeter of the caboose block 77. In this event, the caboose block 77 will not fit within the receiver 81.

As a practical matter, because the brake pad 59 may eventually wear, the brake system 58 or caboose 58 may eventually pivot, and rise with respect to the track line 20. Thus, space to accommodate vertical motion of the caboose 58 or brake system 58 within the receiver 81 is provided. However, clearance from side to side is sufficiently close between the caboose 58, and particularly the caboose block 77 and the side walls of the receiver 81, that only a properly closed and secured top cage 75 will be permitted to pass into the receiver 81. Thus, mechanical interlocks provide safety.

Triggering by a user 45 typically involves mechanical release of a release link 108 or the like. Meanwhile, triggering also involves release from the launch block 32.

For example, a release link 108 has a highly leveraged securement loop 69a in which a comparatively modest, virtually unloaded (without force), bracket 69a is secured about the catch 69b. Thus, the snap shackle loop 69a provides significant leverage advantage for the rider 45. Upon release of the pin 69c, by a rider 45, the snap shackle loop 69a is free to open. The comparatively small size and weight of the actuator element 69*d* causes the actuator element 69*d* to pivot, thereby releasing the catch 69*b*.

That is, the snap shackle loop 69*a* releases the catch 69*b*, as the actuator 69*d* moves out of engagement. Thus, the pivoting nature and the variable curvature of the actuator 69*d* provide a tremendous leverage advantage. This amounts to an effectively unloaded engagement between the pin 69*c* and the actuator 69*d*. Thus, a comparatively high load may be secured by the snap shackle loop 69*a* against the catch 69*b*. Yet, release requires very little force. Almost no frictional binding exists against the pin 69*c* in the actuator 69*d*. Thus, removal of the pin 69*c* easily releases the actuator 69*d*, which then has only its own weight to be moved by the force of the catch 69*b* against it.

Removing the trolley 50 involves releasing the entire top cage 75 of the caboose 58 in order to permit removal thereof from the track line 20. Similarly, the swing arm 61 is drawn down (e.g., moving the catch 6*b* up). The swing arm 61 may now be pivoted about the axle 67 away from the catch 69*b*. Thus, the engagement of the catch 69*b* by the swing arm 61 is removed.

The swing arm 61 swings forward, away from the caboose 58, thereby clearing an opening for the main roller 62 or wheel 62 (sheave 62) to be lifted off the track line 20. Thus, with the top cage 75 also open (pivoted up and away from the main block 77 or frame 77 of the brake system 58), the trolley 50 may simply be lifted away from the track line 20.

Following removal 228 of the trolley 50, the trolley 50 may be tucked into a backpack, fitted into a sling or carrier suspended from the shoulder of a user 45, or the like.

Registering with the launch block 32, a trolley 50 may have a mechanical interlock in the various components 79 and the interlock safety dog 80 that must mechanically fit into a receiving region 81. Proximity sensors 83 may detect a failure to register the trolley 50, and particularly the caboose 58, in the launch block 32.

However, the safety dog 80 must clear or fit into its designated opening in the launch block 32. Also, the gauge length required for the snap shackle 69*a* to engage a catch 69*b* is a mechanical distance that must be met. It corresponds with drawing the trolley 50 within the launch block 32 a sufficient distance to provide detection of targets 82 by the proximity sensors 83.

Meanwhile, the proper positioning of a detent 84 that must be physically moved by an actuator, such as a solenoid, or the like may provide an electrical or electronic mechanism for detecting whether a trolley 50 is properly registered in a launch block 32.

Figure 10:
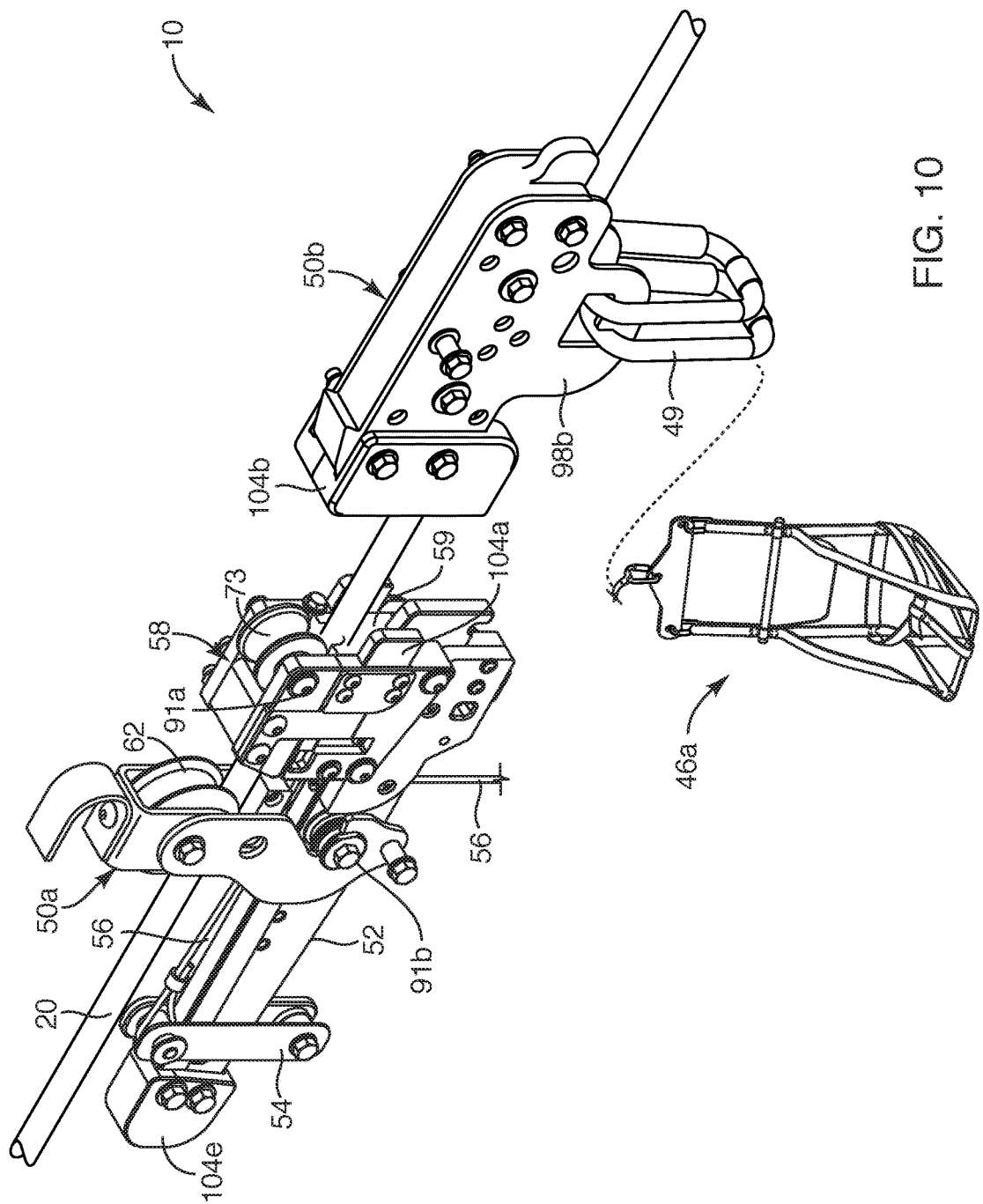
FIG. 10 is a perspective view of one embodiment of a pair of trolleys not yet engaged to run together, one braked by an operator and one unbraked by itself, but controlled by movement of the braked trolley.

Referring to FIG. 10, while referring generally to FIGS. 1 through 29, and particularly to FIGS. 14 through 18, a system 10 in accordance with the invention will typically involve one or more track lines 20 extending between an upper location and a lower location. Typically, track lines 20 may be suspended between towers, other man-made structures, or natural structures, such as trees. A track line 20 will typically suspend as a catenary, a term of art known in engineering, and used here in its common, ordinary, engineering meaning.

Track lines 20 may be suspended to run in multiple parallel paths. They may also be suspended in multiple legs of a longer tour. Typically, each leg has a beginning and end. Ends of adjacent legs of such a tour may be in proximity to one another permitting ready access therebetween by riders, but also providing the freedom to dismount from a track line 20 and hike, relax, observe, or wander before continuing on the next leg of the tour.

In the illustrated embodiments, riders 45 may be tracked by means of a target 35 associated with the rider 45, with the rider's harness 46, or with a trolley 50 that supports the user or rider 45 in a harness 46, traveling along the track line 20. Typically, a harness 46 containing a rider 45 is connected by a link 49, such as a carabiner secured between the harness 46 and the trolley 50.

Again, harness 46 is a word well understood in the arts of climbing, mountaineering, "high angle" work, working high above the surface of the earth, such as suspending over the sides of buildings, military operations, search and rescue, and so forth. Harnesses 46 are also described in some detail in the references hereinabove cited and incorporated by reference. In the illustrated embodiment, multiple trolleys 50 are used.

A trolley 50*a* contains a lever arm 52. Along that lever arm 52 a slide 54 may move. Typically, the slide 54 may actually have rollers or bearings that travel along a top surface of the lever arm 52. In this way, the slide 54 is quite free to move with a minimum of frictional resistance along the lever arm 52. Because the lever arm 52 is free to pivot about the axle 91*b* with respect to the track line 20, the lever arm 52 forces the pad 59 of a brake system 58 to engage frictionally against a lower side or surface of the track line 20.

Because the slide 54 is comparatively free to move along the lever arm 52, a rider 45 may suspend in a harness 46 from the trolley 50*a*. Meanwhile, a system of carabiners 49 and slings 55, such as the sling 55*a*, will suspend a harness 46 with a rider 45 seated or otherwise supported therein.

By means of a tether 56, effectively a small diameter cable 56, a rider 45 may pull on a handle 57, thus drawing along the lever arm 52 the slide 54, which is connected to the other end of the tether 56. A user 45 exerting no force on the handle 57 is effectively supported exclusively by the harness 46, sling 55*a*, and a connecting link 49, such as a carabiner 49, to the trolley 50*a*. Accordingly, the slide 54 when free from force by a user 45, with no force being exerted on the handle 57 and tether 56, tends to depress the lever arm 52, and thus slide forward along the lever arm 52, increasing the leverage advantage of the weight of the user applied to the slide 54 by moving away from the axle 91*b*.

For example, as the slide 54 moves toward the front end of the lever arm 52, the leverage that the weight of a user applies to the brake system 58 is increased. One can see that the brake system 58 pivots to a position exerting force and pressure by the pad 59 against the track line 20 as the lever arm 52 pivots about an axle 91*b* or bolt 91*b* under the influence of the weight of a rider on the hanger 54 or slide 54.

Movement downward by the lever arm 52 results in movement upward by the brake system 58. With force and movement downward by the slide 54 against the lever arm 52, force and movement upward apply the brake system 58 against the track line 20.

A shoe 59 or pad 59 operates to slide along the track line 20, subject the force of friction. Perhaps more specifically, the pad 59 or shoe 59 applies force against the track line 20. Meanwhile, the weight of a rider 45 in a harness 46 tends to draw or urge the trolley 50 to roll downward along the decline of the track line 20.

According to the rule of frictional engagement ($F=\mu N$), the drag force "F" of friction is proportional to the force applied normal (perpendicular) to the surface of the track line 20 by the brake pad 59 or brake shoe 59. Thus, the resistance "F" or the force "F" resisting movement of the trolley 50 along the decline of the track line 20 is equal to a coefficient of friction □ (a constant, □, related to the materials of the track line 20 and the pad 59) multiplied by the "normal" force "N" (meaning perpendicular load) applied to the contact surface of the track line 20 by the pad 59.

In the illustrated embodiment, the wheel 62 or pulley 62 supports the trolley 50 on the line 20. The wheel 62 may be braked in any of a number of ways. In some embodiments, a mechanical brake pad 59 or shoe 59 operates to provide friction against the track line 20. In other embodiments, the wheel 62 may be provided with an armature, and the brake system 58 may actually provide eddy current braking or induced current braking.

For example, the wheel 62 or pulley 62 may resist rolling. To do so, it may act like a motor that is being run in reverse or forced in reverse even though it is rolling or running forward along the line 20. Thus, the wheel 62 may operate as a motor being forced backward, thereby tending to provide a braking force.

Alternatively, the pulley 62 may be connected to, or be configured as an armature or stator operating as part of a generator generating a current. The generator may be connected to a load or resistance, which then dissipates the energy, thus providing the mechanical drag for the brake system 58. Such electromagnetic braking systems may often simply rely on the reverse or the inverse of the operation of motors.

If the wheel 62 operates as a part of a generator system, then the drag resisting rotation of the wheel 62 is a result of an electrical load connected to the generator system. Direct generation of eddy currents and dissipation thereof may also be relied upon as explained and understood in the electromechanical engineering arts. Eddy current braking herein is used in that context and relying on an ordinary engineering definition.

In another embodiment, braking may be applied to a wheel 62 mechanically. The wheel rolls substantially without slipping along the track line 20. It may be braked hydraulically, mechanically, or electrically, in order to resist rotation of the wheel 62.

One will note that several slings 55 are arranged in the various embodiments illustrated. Typically, a harness 46 contains webbing 64 in important locations. In fact, the harness 46 may look more like a seat 46, or may be more sparse, with leg loops, waist belt, and so forth as described and illustrated hereinabove.

For example, in certain embodiments, a harness 46 may involve a chest harness with the leg loops and a waist belt. A harness 46 that includes leg loops, a waist belt, and chest strap or harnessing is a good idea for novices and children. It may be connected to maintain a rider 45 upright without requiring action by the rider 45. A set of slings 55 interconnected by links 49, such as carabiners 49, may connect a harness 46 containing a rider 45 to a slide 54 that operates as a bracket 54 to support the harness 46 by the sling 55 under a trolley 50.

One should note that the idler 73 is a roller 73 that does not necessarily engage constantly during travel of a trolley 50 along a track line 20. Typically, a user 45 relieves the braking force by pulling the handle 57, thereby releasing pressure by the pad 59 against the track line 20 as described and illustrated hereinabove. Pulling down on the handle 57 draws the tether 56, connected to the slide 54. The slide 54 moves backward along the lever arm 52, changing the leverage advantage of the slide 54 against the brake system 58.

In the illustrated embodiments, the brake pad 59 makes a mechanical, frictional, braking action. In other embodiments, either a brake pad 59 may be used, or the wheel 62, itself, may be braked electromagnetically or otherwise, as discussed hereinabove.

However, in contrast, the idler 73 rides above the track line 20 without supporting any load, nor even necessarily making contact with the track line 20. As part of the braking system 58 of the trolley 50, the idler 73 need only engage if the braking system 58 moves away from the track line 20 sufficiently downward for the idler 73 to be required to restrain the trolley 50 from tilting further.

The trolley 50 includes various axles 91 supporting the idler 73, and so forth. In particular, an axle 91a supports the idler 73. The axle 91b supports the lever arm 52 pivoting below the main roller 62.

Again, a trolley 50a may be provided with a lever arm 52, a brake system 58, and proper connection systems including carabiners 49, slings 55, harness 46, and so forth. Thus, an individual user may travel down a track line 20 applying the braking force of the brake pad 59 against the track line 20 at will. However, a second trolley 50b may also be connected on the line 20 to travel simultaneously with the trolley 50a. In fact, multiple trolleys 50b may connect ahead, behind, or both, with respect to a braked trolley 50a.

Figure 11:
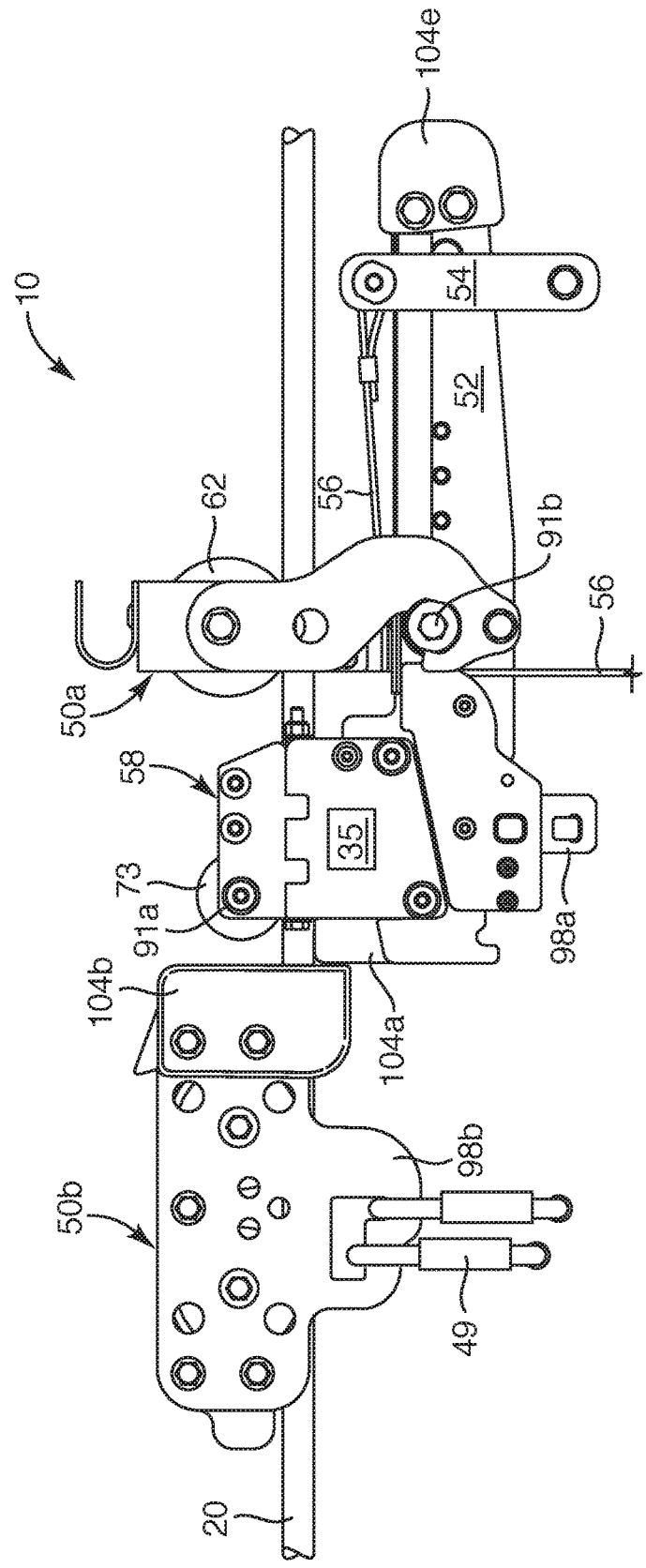
FIG. 11 is a right side elevation view thereof, with the two trolleys engaged and in contact to operate together.

Referring to FIG. 11, the trolley 50b may include a hanger 98b corresponding to the hanger 98a on the trolley 50a. For the rider of the trolley 50a, the hanger 98a acts as a belay hanger 98a. That is, the harness 46 of the rider 45 of the trolley 50a is suspended from the lever arm 52 by the slide 54 and sling 55a.

In contrast, the trolley 50b needs no brake. In fact, it should have no brake. Otherwise, coordination and control between the trolleys 50a, 50b would be difficult, and the risk of impact unsafe.

For safety, the hanger 98b on the trolley 50b may be connected to the hanger 98a of the trolley 50a by a sling 55f. In general, a harness 46a of a rider 45 of the trolley 50a may be suspended by a sling 55a. Meanwhile, a sling 55e connects between the harness 46a of the rider of the trolley 50a and the belay hanger 98a. Thus, the belay hanger 98a operates to provide an additional sling 55e in the unlikely event that any failure occurs in the slide 54, its connecting carabiner 49, or the sling 55a. Likewise, should any failure in the arm 52 occur, the rider is still suspended by the trolley 50a through the belay hanger 98a and sling 55e.

Referring to FIGS. 12 through 14, and FIGS. 1 through 29 generally, a rider 45 in a harness 46b may be secured to another trolley 50a by a sling 55f. This eliminates the possibility of escape by the trolley 50b from the trolley 50a. Thus, the riders under the trolley 50a, 50b are linked together by the sling 55f. Each sling 55f also operate as a belay sling 55f, providing additional connection through a carabiner 49 to the slings 55f on the harness 46b.

The sling 55b may suspend the harness 46b of a second rider from a hanger 98b. Alternatively carabiners may connect these directly without a sling 55. In the event of a failure of any aspect of the second trolley 50b, the sling 55f provides a suspension of the harness 46b from the belay hanger 98a.

A bumper 104b on the trolley 50b may or may not have any equivalent necessary on the trolley 50a. For example, an unbraked trolley 50b does not need the lever arm 52. The trolley 50a may have a bumper 104a for contacting the bumper 104b, if desired, however, By whatever mode, a bumper 104b on the trolley 50b connects to contact the trolley 50a, thereby minimizing any potential for damage, abrupt contact between metals, or the like. Typically, the bumpers 104 may be formed of rubber, a suitable polymer, or the like.

Meanwhile, the bumpers 104*b*, 104*c*, 104*d* correspond to the unbraked trolleys 50*b*, 50*c*, 50*d*. For example, multiple trolleys 50*a*, 50*b*, 50*c*, 50*d* may operate in tandem at the same time on the same run along the track line 20. Meanwhile, the brake system 58 on the first trolley 50*a* operates to brake all the trolleys 50.

Figure 12:
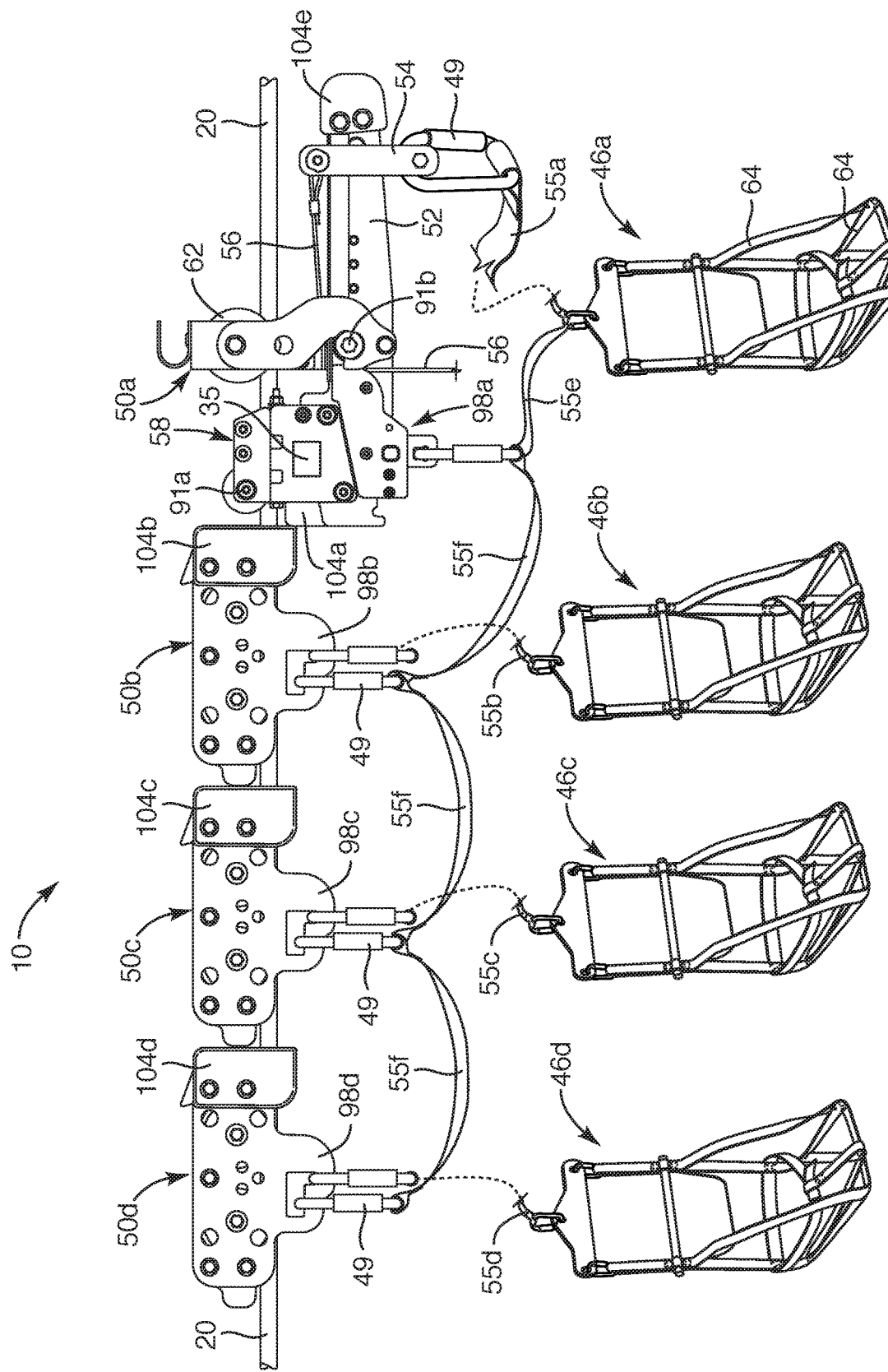
FIG. 12 is a right side elevation view of a system wherein a single braking trolley is operated to brake a series of unbraked trolleys running therebehind.

Referring to FIG. 12, the three unbraked trolleys 50*b*, 50*c*, 50*d* are bumpered together and against the trolley 50*a*, which leads. The braking system 58 of the first trolley 50*a* or lead trolley 50*a* has the effect of controlling (effectively slowing or braking) all the trolleys 50*a*, 50*b*, 50*c*, 50*d*.

Another bumper 104*e* on the front of the lever arm 52 of the trolley 50*a* serves another purpose. This is bumper 104*e* for systems that may attenuate speed at the lower end or landing end of a run along the track line 20.

Figure 13:
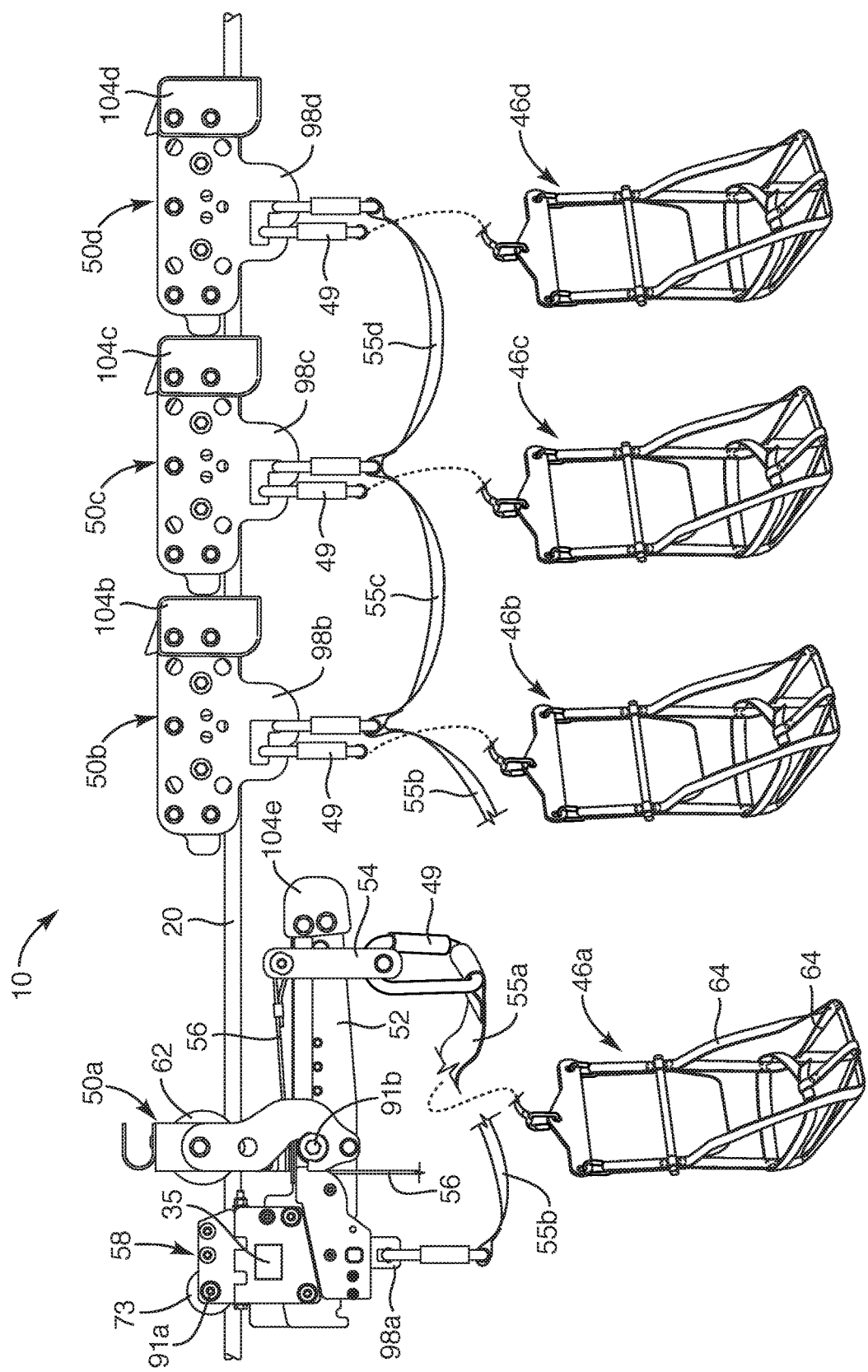
FIG. 13 is a right side elevation view of a system of trolleys, wherein a braked trolley trails behind multiple unbraked trolleys connected thereto and running in front thereof.

Referring to FIG. 13, in yet another embodiment, the trolleys 50*b*, 50*c*, 50*d* may be connected to run ahead of the trolley 50*a*. In this embodiment, the slings 55*a*, 55*b*, 55*c*, 55*d* support each of the harnesses 46*a*, 46*b*, 46*c*, 46*d* under their respective trolleys 50*a*, 50*b*, 50*c*, 50*d*. Meanwhile, the slings 55*f*, 55*g*, 55*h* connect together the trolleys 50*a*, 50*b*, 50*c*, 50*d*. However, here, the trolleys 50*b*, 50*c*, 50*d* do not stack up behind the trolley 50*a*, but run ahead of it. Accordingly, they will typically separate by the distance permitted by their interconnections, slings 55*f*, 55*g*, 55*h*.

Regardless, the trolleys 50*a*, 50*b*, 50*c*, 50*d* cannot separate by a great distance. That distance is dictated by the interconnecting slings 55*f*, 55*g*, 55*h*. Accordingly, no great variation, or even significant difference, in velocity is obtained or attainable, relatively speaking, between any of the trolleys 50. Thus the risk of instability or inter-trolley impact is reduced to have virtually no effect.

Figure 14:
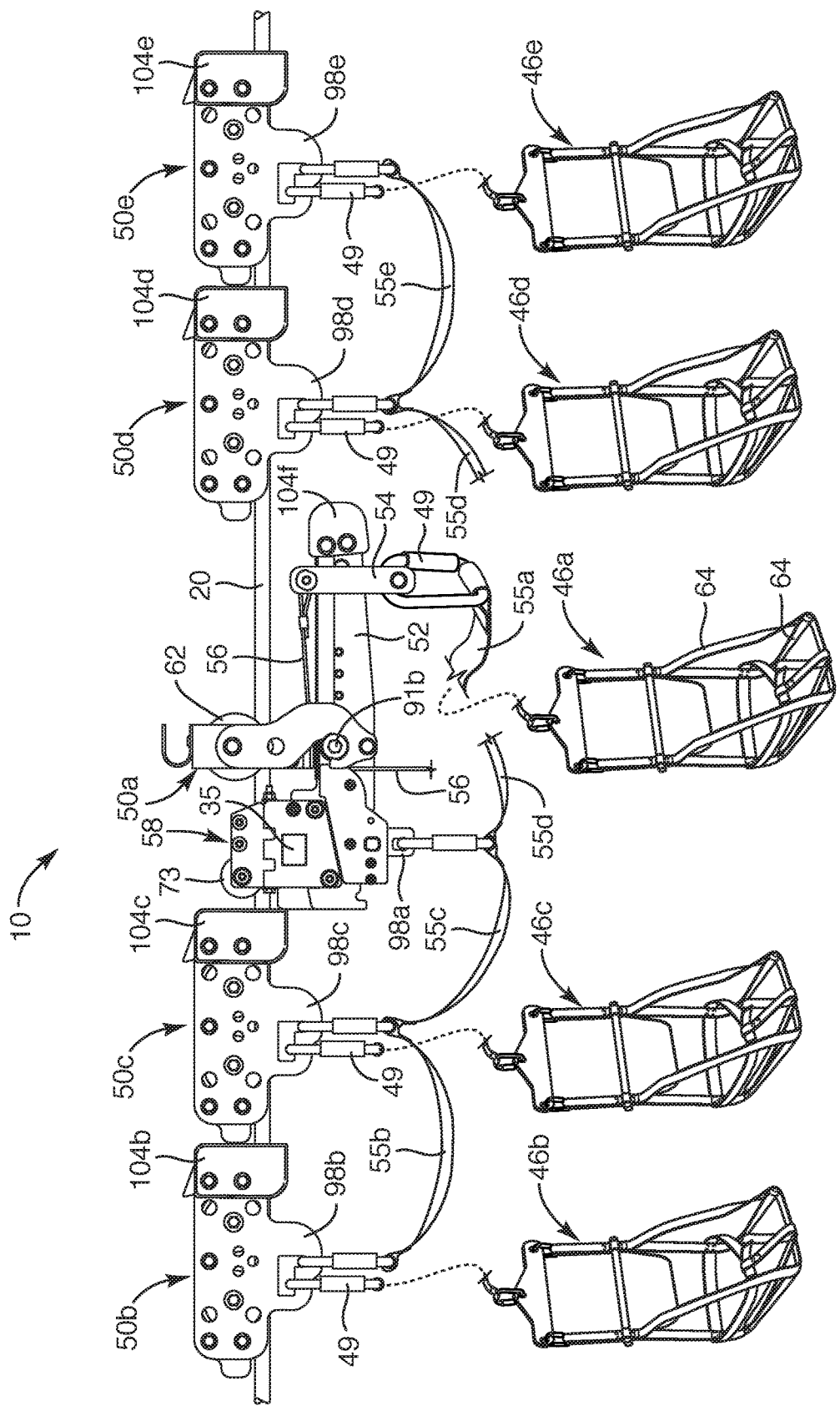
FIG. 14 is a right side elevation view of a braked trolley having unbraked trolleys running both ahead and behind, connected to be controlled by operation of the braked trolley.

Referring to FIG. 14, in one embodiment, multiple trolleys 50*b* may be distributed to both trail behind and run ahead of the lead trolley 50*a*. One or more may be connected behind, while other trolleys 50*c*, 50*d* may also be connected ahead of the trolley 50*a*.

In some respects, it may easier to operate if all the additional trolleys 50*b*, 50*c*, 50*d* are either in front of or behind. With all unbraked trolleys 50*b*, 50*c*, 50*d* located exclusively either fore or aft, the rider on the trolley 50*a* has a single direction to pay attention to riders. This may be a more secure mode of care with respect to the unbraked trolleys 50*b*, 50*c*, 50*d*, with the operator of the braking trolley 50*a* knowing all other riders are either behind or in front.

It appears that having all riders of unbraked trolleys 50*b*, 50*c*, 50*d* behind the braked trolley 50*a*, the controlling rider 45 of the trolley 54*a* is free to look forward upon approaching the end of a particular leg of a track line 20. On the other hand, with all unbraked trolleys 50*b*, 50*c*, 50*d* ahead of the controlling trolley 50*a*, the controlling rider 45 need only look forward at any time to see both the approaching attenuation system and all riders. On the other hand, trolleys 50*b*, 50*c*, 50*d* carrying riders in front of the controlling trolley 50*a* may tend to spread out while descending, but move together upon arriving at an end-of-line attenuation system, as described and shown in the references incorporated hereinabove by reference.

Figure 15:
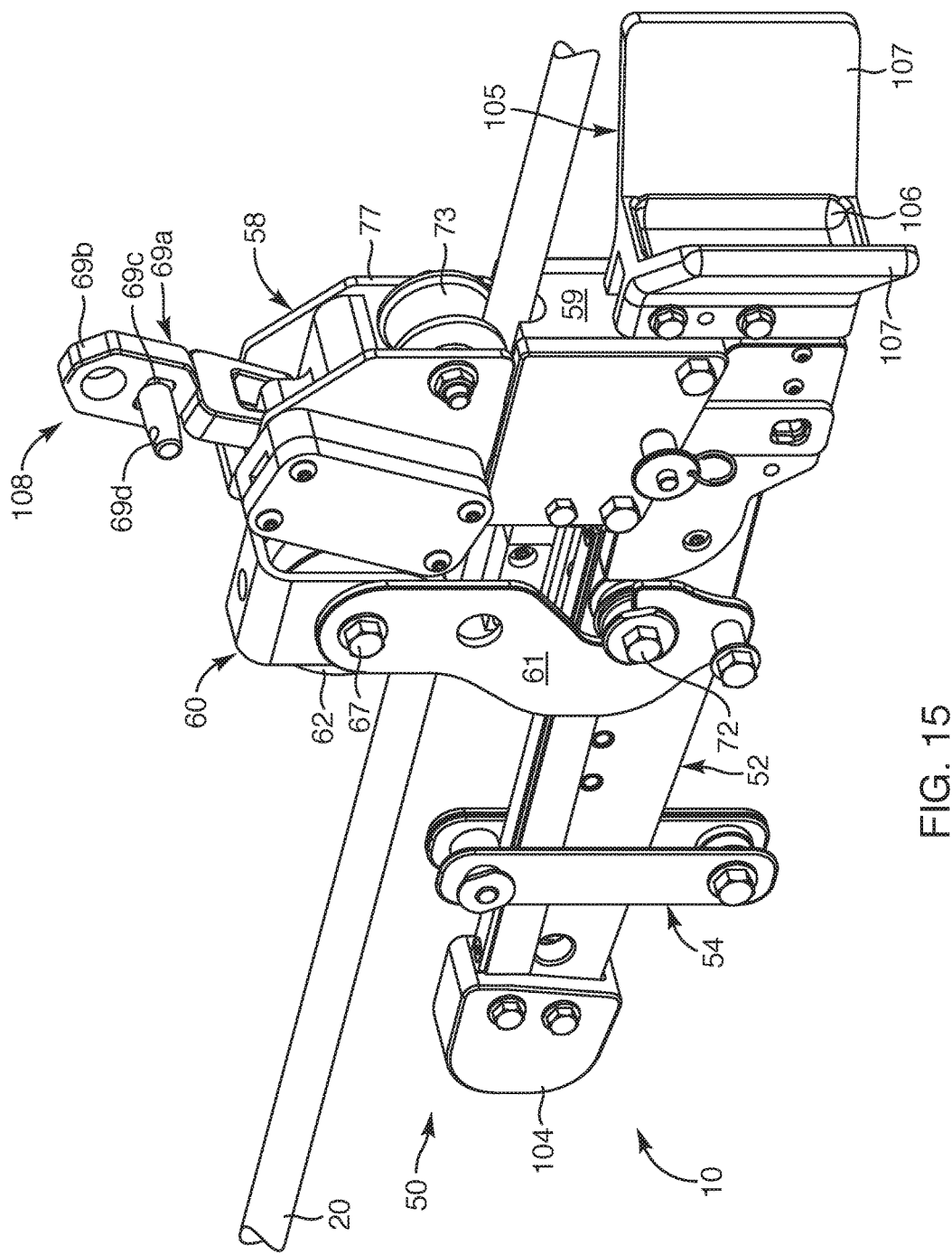
FIG. 15 is a rear perspective view of a trolley suitable for an emergency egress system in accordance with the invention.

Referring to FIG. 15, a trolley 50 in accordance with the invention may include a front bumper 104. A rear bumper 105 may be configured for capture of any trailing trolley 50 traveling therebehind. For example, in some embodiments, a rear bumper 105 may include wings 107 in order to pilot a front bumper 104 of a trailing trolley 50 into contact with the impact surface 106 of the rear bumper 105 of the trolley traveling ahead.

In selected embodiments, the impact surface 106 may actually be slanted in order to urge the arm 52 of a following trolley downward as it moves forward, thus applying braking to the following trolley through its own braking system 58. Nevertheless, the braking systems 58 of the trolleys 50 are sufficiently robust that a single operator in a leading harness 46 or seat 46 suspended under a leading trolley 50 has sufficient braking power to slow and even stop multiple trolleys 50 following.

In the illustrated embodiment, the release link 108 may include one or more of the elements 69. For example, a snap shackle loop 69*a* may capture the eye 270 of a turnbuckle 272. Meanwhile, a catch 69*b* may secure the loop 69*a* in a closed configuration. Meanwhile, a pin 69*c* may be released by an actuator 69*d* to open the loop 69*a*.

Figure 16:
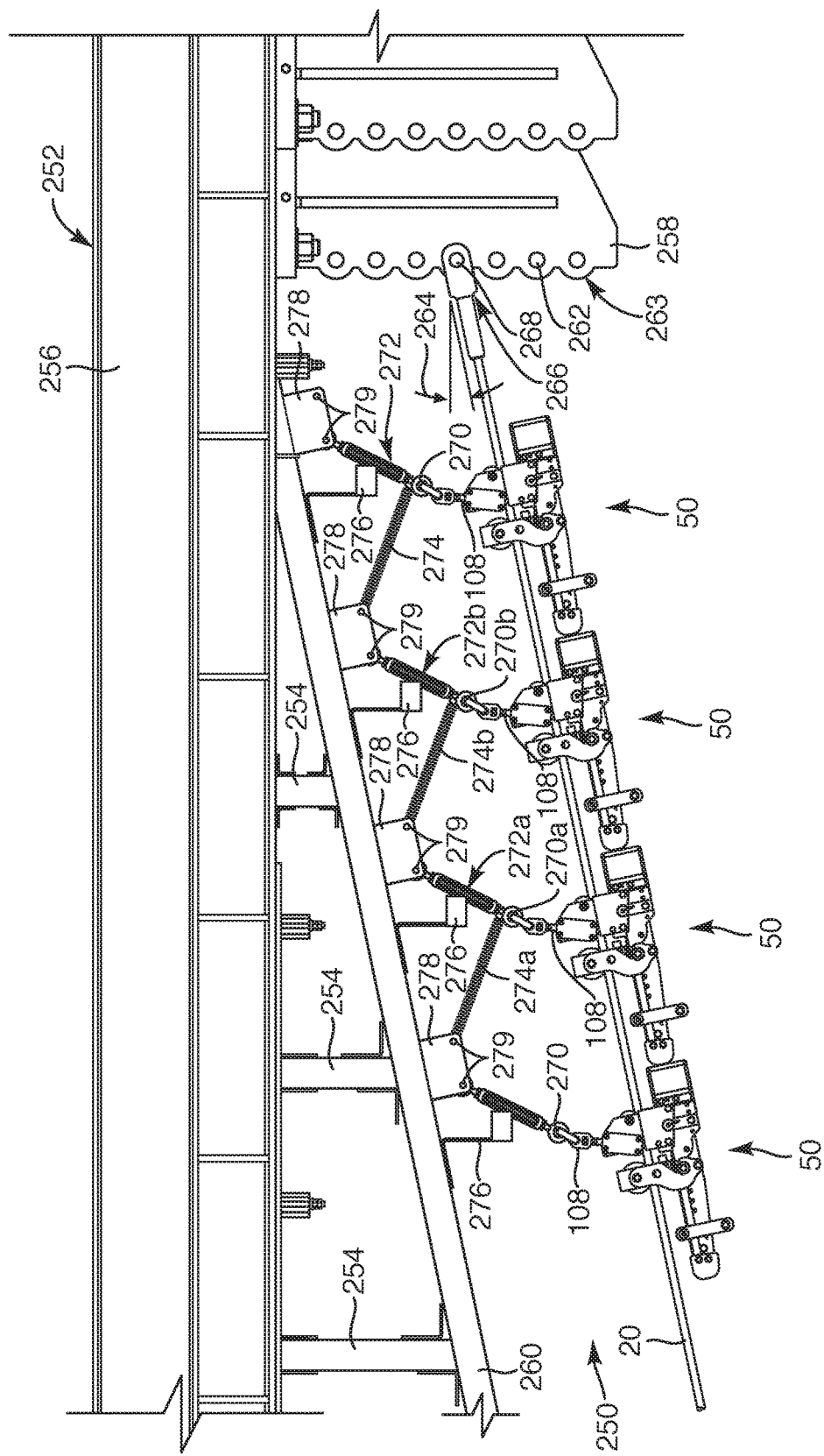
FIG. 16 is a side elevation view of one embodiment of an emergency egress configuration in accordance with the invention.
Figure 17:
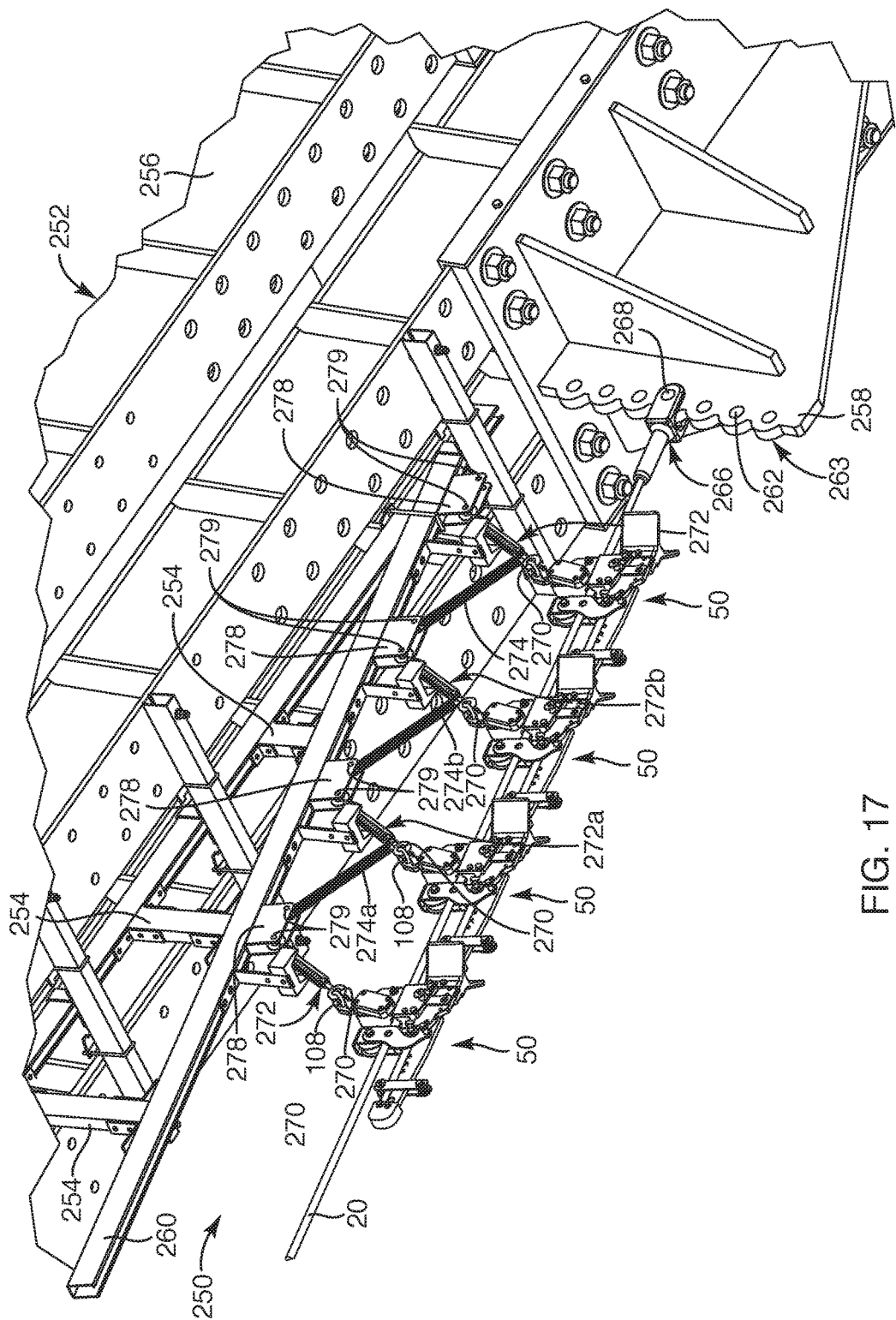
FIG. 17 is a perspective view thereof.

Referring to FIGS. 16 and 17, a carrier system 250 may include a structure 252 having some principal function unrelated to a track line 20 and a trolley 50. For example, it may be the structure 252 of an off-shore oil rig, a refinery tower, a gantry at a missile site, a building containing a manufacturing plant for "energetic materials" (an engineering term of art), or the like.

Connector beams 254 are installed to support the carrier system 250, and may be secured by any suitable means (e.g., welding, bolts, rivets, pins, clamps, etc.) to the structural beams 256 making up the structure 252. Vertical pillars 258 and horizontal beams 256 of the structure 252 may be augmented by diagonal bracing, gussets, and so forth according to good structural engineering practice.

Track lines 20 for egress in emergency situations may be secured to the structure 252, such as at apertures 262 in flanges 263 of the pillars 258. Lines 20 may connect through systems such as a clevis 266 and pin 268, clamps, lugs, and the like, or wrap around bollards or thimbles. Track lines 20 thus descend at some angle 264 dictated by the theory of catenaries 26.

In one embodiment of an emergency egress system 10, a carrier system 250 may be installed on a structure 252 of a facility 253 remote from a safety location. For example, certain manufacturing facilities 253 deal with "energetic materials" such as explosives, combustibles, fuels, rocket motors, petroleum products (including crude oil drilling or production, natural gas, etc.).

Typically, these facilities 253 may include towers, elevated structures 252, or platforms 252 containing buildings, operation rooms, control rooms, and the like. Accordingly, the structure 252 of a particular facility 253 will support operational equipment and employees or workers who are potential users 45 (riders 45) of a system 10 in accordance with the invention. Typically, the structure 252 is an inherent structure 252 required by the central function of a facility 253 that has a potential for danger.

For example, a fire on a remote drilling or petroleum production platform 252 may be devastating, with no ready means of escape. Moreover, when the structure 252 is part of or is associated with a facility 253 having a tower or elevated surfaces, egress in an emergency situation, where time is of the essence, may be difficult to impossible. Thus, connecting beams 254 may be attached to the structure 252.

Connecting beams 254 may be secured by various fastening mechanisms to support beams 256 constituting a portion of the structure 252 of a facility 253. To the connecting beams 254 may be secured rails 260. Typically, a single rail 260 may be adequate. In some embodiments, multiple rails 260 may be scattered about various beams 256 of a structure 252 in order to provide timely and close access to workers in an emergency egress situation.

Meanwhile, a fin 263 may be specially constructed, or may simply be adapted by providing apertures 262 in a flange 263 of a pillar 258 supporting the structure 252 or as another part of the structure 252. In other embodiments, a distinct fin 263 may be secured to the structure 252 at an appropriate place and with the appropriate engineering and construction procedures.

In the illustrated embodiment, a termination 266 of the cable 20 or track line 20 may be constituted as a clevis 266 secured to the fin 263 by a fastener 268, such as a pin 268.

In the illustrated embodiment, a turnbuckle 272 and a retrieval spring 274 or another type of resilient member 274 (e.g., leaf spring, compression spring, elastic band, or the like) may secure in any appropriate geometry between an eye 270 at the lower end of the turnbuckle 272, and a bracket 278 secured to the rail 260. The bottom ends of the turnbuckle 272 and an extension coil spring 274 may typically connect directly together. However, how connection is done represents an optional construction configuration.

The guard 276 about a turnbuckle 272 permits pivoting of a turnbuckle 272 about a pin 269. For example, a bracket 278 securing each pivot 279 or pin 279 supports the pivoting of springs 274 and turnbuckles 272. The bracket 276 may limit the amount of pivot of a turnbuckle 272. Meanwhile, the brackets 278 support in a vertical direction, and secure to pivot thereabout, each of the turnbuckles 272 and springs 274 pivotably secured by the pins 279 or to the pins 279.

In some embodiments, a hook or loop at the lower end of the spring 274 may secure to the eye 272 at the lower end of the turnbuckle 272. In other embodiments, the spring 274 may secure at a different location to the turnbuckle 272. In operation, the rail 260, a spring 274, and a turnbuckle 272 may be configured to define an approximately triangulated shape. Typically, in geometry, a triangle has three fixed sides, which together establish angles at the vertices (connections between sides) of a triangle.

In the illustrated embodiment, the springs 274 represent a side of each triangle, which side is extensible. Accordingly, the springs 274 may be extended in order to swing the turnbuckles 272 each around their respective pins 279 or pivots 279 in the brackets 278. Accordingly, the weight of a trolley 50 may be supported by the rail 260 through the triangulated turnbuckle 272 and spring 274 associated therewith.

For example, multiple turnbuckles 272a, 272b secure to corresponding springs 274a, 274b. The springs 274 may support part of the load. However, the bulk of the load represented by the weight of a rider 45 in a seat 46 or harness system 46 suspended from a trolley 50 may eventually be supported entirely by a turnbuckle 272. The turnbuckle 272 may orient fully vertically by virtue of the overwhelming weight supported thereby causing enough extension of the corresponding spring 274 to create that geometry.

In operation, the turnbuckle 272 is secured, typically through an eye 270 to a brake system 58 (the caboose portion 58) of a trolley 50. In the illustrated embodiment, a release link 108 may be configured to have the components 69 such as a snap shackle loop 69a, catch 69b, pin 69c, and some actuator 69d. However, other types of release links 108 may be used to answer the need. An individual user may trigger a release link 108 to free the connection 108 between the eye 270 of a turnbuckle 272 and a particular trolley 50. Every rider 45 of a trolley 50 may have complete control of that trolley 50.

The operation of the trolley 50 may be constrained by the presence of another trolley 50 nearby. However, a front bumper 104 and a rear bumper 105 make possible the operation of multiple trolleys 50 in tandem. In fact, the rear bumper 105 may include an impact surface 106 with a pilot 107 or a side wings 107 to guide the front bumper 104 of a trailing trolley 50 into the rear bumper 105 of a forward trolley 50.

As a practical matter, once in operation, an individual rider 45 has access to a handle 57 drawing on a tether 56 to control the position of the slide 54 or hanger 54 traveling back and forth along the arm 52 or lever 52 that actuates the brake assembly 58. As described hereinabove, drawing the slide 54 backward along the arm 52 by the force applied on the tether 56 through the handle 57, reduces a distance and therefor leverage of the weight of a rider 45. This action relieves the brake pad 59 force from contact with the track line 20. Accordingly, a trolley 50 begins moving downhill once a rider 45 has released the braking effect.

Figure 18:
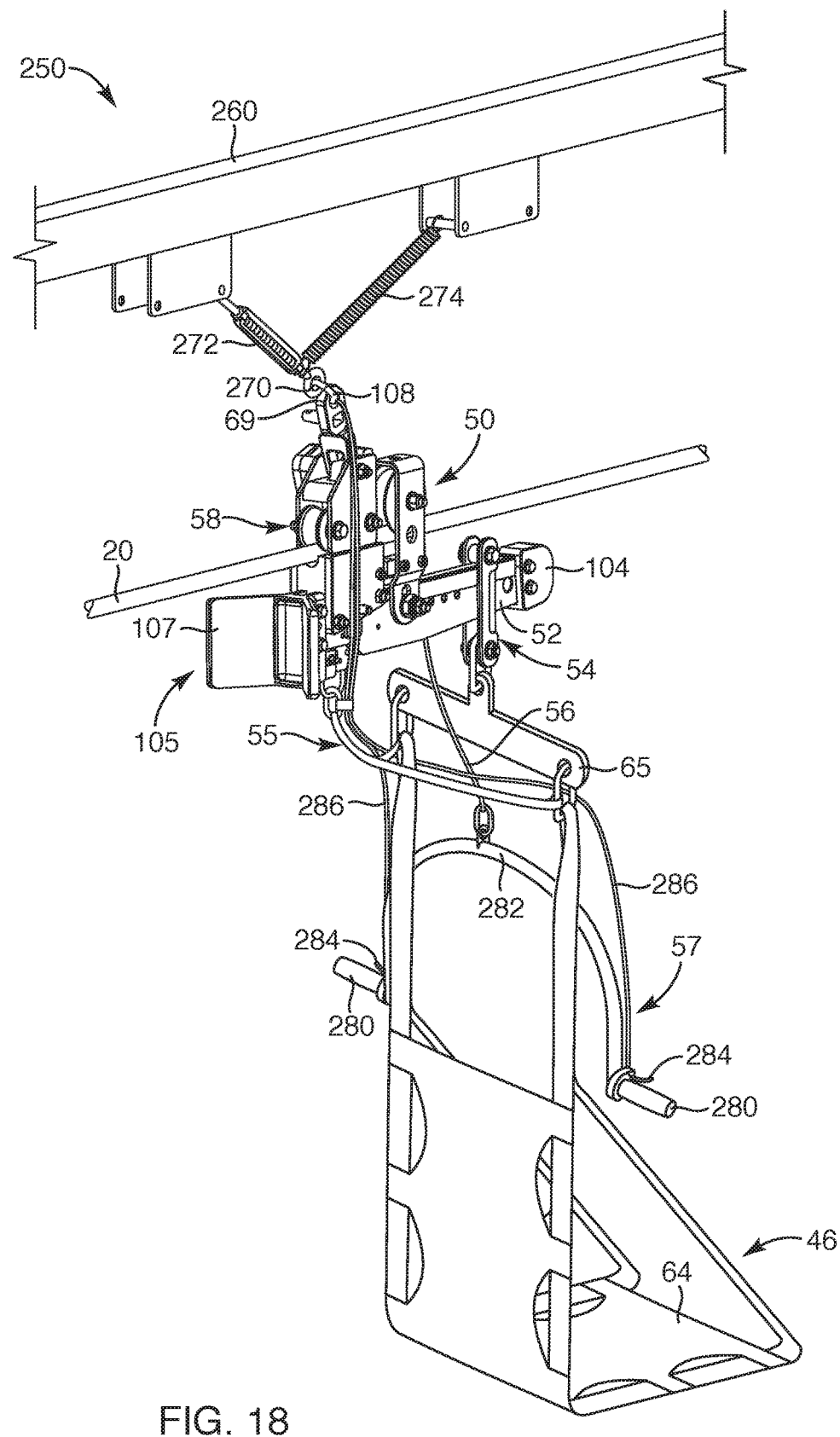
FIG. 18 is a perspective view of an emergency egress system of FIGS. 16 and 17 equipped with a harness seat for operation.

Referring to FIG. 18, while continuing to refer generally to FIGS. 1 through 29, the structure 252 supporting a carrier system 250 may rely on triggering by a rider 45 seated in a seat 46 or harness 46 suspended under a trolley 50. A rider 45 will necessarily need access to the release link 108 securing a trolley 50 to the eye 270 of a turnbuckle 272. In order to do this, some mechanism of control is necessary.

A rider 45 in a seat 46, may be supported principally by the actual seat panel 64 under a rider 45. Meanwhile, a yoke 282 may operate much as the handle 57 described hereinabove. In fact, one may think of the yoke 282 as the handle 57. The yoke 282 may be wider, and may be shaped to provide more clearance above a user, while placing the handles 280 or grips 280 comparatively lower than the point of suspension by the yoke 282 secured to the tether 56 thereabove.

As described hereinabove, the tether 56 extends from the yoke 282 up into the trolley 50, ultimately drawing the slide 54 or hanger 54 rearward or backward along the arm 52. Accordingly, the effective length of the lever arm 52 by which the trolley 50 pivots about the axle 72 is reduced. This reduces the effective force applied by the brake pad 59 against the track line 20.

In the illustrated embodiment, additional connections may be made between the harness 46 or seat 46 and the trolley 50. For example, a belay sling 55 or safety sling 55 may connect from the trolley 50 to the harness 46. However, operationally, the principal weighting of the harness 46 and its contained rider 45 is directed to the spreader 65 suspended from the slide 54 on the arm 52.

In the illustrated embodiment, the grips 280 on the yoke 282 may be provided with additional triggers 284. The triggers 284 will typically connect to cables 286. The cables 286 are best and easiest to install as sheathed cables 286. Sheathed cables are used in a control of bicycle brakes, motorcycle controls, and the like near handle grips. Here, the grips 280 are configured to allow a rider 45 to hang on to the tether 56 in order to release the trolley brake 58 and move forward.

Upon releasing or reducing force on the yoke 282, a user permits the tether 56 to release the force applied to the slide 54, thus permitting the slide 54 to move forward on the arm 52. The resultant increasing leverage against the brake 58 applies more force between the brake pad 59 and the track line 20.

An important function of the triggers 284 is to provide a trigger 284 actuating a mechanism (such as a pin 69c) releasing the snap shackle loop 69a or other securement element 69. Importantly, release must occur while supporting the binding force from the weight of a trolley 50 and rider 45 suspended from the eye 270 of a turnbuckle 272. In the illustrated embodiment, the triggers 284 or handles 284 are doubled to be redundant. Either one operates the sheathed cable 286 to release the link 108 by opening the snap shackle loop 69a.

The significance of suspending each trolley 50 from a turnbuckle 272 is that it reduces the loading on the track line 20. Operating as a catenary 20, the track line 20 is suspended between an upper station 12 and a lower station 22. Its shape changes by adding "point loads" (an engineering term) at an upper station 12. The turnbuckles 272 take the rider weight and thus maintain the stability of the catenary 26 shape. Track lines 20 may typically be one quarter, one half, or even a full inch in diameter. Part of that sizing depends on the length of the suspended track line 20 supported. A one mile distance covered by a track line 20 represents substantial weight. A track line 20 extending 500 to 1000 feet need not be as large, because it does not have nearly so much of its own weight to support.

However, adding multiple riders at a single point (effectively) on a catenary 26 as a track line 20 has consequences that can interfere with proper loading and launch. For example, five large men could easily weigh over 1000 pounds total. That much weight applied to a comparatively smaller track line 20 extending a comparatively short distance (for example, a half inch line extending 700 feet) would be dramatically affected by the weight of the riders 45. In fact, the harnesses 46 might all hit the launch deck 14, thus making difficult or impossible the launching of trolleys 50. However, by the turnbuckle 272 above each trolley 50 supporting the weight of the trolley, the track line 20 becomes free to suspend in its normal shape. Once launched, the spring 274 pulls its corresponding turnbuckle 272 up and out of the way. The line 20 immediately responds to the weight of the rider 45 as a point load moving downward along its length. Each rider 45 launched increases tension in the line 20, reducing the influence of the next launch on the shape of the line 20 and its distance from the launch dock 14.

Upon launch, each individual rider 45 has control of the corresponding trolley 50 by operating the yoke 282 through the grips 280, and operating the trigger 284 to activate the release link 108. The natural delay between individual people will provide a time of from about one to about five seconds difference between adjacent riders 45. Accordingly, each rider 45 will load into a seat 46, then pull down on the grips 280 and activate the trigger 284 to release the release link 108.

Whether the trigger 284 is pulled first, or the handles 280 are pulled first is not critical. However, multiple riders 45 all pulling at triggers 284 first, without drawing on the grips 280 could create a problem. Accordingly, a best practice is for a rider to sit in the seat 46, placing the arms through the webbing supporting the seat panel 64. Drawing down on the grips 280 of the handle 57 (yoke of 282) before pulling on the trigger 284. The first rider 45 immediately launches, and the subsequent riders 45 may then, in turn, pull on the triggers 284 of their corresponding yokes 282 in order to launch each of them.

As a practical matter, once a rider 45 has launched down the track line 20, the weight of that rider 45 begins immediately to increase the total weight on the catenary 20 at a distance away from the upper station 12. The rider 45 becomes a point load moving away from the upper station 12. This further improves the stability of the position of the track line 20 above the upper deck 14. Once multiple riders 45 are under way along the track line 20, subsequent riders 45 will have much less effect on the height of the track line 20 above the deck 14.

Thus, the carrier system 250 made up of the turnbuckles 272 and springs 274 suspended from the brackets 278 by pins 279 provides support for all riders 45 being loaded into harnesses 46 simultaneously, especially with their weight applied simultaneously to the carrier system 250. In an alternative embodiment, the turnbuckles 272 may be replaced by another type of link 272, such as a length of chain 272 terminating with a carabiner or other link easily connected to snap shackle on a trolley 50.

Since chain can be cut to any length, the beams 254, 256 need not conform to the angle of the catenary 20 with respect to the main structure 252. Each chain 272 may be cut to length to end just above the track line 20. It may be terminated with a loop shaped to present a sufficiently large opening in the direction of the track line 20 for receiving a snap shackle 69a or other release mechanism 68. The spring 274 may be in any suitable shape and orientation, including a bungee (elastic) cord running parallel to a chain 272 and captured therewith inside a protective, flexible sheath or tube.

Release of a trolley 50, also releases the portion of the track line 20 on which that trolley 50 engages (rollably secures). This results in unloading, and therefore lifting, such a chain 272 away from the track line 20 and the next trolley 50 in line to release. However, each trolley 50 should naturally clear the link 272 left by a previously departing trolley 50, since the track line 20 will typically drop slightly with each launch as the suspension point of the track line changes.

The supporting carrier system 250 maintains the track line 20 above the loading deck, on the wheels of the trolleys it suspends. Each trolley launched weights the track line, acting as a point load (in engineering parlance) moving therealong. By not releasing the triggers 284 simultaneously, but individually, in sequence, as each rider 45 readies and launches, the riders 45 naturally create a separation distance between them, along the track line 20. Individual braking provides each rider 45 complete control against collision with a previously launched trolley.

A system 10 in accordance with the invention may also be used for mass transit across geographic barriers, such as highways, trains, gorges, rivers, or other obstructions. Trolleys 50 may each suspend a simple harness, comfortable seat, individual gondola, or group cabin therebelow. Riders may load and launch individually or in small groups to cross in one direction early in a day, then mount a tower at the end of the day to return on a track line 20 and trolley 50 traveling in the opposite direction. The elements providing for individual control of launch and travel provide a throughput of several trolleys per minute, even mere seconds (single digits) apart in actual practice.

Figure 19:
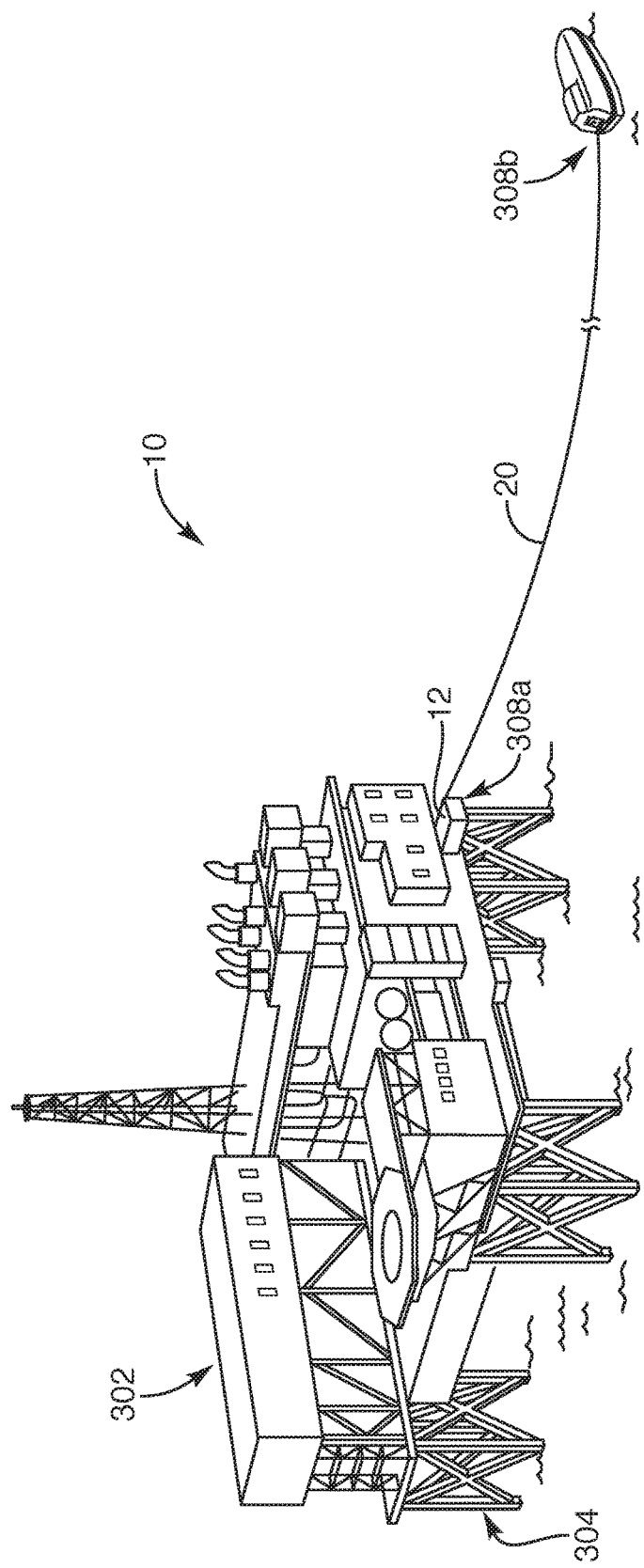
FIG. 19 is a perspective view of one embodiment of a system and method for marine-environment, emergency, egress systems in accordance with the invention.

Referring to FIG. 19, while continuing to refer generally to FIGS. 1 through 29, a system 10 may be equipped to extend, deploy, launch, or otherwise connect a track line 20 with an anchoring device 300. The system 10 may serve or include a rig 302 or off-shore platform 302, sometimes called an off-shore drilling or production rig 302. One benefit of a system 10 in accordance with the system is that a launch station 12, and particularly a launch deck 14 may be constructed as part of an off-shore rig 302. In the illustrated embodiment, a support structure 304 penetrates from the rig 302 down into surrounding water 306.

A system 10 includes a track line 20 extending from a first end 308a thereof associated with the launch deck 14 and launch station 12 on the rig 302 to a lower or terminal end 308b of the track line 20 carried, supported, or otherwise facilitated by an anchoring device 300.

In practice, multiple riders 45 may load into harnesses 46, 63f or seats 46, 64 controlled by a trigger 284 and suspended under a yoke 282. Accordingly, multiple riders 45 may be seated in seats 46, 64 suspended under corresponding trolleys 50 on the track line 20 at the launch station 12. As described hereinabove, the track line 20 in use is maintained freely suspended in a catenary shape by suspending the trolleys 50 under the carrier system 250. Thus, individuals may launch at any appropriate time after the track line 20 has been deployed.

The anchoring device 300 may be mobile. In fact, in several contemplated embodiments, one or more of various types of devices 300 may be launched from a rig 302a. a deployment device 312 may draw a track line 20 (or a leader line for drawing a track line therebehind) a distance away from the rig 302 in order to deploy the track line 20 and anchor it effectively for use.

As a practical matter, maintaining a track line 20 permanently extending from a rig 302 to some other anchoring device 300 permanently affixed to the ocean floor is problematic. The track line 20 is typically used only in an emergency. Many rigs 302 may operate their entire lives with no emergency requiring the track line 20 to be deployed or used. Thus, in such an instance, it makes little sense to permanently secure a track line 20 that is likely to interfere with the regular movement of support-type watercraft needing access to the rig 302.

Figure 20:
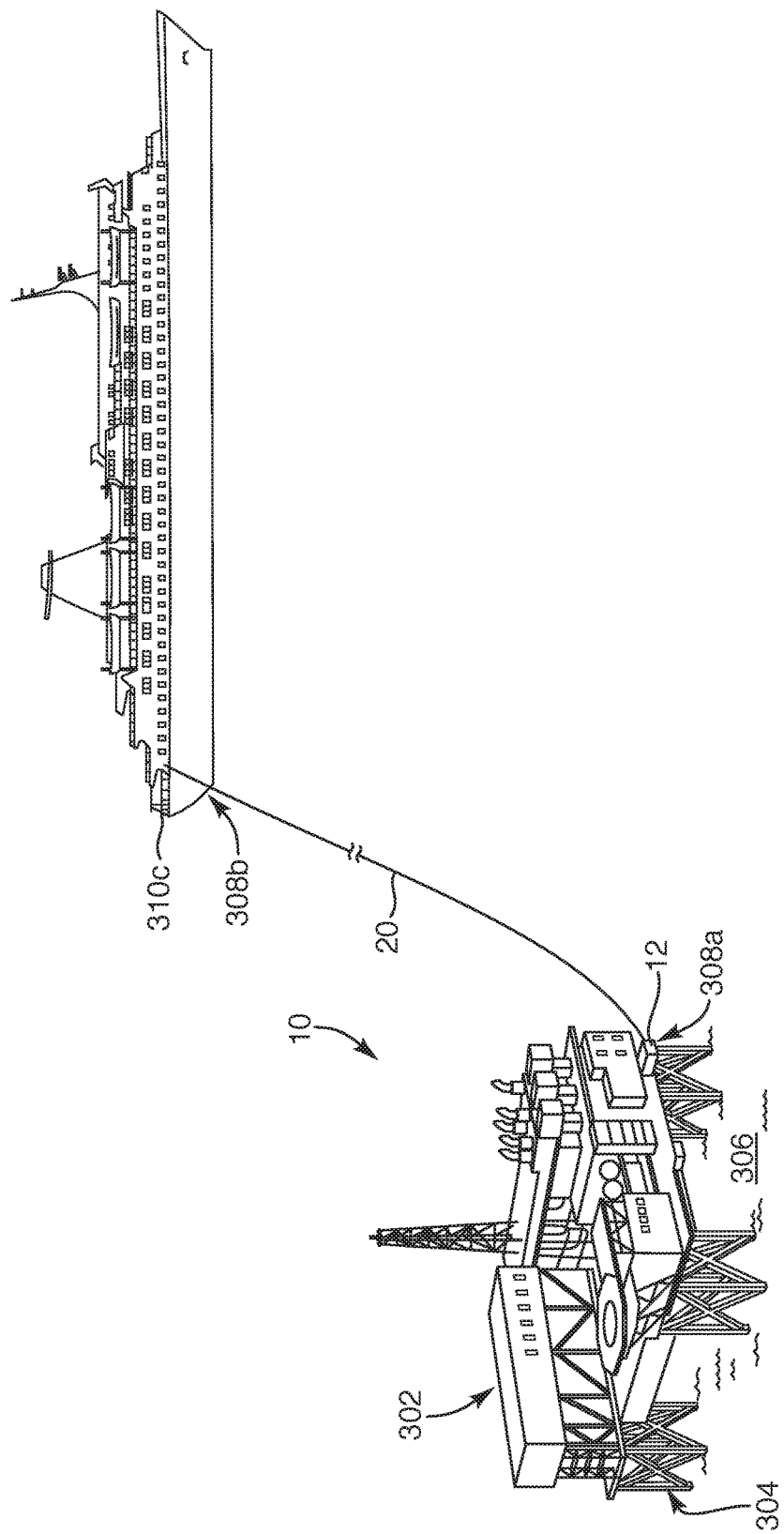
FIG. 20 is a perspective view of an alternative embodiment extending a line from an off-shore platform structure to a remote ship, tender, or similar, large watercraft.
Figure 21:
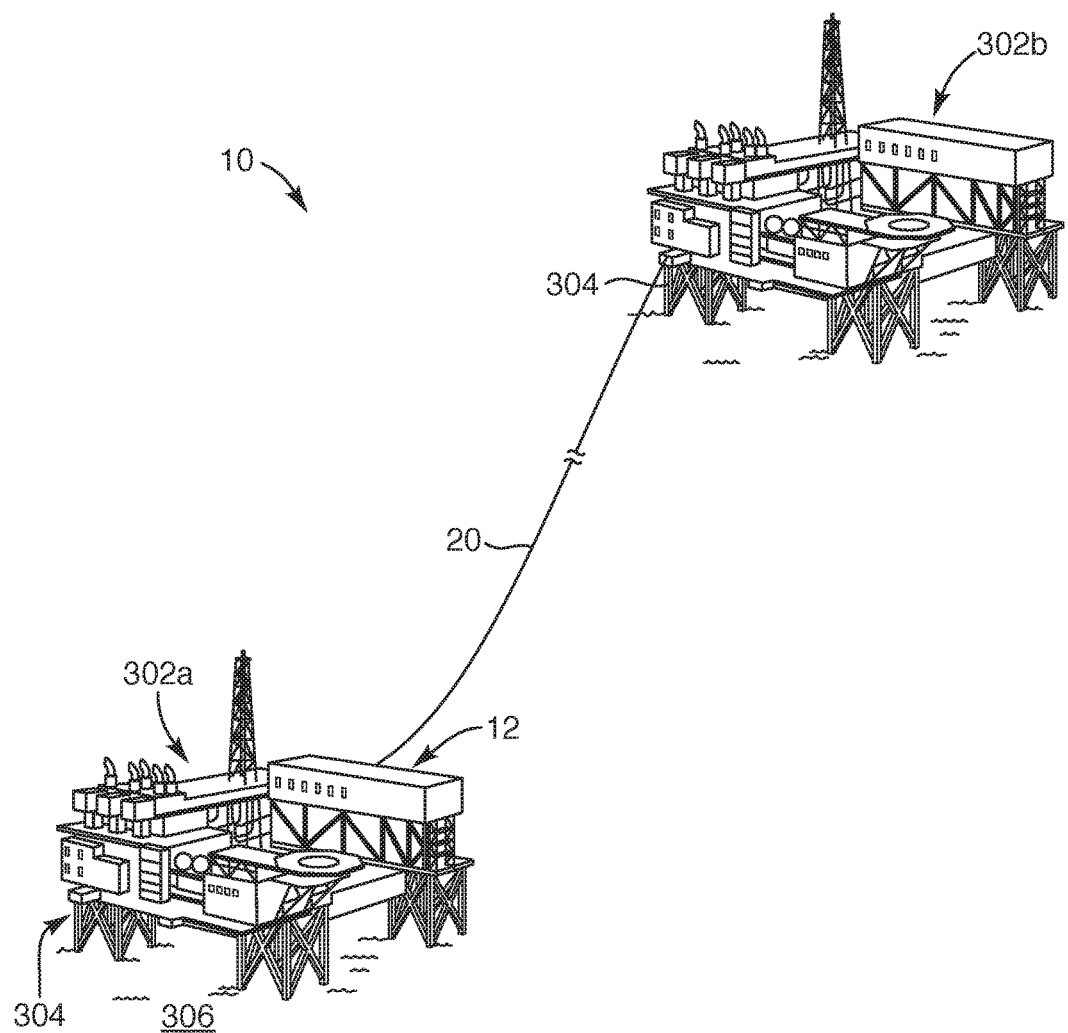
FIG. 21 is a perspective view of one alternative embodiment of a system in accordance with the invention anchoring an upper end to a high point on a first off-shore rig structure, and a lower end on the supporting structure of a remote but nearby off-shore rig structure.
Figure 22:
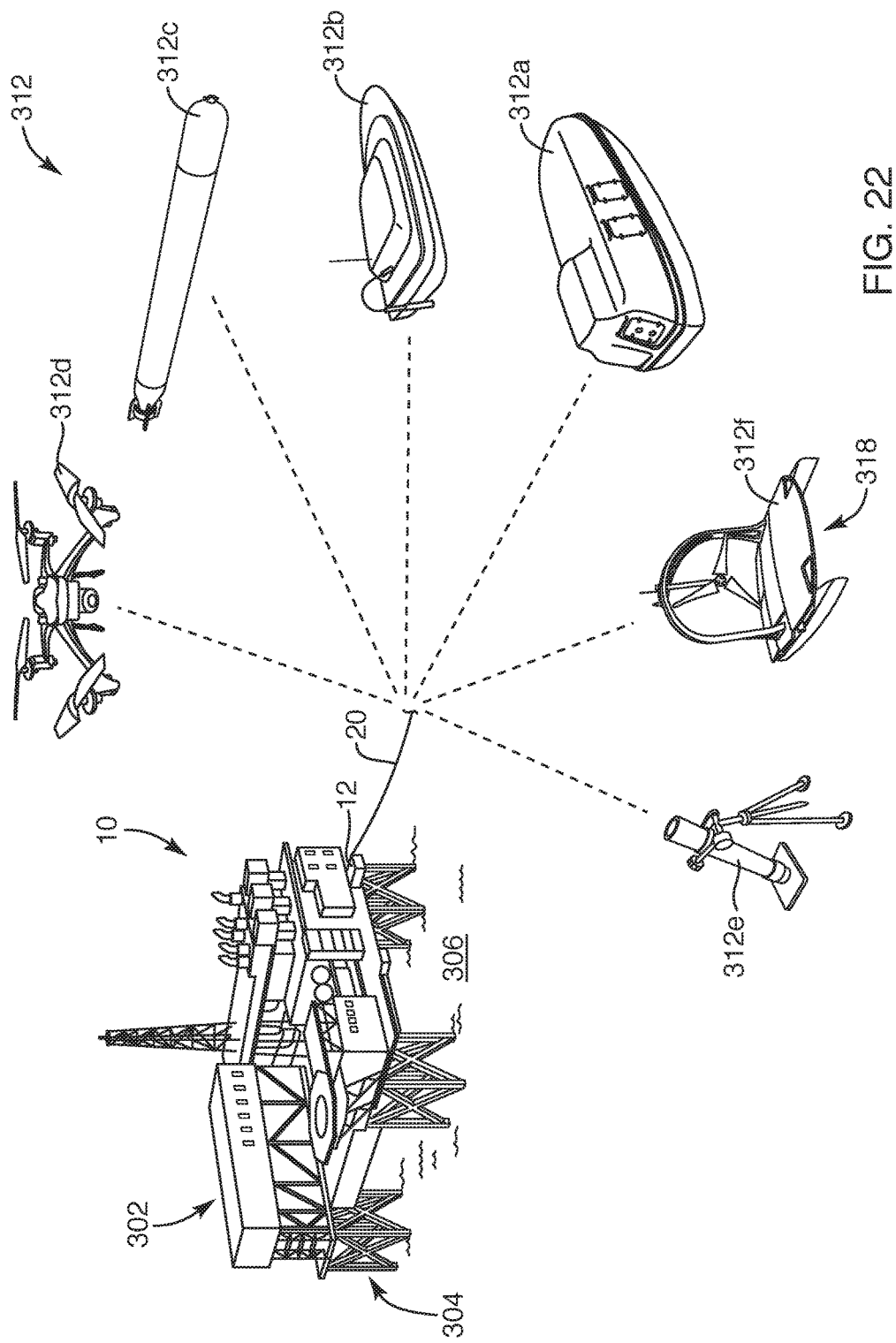
FIG. 22 is a perspective view of an off-shore rig provided with an emergency egress system illustrating alternative anchoring devices for the lower, terminal end of a track line.

Referring to FIGS. 20 through 22, while continuing to refer generally to FIGS. 1 through 29, an anchoring device 300 may be associated with, may be a part of, or maybe the very item 310 acting as a remote location 310 or a remote destination 310. The destination 310 may be the location 310 or object 310 at which an anchoring device 300 is designated to anchor the terminal end 308b of the track line 20.

For example, in the illustrated embodiments, the remote destination 310 may be embodied as a ship 310a, an anchor chain 310b secured to a ship 310a, a railing 310c extending along a deck of a ship 310a, a bollard 310d on a deck or beside the deck on the hull of a ship 310a, or the like.

Support ships routinely approach a rig 302, as the only large craft permitted to routinely approach the rig 302. Thus, they are often in the vicinity of an individual rig 302 or a group of rigs 302 in a defined area. Deploying a track line 20 extending from a rig 302 to be evacuated out to such a comparatively stable ship 310a nearby may be reliable, repeatable, and available. Thus, this configuration offers one solution to setting up a track line 20 for emergency egress from a rig 302.

In one alternative embodiment, a small craft 310e may actually serve as the remote destination 310 acting as an anchoring device 300. In yet another alternative embodiment, a small craft 310e may simply act as a deployment device 312 or carrier 312 to draw a terminal end 308b of a track line 20 (or a lighter, leader line attached thereto) from a rig 302 out to a ship 310a or some attaching mechanism 310b, 310c, 310d, thereon or elsewhere.

A cleat 310f on a ship 310a or a small craft 310e may temporarily or permanently secure the terminal end 308b of a track line 20 for service.

In some alternative embodiments, a cleat 310f may be a conventional double-pronged, or double-ended cleat 310f. In other embodiments, a cam cleat 310f may be used. A cam cleat 310f typically receives a line between a knurled or roughened surface of a base 342 that is fixed to a dock or watercraft, and another roughened, arcuate cam 344. The cam 344 is of non-constant radius and is spring loaded to urge it to pivot with respect to, and toward, the solid base portion 342. Thus, any line 20 dragged into the cleat 340 will move in one direction, but be gripped by the cam 344 against the solid portion 342 of the cleat 310f upon any tendency to retreat back through the cleat 310f.

A lifeboat 310g may be the destination 310 and deployment device 312 launching from a rig 302 and drawing the terminal end 308b of the track line 20 away from the rig 302b to a remote location 310. The lifeboat 310g itself, may operate as the anchoring device 300. However, this is problematic. Lifeboats 310g typically do not have the power nor the mass effective to maintain tension in a track line 20.

For example, as discussed hereinabove, a track line 20 will have an effective diameter dependent on its length and the tension it must hold along its longitudinal direction. The trigonometry of the angles multiplies vectors of force along the longitudinal direction. Weight of a rider transverse to or otherwise orthogonal to the direction of the track line 20 provides tremendous loading due to the angle's sine-to-hypotenuse leverage advantage or multiplication factor. Thus, an approximately two hundred pound rider 45 on a trolley 50 may exert many multiples of that weight in resultant tension in the track line 20. Thousands of pounds of loading (force, thrust) are difficult to support with a simple propeller or jet on a small lifeboat 310g.

Accordingly, in certain embodiments, an anchoring device 300 at a remote destination 310 may be fixed to a sea floor anchor 310h dug into (e.g., buried, penetrating, etc.) or positioned due to its sheer mass 310n sitting on the floor 301 of an ocean 306.

A small craft 312a, 312b, 310e, or the like may draw a track line 20 or otherwise deploy it to a buoy 310m tethered to such an anchor 310h, 310n. A temporary solution may be a sea anchor 310j. A sea anchor 310j is effectively a parachute-like structure that captures a large volume of water representing substantial mass that greatly slows movement of any connected line, such as a track line 20 attached thereto. Nevertheless, a sea anchor 310j still moves, and thus will need to be continually pulled out away from a rig 302, by a small craft 310e or a lifeboat 310g. However it may operate repeatedly as a comparatively large resistance maintaining tension in the track line 20.

Meanwhile, any fixed structure 310k nearby (typically about 500 meters or 1700 feet) may operate as a remote destination 310 and serve as an anchoring device 300. In one embodiment, a buoy 310m may be provided with a ring 310q as a securement. Meanwhile, the buoy 310m may be secured to a mass 310n acting as a permanent anchor 310n and secured to the buoy 310m by an anchor line 310p or tether 310p. A ring 310q or other securement device 310q supported out of the water by a buoy 310m will serve and remain accessible. A link 310q of any suitable design and support may be secured by a tether 310p to a large mass 310n acting as a permanent anchor 300 on the sea floor 301.

If a track line 20 is to be extended right to the surface of the water 306, then riders 45 must either land in the water 306, or be picked up by some other craft 310e, 310g closer to the rig 302 than is the remote destination 310. This is another reason favoring anchoring to a fixed structure 310k, such as a support structure 304 under another rig 302b (if available) separated some distance from the rig 302a from which egress is desired.

Figure 23:
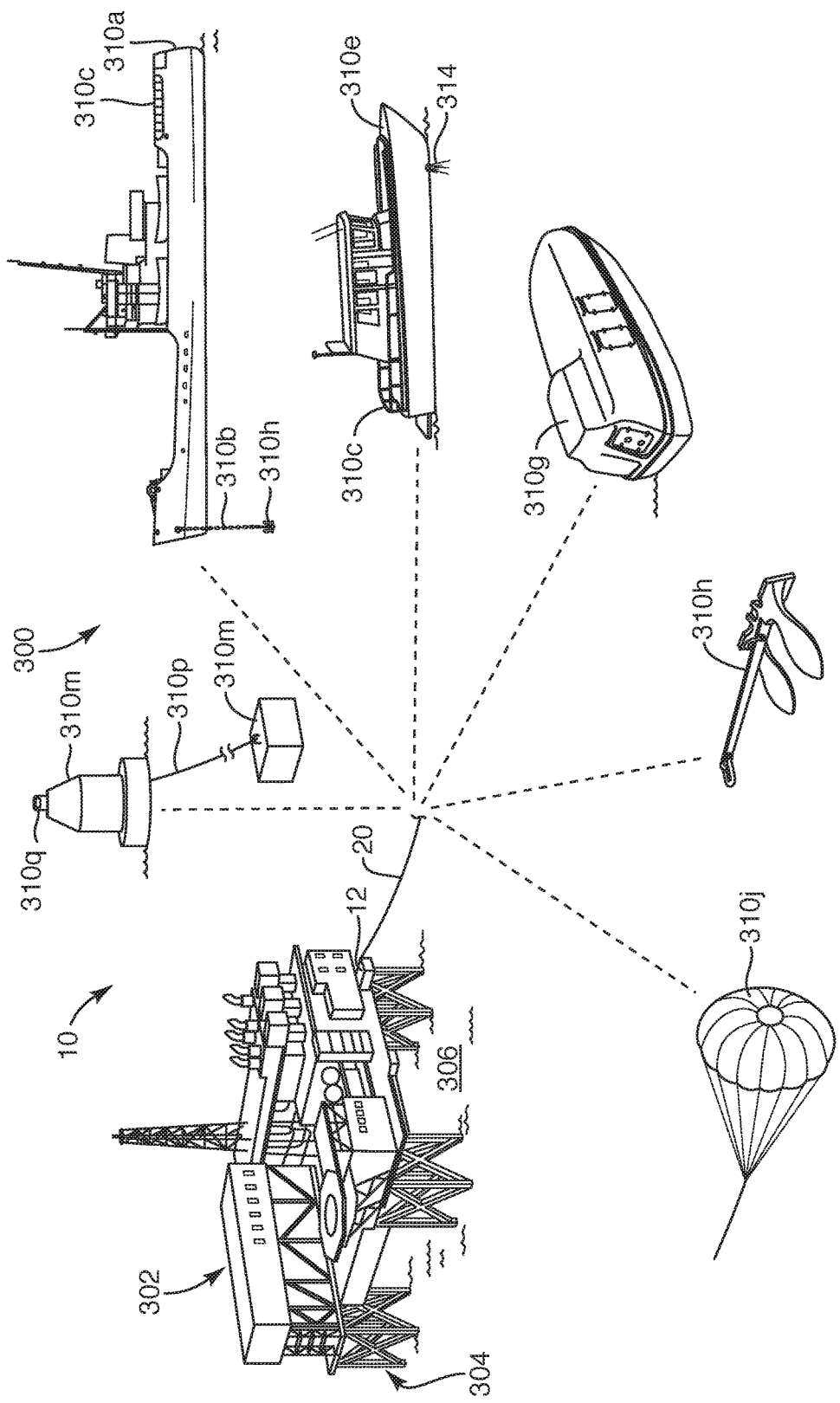
FIG. 23 is a perspective view of a rig or marine platform illustrating various alternative embodiments for a deployment device for drawing a track line from a rig to a remote anchor location.

Referring to FIG. 23, while continuing to refer generally to FIGS. 1 through 29, a deployment device 312 may carry the terminal end 308b of a track line 20 from a rig 302 being abandoned or evacuated. Necessarily, a track line 20, in order to operate, requires securement to and suspension between two locations. In order to operate by gravity, the initiating end 308a or start end 308a will be some distance higher than a terminal end 308b.

Track lines in conventional, land-based, zip line systems may be installed, carefully tensioned, and precisely located at specific design tension loads and maintained by suitable fixtures. In a marine, emergency, egress condition, such as from a rig 302 or off-shore platform 302, a track line 20 may actually follow a lighter, smaller, leader line. The leader is drawn to a remote destination 310 from the subject rig 302 to be evacuated. The leader then draws the track line.

Whether towed directly, or towed at the end of a smaller, leader line, or even multiple smaller, leader lines of gradually increasing size and strength, a track line 20 eventually is deployed by a deployment device 312 drawing the terminal end 308b to an anchoring device 300 at a remote destination 310.

Some typical deployment devices 312 may be a lifeboat 312a, a drone boat (unmanned sea vehicle, USV) 312b, remotely controlled and "unmanned," or a torpedo 312c. Torpedoes 312c conjure up images of weaponry. Another word for a torpedo 312c is a scooter 312c or a tractor 312c. In some ways, the principal difference between a drone boat 312b and a scooter 312c is that a boat 312b floats, whereas a scooter 312c or tractor 312c may simply swim, so to speak, underwater.

In certain embodiments, an airborne drone 312d or UAV 312d (unmanned air vehicle 312d) may be used. Various types of drones 312d have become very popular, simplified in their control mechanisms or their demands on an operator, and quite reliable. A drone 312d may fly a monofilament fishing line or the like having very little weight to a remote destination 310, typically about five hundred meters (1700 feet) a thousand meters (3300 feet) away.

In many environments, about five hundred meters (1700 feet) may be completely adequate. Thousands of meters would be alright, but time is of the essence, so safety timely, nearby is the likely result. By whatever means, a lighter leader line may be connected to a take-up system 320 (see FIG. 24), which may then draw in the lighter leader line leading to heavier line, until finally the track line 20 is engaged, drawn to the remote destination 310, and secured.

In some embodiments, a rotary wing aircraft, such as an autogyro drone, such as those developed during World War II may simply be launched to carry a track line 20, or a leader line connected to a track line 20, to a remote destination 310.

Similarly, a mortar 312e or a mortar-projectile system 312e may simply fire a projectile whose effect is not damaging. The projectile, or the launcher itself, pays out a lightweight line connected to a track line 20, to accomplish a similar delivery, ultimately, of the terminal end 308b of a track line 20 to a remote location 310.

In a typical embodiment, stability of any anchoring device 300 at a remote destination 310 will be important. For example, some stabilizing mechanism may be needed in addition to the main propellers (screws) of any ship 310a, or other watercraft 310e, 310g. Operating as a remote destination 310, 310e, 310g, 312a and even as an anchoring device 300 at that location 310, any watercraft may find stabilizers of some type to be necessary to maintain stability of position. Comparatively larger ships 310a, and even some smaller craft 310e, such as tugs 310e, tenders 310e, and the like in the marine industry have thrusters 314 suitable for maintaining orientation and position of such watercraft 310a, 310e, 310g at the remote destination 310. Automatic controllers may be activated to provide rapid response of such stabilizers.

A motor 316 may provide continuing power, although a watercraft 310a, 310e, 310g may actually be dragged backwards by a track line 20. To the extent that a watercraft 310e, 310g needs more area (perpendicular to motion direction) to prevent "backsliding" under the tension of a track line 20, a sweep anchor of movable (hinged) plates may be secured thereto. For example, a line drawing a sea anchor 310j may connect to one or more locations on the sea anchor 310j, and be drawn away from the rig 302 being evacuated.

Thus, the motive force (e.g., engine of a small craft) need not be excessive to draw the sea anchor 310j or sweep anchor forward. The anchor 310j or sweep anchor 310 will effectively collapse moving forward, and will then expand out, increasing its area and effective drag to be effective under the tension of a track line 20. High drag occurs upon a reverse of direction once a rider 45 has launched on a trolley 50 running on the track line 20. Baffles or fins of solid construction, pivotably connected to a craft, may deploy, fold, and re-deploy similarly in response to line load, motor, and renewed line load.

Figure 24:
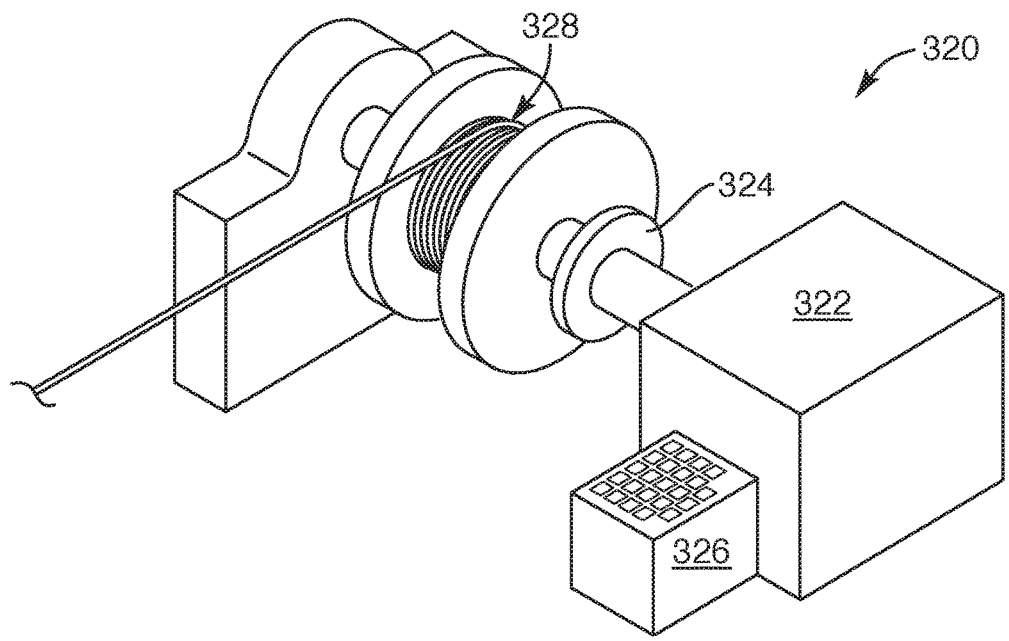
FIG. 24 is a schematic, perspective view of one embodiment of a take-up system for taking up a track line sufficiently to provide suitable tensioning and elevation.

Referring to FIG. 24, a take-up system 320 may be provided as part of an anchoring device 300, or on an anchoring device 300, at a remote destination 310. Thus, a take-up system 320 may be mounted shipboard, on a platform 310k, on a remote platform of a rig 302b away from the evacuated platform 302a, or the like. In certain embodiments, a take-up system 320 may be operated on a large buoy 310m. Some platforms 310k may simply be connected to a system of supporting buoys 310m.

In general, a take-up system 320 may also benefit from being on a rig 302a. It may include an integrated (integral, part of the system 10, onsite) power source 322. A clutch 324 may provide additional engagement and disengagement, between the power source 322 and a capstan 328 or reel 328. The capstan operates to take up a track line 20 or leader line connected thereto.

Typically, a controller 326 may control the power source 322, the clutch 324 or both in engaging and controlling the capstan 328, its speed, its direction, and so forth. In such an environment, the capstan 328 may be required to support all of the tension load on the track line 20. In other embodiments, that load may be attenuated by using other devices.

Figure 25:
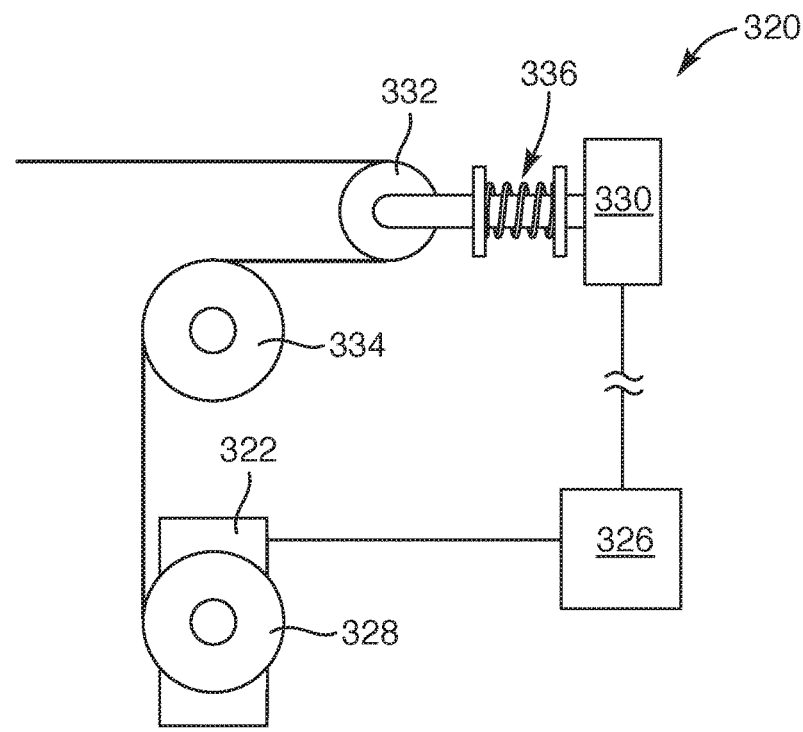
FIG. 25 is a side elevation view of one embodiment of a tension management system or tensioner for maintaining proper tensioning and length in a track line deployed in accordance with the invention.

Referring to FIG. 25, for example, a load cell 330 may be connected to a tensioner pulley 332 in order to maintain tension in the track line 20. If the track line 20 wraps around the tensioner pulley 332, and then passes over an idler 334, a spring system 336 or shock absorption system 336 may "even out" tension in the line 20. It does so by permitting some motion (resisted) of the tensioner 332 or pulley 332 in response to abrupt tension loads, such as occur when a rider 45 first launches onto the track line 20.

That step change in load or tension in the track line 20 may be accommodated by the tensioner 332 or pulley 332, moving against the spring system 336 or shock absorption system 336. Ultimately, the line 20, which will typically be the track line 20 itself, passes to the capstan 328 where it is taken up. Its length is maintained in order to maintain its tension and position.

In various other embodiments, riders 45 may pass to boats, rubber rafts 360, platforms, or into the sea 306 below the track line 20 at any appropriate location. If a rider 45 is provided with a life vest, that rider 45 may disconnect from a trolley 50, the track line 20, or both, and simply remain in the water 306 or swim to a platform holding the take-up system 320 or otherwise operating as an anchoring device 300 at the remote destination 310. Exposure may be reduced by landing in a boat, inflatable raft, or enclosure at or near a remote destination 310. A large buoy 310*m* may act as a floating platform 310*m*.

Figure 26:
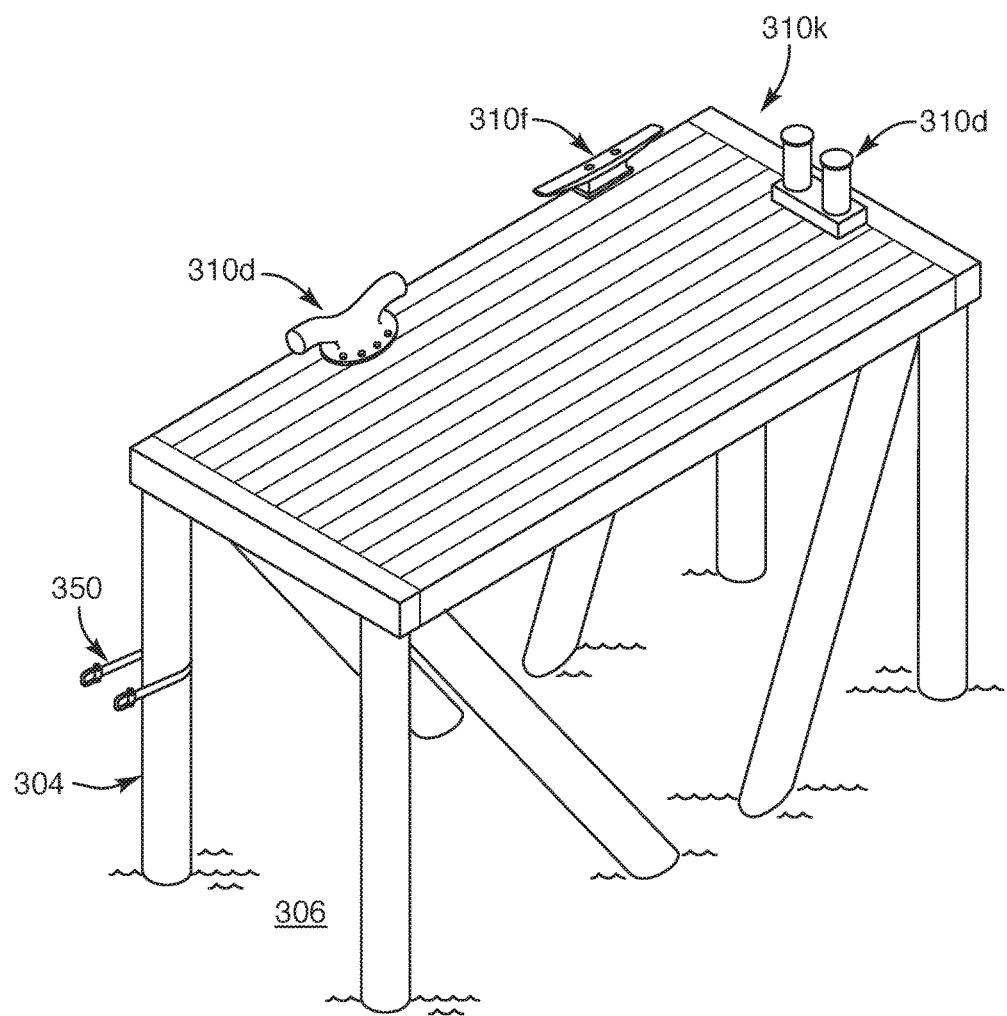
FIG. 26 is a perspective view of an anchor location with various connection schemes for securing a track line thereto.

Referring to FIG. 26, one embodiment of a destination 310*k* may be a fixed structure 310*k*. In alternative embodiments, the fixed structure 310*k* may stand alone, may be a portion of, or adjacent to, a rig 302 or marine site 302, or may simply be built into the super structure of a ship 310*a* or other watercraft 310*e*. In one currently contemplated embodiment, the structure 310*k* may be fixed in a region of a rig 302 or a neighborhood of multiple rigs 302.

By whichever mode, the structure 310*k* may act as an anchoring device 300 to connect one or more types of other destination anchors 310. For example, in the illustrated embodiment, a sling 350 is wrapped around a support 304. Similarly, a bollard 310*d* is illustrated in two different configurations.

For example, a bollard 310*d* may simply represent massive cleat-like extensions from a base. In another embodiment, a bollard 310*d* may simply be represented by a base and vertical or horizontal members. Those members extend, typically, in pairs to render much easier and simpler the wrapping of a line 20 around each alternately. This wrapping will increase friction and secure the line 20 in a minimum of time with no tools or other attachment mechanisms required.

The cleat 310*f* represents a conventional cleat known in the marine arts. It typically is structured to receive a line 20 wrapped alternately around opposing ends or prongs of the cleat 310*f*. In order to increase friction, a line secures without tools, crossing in an x pattern between the two ends as the line continues to loop multiple times under each of the ends in an alternating fashion.

Figure 27:
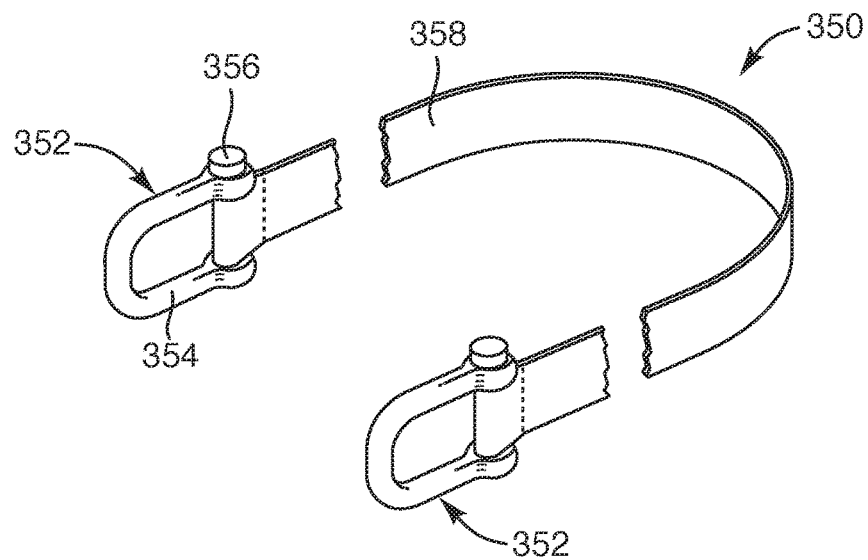
FIG. 27 is a perspective view of a sling and clevis-type links on each end thereof in detail, and corresponds to the same item in FIG. 26.

Referring to FIG. 27, details of the sling 350 are illustrated. For example, the sling 350 may be manufactured in a variety of manners, and out of a variety of materials. The sling 350 may be made of metal, or may be made of a suitable webbing for the main strap portion 358. Meanwhile, clevis-type connectors 352 may include a loop 354 and a pin 356. Typically, a pin 356 is removable, such as by turning threads, or by removing a linchpin, cotter key, or other keeper. The pin 356, when withdrawn from the loop 354, permits entry of the strap 358 into the loop 354. The loop 358 may be secured by the pin 356 passing through an opening or through a space through multiple layers of the strap 358.

Figure 28:
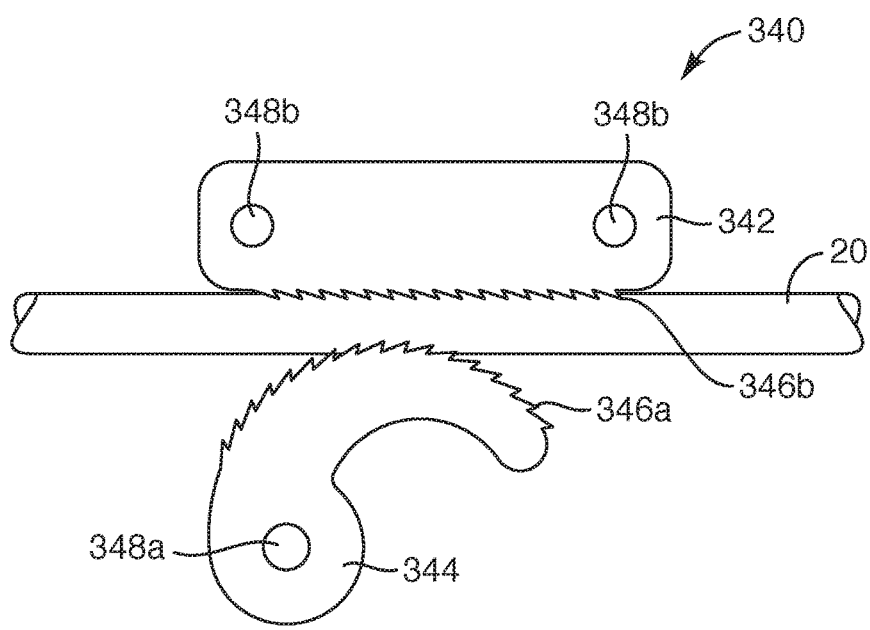
FIG. 28 is a top plan view of an alternative embodiment of a cleat, this cleat referred to as a "cam cleat," inasmuch as it is a quick-response device for placing a line without having to make any wraps around arms or members, but rather simply captures a line between a fixed portion and a rotatable cam portion, which will instantly prevent any backsliding of the line.

Referring to FIG. 28, a cam-cleat 340 is illustrated. Typically, a cam-cleat 340 includes a fixed block 342 and a pivoting or rotating member 344. The rotating member 344 represents a cam 344. The cam-cleat 340 may be secured by pins 348. For example, a pin 348*a* may operate as an axle 248*a* about which the cam 344 pivots. Meanwhile, multiple pins 348*b* may secure the block 342 to maintain it as an anvil 342 against which the cam 344 will urge the line 20.

In use, the cam 344 will typically be closed toward the anvil 342. A biasing spring or other member may be a part of the cam-cleat 340, urging the cam 344 to rotate toward the anvil 342. One will note that teeth 346*a*, roughness 346*a*, or knurling 346*a* on the cam 344 will lie along an arcuate path 346 that has a variation in radius from the pin 348*a*. Thus, lines 20 of various sizes may fit between the cam 344 and the anvil 342. Nevertheless, the variable radius of the cam's 344 active surface 346 will move under a bias force to contact the line 20.

Once the cam 344 closes on the line 20 and thereby urges the line 20 against the anvil 342, the teeth 346*a* or roughened surface 346*a* engages the line 20, and urges the cam 344 even more tightly against the line 20. Thus, the line 20 is captured quite simply and easily.

In practice, a user will simply force the line 20 between the cam 344 and the anvil 342, thus pushing against the bias force to move the cam 344 by rotation away from the anvil 342. Once the line 20 has been drawn through the space between the cam 344 and the anvil 342, it is captured. Any release of the line 20 by a user will simply relinquish resistance on the line 20 to the cam-cleat 340.

Figure 29:
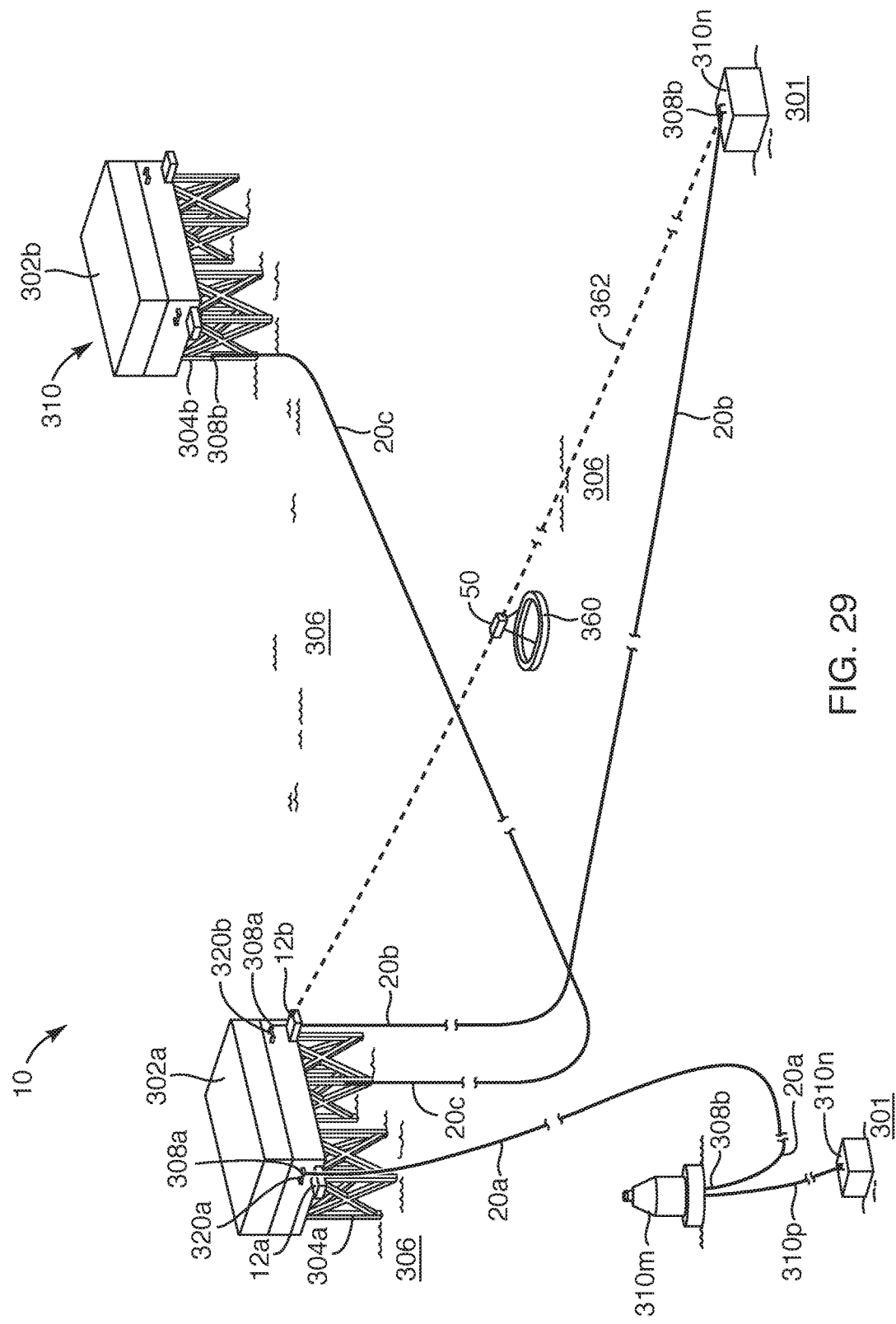
FIG. 29 is a perspective view of an alternative, permanent anchoring system and method, in which deployment is partially done in advance, but the tensioning portion is done only at the immediate time of egress.

Referring to FIG. 29, in one alternative embodiment of a system 10 in accordance with the invention, the launch platforms 12 may be single or multiple on a particular rig 302*a*. Meanwhile, lines 20 may be deployed partially by extending them through the water to a distant location 310. As illustrated, those distant locations 310 may be, for example, a support 304 on a remote rig 302*b* or platform 310*k*.

The track line 20 will typically drop directly down into the water 306 immediately beside the rig 302*a*. In this way, potential interference with shipping traffic or other equipment may be minimized. As a practical matter, the shape of the line 20 will depend on exactly how it is connected and where.

For example, the sea floor 301 may be tens of meters, hundreds of meters, or thousands of meters from the surface of the water 306. The terminal end 308*b* may be anchored, by necessity, physics, or choice, at a suitable horizontal distance away from the rig 302*a* across the sea floor 301. The track line 20 will have a corresponding length.

Specifically, a direct, mathematical line drawn from the start end 308*a* to the terminal end 308*b* may be comparatively steep in slope (mathematically, the vertical "rise" divided by horizontal "run"), or shallow. Conceivably, along a 45 degree straight line, the horizontal distance may be up to about 6000 meters, typically based on the vertical distance being about the same. The actual track line 20 will necessarily suspend below the mathematical line in operation, and may suspend or rest on the floor 301 far below after installation and before tensioning required for use.

The free line 20 or the amount of the line 20 above the water 306 may necessarily be a minor portion of the overall length in some situations or configurations, such as that posited immediately hereinabove. So long as the horizontal distance away from the platform 302*a* that the line 20 enters the water represents a safe location (e.g., about 500 to 1600 feet, or 150 to 500 meters), a trolley 50 can operate successfully. The line length, depth, and path prior to tensioning may all be selected as matters of engineering requirements, safety, convenience, and freedom of operation of the platform 302*a* without obstruction.

As a practical matter, the line 20 will have a length dictated by operation of the rig 302*a* and of the emergency egress trolley system 10 and its various components. Accordingly, it may be of any suitable geometry that will install, deploy, activate, and operate reliably and safely. The safe distance horizontally, the distance of the sea floor 301, the intervention or non-intervention of a buoy 310*m*, and the like may all be factors to be accommodated or relied upon.

In the illustrated embodiment, the line 20*a* may extend from a capstan 328 associated with the rig 302*a*, and the carrier system 250. For example, the capstan 328 or take-up system 320, in general, may be secured to a platform 302, to a carrier system 250, to some supporting beam 256, or the like. In general, in this embodiment, the take-up system 320 is at the top end 308*a* of the line 20. Thus, the terminal end 308b may be permanently connected at a remote location 310 that lacks a take-up system 320 or capstan 328.

Instead, a line 20, such as the lines 20a, 20b, 20c, may be deployed, or partially deployed in advance. Slack and immersed, the track line 20 is then left, weighted by either its own weight or by applied weights, at a location under the surface of the water 306.

For example, the line 20a extends from a take-up system 320a associated with the launch platform 12a. It drops down into the water 306 passing thereinto, and going down to a depth that renders the line 20a non-obstructing. In this embodiment, the line 20a may pass down toward, or completely to the sea floor 301, whether the sea floor 301 is at hundreds of feet of depth or thousands.

Meanwhile, the line 20a also extends out to a location 310, such as a buoy 310m secured to the sea floor 301. In the illustrated case, an anchor 310n or destination anchor 310n may be connected by a tether 310p to a buoy 310m. The tether 310p maintains the buoy 310m in the vicinity of the weight 310n or other anchor 310h.

Upon activation for emergency egress, the capstan 328 at the launch station 12a activates. It is already connected to the line 20a, and simply takes up the line 20a. Eventually, the line 20a is pulled tight against the buoy 310m, which is held to the floor anchor 310n by the tether 310p. The tether 310p must be able to support the load of the line 20a. Otherwise, the line 20a may itself be the tether 310p, and pass all the way to the floor anchor 310h, 310n.

In an alternative configuration, a platform 12b may have a take-up system 320a associated therewith, and embedded or secured as part of the carrier system 250 or the structure supporting it. In this case, the line 20b passes virtually straight down in close proximity to support structures 304a of the rig 302a or the site 302a. The line 20b then passes down under the water 306 and through the sea 306, along the floor or otherwise, to a floor anchor 310n secured thereto. Again, the take-up system 320a upon activation for emergency egress, takes up the slack in the line 20b between the platform 12b and its associated floor anchor 310n.

Similarly, a remote platform 302b or rig 302b may be at some location remote from the subject platform 302a. Alternatively, the platform 302b may actually be represented by a platform 310k as discussed with respect to FIG. 26. By whatever mode, the line 20c is fixedly anchored. In most embodiments, offshore rigs 302a are remote from land. However, a structure 310k could even be affixed to shore land. Thus, the ends 308b of each of the lines 20a, 20b, 20c are fixed. The take-up devices 320a, 320b, and so forth may be fixed to the rig 302a or platform 302a from which egress is desired or to a remote location 310.

Upon activation, the take-up device 320 is responsible to take up the tension in the line 20. In the alternative configurations, this means that the line 20 will have a lower end 308b or terminal end 308b that secures to a remote location 310, such as the buoy 310m, and thereby is secured by the corresponding floor anchor 310n connected by the tether 310p. This means that the terminal end 308b at deployment for use is likely to be approximately at water level. It may conceivably be sunk below the level of the water 306.

Similarly, a take-up device 320b will pull the line 20b to a specified level of tension against its opposite, corresponding, terminal end 308b (or upper end 308a) anchored on a floor anchor 310n or other destination 310 remotely. When tension is taken up in the line 20b, a portion of the line 20b may sink into the water 306 and may extend under water for most of its length.

For example, a distance that a worker 45 or rider 45 should remove from a platform 302a being evacuated is about a quarter of a mile (about 500 meters). In contrast, the anchor 310n connected to the terminal end 308b of the line 20b may be multiple times that distance away. Likewise, the end 308b of the line 20c may be anchored under water 306, or may be anchored above the water 306. In some respects, the anchoring of a terminal end 308b of the line 20c below the water level assures that the rider 45 will not slam into a supporting structure 304b supporting the platform 302b.

In order to provide a habitable place for riders 45 to congregate or land, it may be advisable to load the first trolley 50 on the line 20 with a special load that is an inflatable (or a non-inflatable) raft, float, platform, or other device. Accordingly, each rider 45 following the run of the first trolley 50 down the line 20 will find a landing location, such as an inflated rubber raft 360, a supporting platform, a boat hull or some floating hull that will keep riders 45 from having to spend any extended time of the water 306.

In one preferred situation, the first trolley 50 may carry a compacted rubber raft 360, which rubber raft 360 then deploys automatically and immediately upon some sensor suspended therebelow or connected thereto sensing water. Thus, the system may automatically inflate the raft 360 while it may stay secured to the line 20. Accordingly, if a rubber raft 360 is positioned by anchoring mechanisms to its trolley 50 to be some distance below the line 20, a rider 45 may simply descend the line 20 and land in the large inflatable raft 360.

Some advantages of the configuration of FIG. 29 include the fact that no secondary event or deployment mechanism 312 is required. Rather, long before emergency egress is required, the line 20 has been partially deployed. The line 20 may be maintained on a regular basis, may be made of special materials, may be coated with special materials, or the like to protect it from damage or obstruction by the marine environment. The line 20 may be deployed into clips or other mechanisms or brackets holding it to the floor or to tethers securing or weighing it toward the floor 301. Upon sensing (or simply being overcome by) sufficient tension, the line 20 may release from the grasp of the clips, and rise to the surface along its catenary trajectory.

In one illustrated embodiment, the line 20b upon tensioning by its take-up system 320b takes a new position 362 illustrated. Accordingly, much of the line 20b will proceed underwater to the corresponding floor anchor 310n connected thereto. However, the rubber raft 360 will deploy short of that location of the terminal end 308b and ride on the surface of the water 306.

The trolley 50 may beneficially remain connected to the raft 360. In this way, the raft 360 remains tethered to the line 20b in its new location 362. Riders 45 may descend the line 20b and release themselves from the harness 46, trolley 50, or both before or after arriving in the raft 360. In some embodiments, the raft 360 may be greater than the height of a man away from the line 20. In other embodiments, the raft 360 may be much closer to the line 20.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method of emergency egress, the method comprising:
receiving information initiating an emergency egress at a first location;
deploying a track line from a stowed position at the first location toward a mobile watercraft moving away from the first location in response to the information, the track line, having a length selected to extend between a first, upper, starting end and a second, lower, terminal end between an upper location on a structure, corresponding to a work station, and a lower location established by the mobile water craft to be remote from the upper location across a marine environment;
providing a support separate from yet proximate the track line, proximate the upper end and vertically fixing support heights;
providing a first trolley and second trolley, each comprising a roller operably connected to capture the track line, the support vertically fixing the first and second trolleys at the support heights by removing weighting thereof against the track line, awaiting release from the support to weight the track line by the rollers;
supporting the first and second trolleys by the support while suspending first and second riders, respectively, from the first trolley and second trolley;
tensioning the track line between the first end and second end in response to force applied to the second end by the mobile water craft;
releasing sequentially the first trolley and the second trolley from the support to weight separately in time and space, descend consecutively to, and travel simultaneously along the track line toward the second end.

2. The method of claim 1, further comprising:
controlling, by the first rider, the releasing of the first trolley from the support.

3. The method of claim 2, further comprising:
controlling, by the second rider, the releasing of the second trolley from the support to weight and travel along the track line at a time after the releasing of the first trolley by the first rider.

4. The method of claim 1, further comprising:
providing at least one precursor trolley, configured and connected similarly to the first and second trolleys;
suspending an emergency landing device from the precursor trolley; and
releasing the precursor trolley to travel along the track line before releasing the first trolley.

5. The method of claim 1, further comprising:
providing a fixed anchor;
delivering, by the mobile watercraft, the second end to the fixed anchor; and
securing the track line to the fixed anchor before the tensioning.

6. The method of claim 5, further comprising:
deploying the second end of the track line to a terminal destination after receiving the information and before the tensioning.

7. The method of claim 6, further comprising:
securing the second end of the track line to the anchor after the deploying; and
executing the tensioning after the securing.

8. The method of claim 1, wherein tensioning is executed following delivery of the first end by the mobile water craft by a tensioning device located proximate the first end and connected to draw a portion of the track line theretoward.

9. The method of claim 1, wherein:
the first end is secured to the structure at the first location;
deploying constitutes carrying the terminal end to a terminal location remote from the first location; and
tensioning constitutes reducing the effective length of the track line by taking up a portion of the track line proximate at least one of the first location and the terminal location.

10. The method of claim 9, wherein the first location and terminal locations are about 500 meters apart horizontally and the second location is under water.

11. A method of operating a zip line in a marine environment for emergency egress, the method comprising:
providing a track line;
receiving information initiating emergency egress;
suspending the track line by deploying it by a mobile watercraft from a first location deemed unsafe toward a second location remote therefrom, the first and second locations being separated by a body of water extending substantially the entire distance therebetween;
providing a first trolley and a second trolley, each comprising a roller operably constrained to run along the track line;
deploying and tensioning the track line after receiving the information;
suspending, from a support configured to be independent from the track line and to unweight the track line from the first and second trolleys by providing the exclusive vertical support therefor above and not resting on the track line until released from the support, a first rider from the first trolley and a second rider from the second trolley;
releasing, sequentially, separately, and independently, the first trolley and the second trolley from the support, by the respective first and second riders, to engage individually and separately in time, and then descend simultaneously along, the track line toward the second location.

12. The method of claim 11, wherein each of the first and second trolley is under exclusive independent control of the rider corresponding to said respective first and second trolley.

13. The method of claim 11, further comprising releasing a precursor trolley before the first trolley, the precursor trolley carrying a landing device effective to keep the riders out of the water.

14. The method of claim 11, wherein the second location is underwater.

15. The method of claim 11, further comprising distributing the track line between the first and second locations, unsuspended and untensioned, before receiving the information.

16. The method of claim 11, wherein:
the track line is freely suspended, by the tensioning between the first location, and a location on the water between the first location and the second location; and
the method further comprises deploying a landing device capable of receiving the first and second riders out of the water proximate the second end.

17. The method of claim 11, further comprising controlling, by the first rider, independently from all others, the releasing of the first trolley; and
controlling, by the second rider the releasing of the second trolley.

18. The method of claim 17, further comprising:

providing first and second controllers, respectively, operably connected to the first and second trolleys and effective to control the releasing of the first trolley and the second trolley;

controlling, exclusively by the second rider, independently from all subsequent riders, the first controller; and controlling, exclusively by the second rider, the second controller.

19. An emergency egress system comprising:

a first structure at a first location;

a second location remote from the first location across a substantially continuous marine environment therebetween;

a track line, located at the first location, undeployed, having a first end and a second end, the first end connected to the first structure;

a deployment device arranged as a mobile water craft at the first location capable of extending the second end from the first location to the second location in direct response to initiation of an emergency egress;

an anchoring device capable of securing the second end at the second location after delivery thereto by the deployment device;

a tensioning device operable to take up a portion of the track line between the first and second ends;

a carrier system installed at the first location providing the exclusive vertical support to suspend multiple trolleys, each trolley thereof thereby unweighting the track line until released from the carrier to weight the track line carrying a rider in a seat, with the trolley simultaneously connected to the track line in a configuration and readiness to be released from the support to weight and to travel along the track line; and a control mechanism corresponding to the each trolley and operable exclusively by the rider corresponding thereto to release the each trolley from the carrier system to traverse along the track line.

20. The apparatus of claim 19, wherein:

the track line is contained on a reel at the first location until demanded for emergency egress; and the deployment device is capable of extending the second end of the track line upon initiation of the demand for the emergency egress.

* * * * *